US010029530B2

(12) United States Patent
Tsukahara

(10) Patent No.: US 10,029,530 B2
(45) Date of Patent: Jul. 24, 2018

(54) PRESSURE DAMPER AND DAMPING FORCE GENERATION MECHANISM

(71) Applicant: Showa Corporation, Gyoda (JP)

(72) Inventor: Takashi Tsukahara, Gyoda (JP)

(73) Assignee: SHOWA CORPORATION, Gyoda (JP)

( * ) Notice: Subject to any disclaimer, the term of this patent is extended or adjusted under 35 U.S.C. 154(b) by 66 days.

(21) Appl. No.: 15/075,472

(22) Filed: Mar. 21, 2016

(65) Prior Publication Data
US 2016/0200163 A1 Jul. 14, 2016

Related U.S. Application Data

(63) Continuation of application No. PCT/JP2014/072763, filed on Aug. 29, 2014.

(30) Foreign Application Priority Data

Sep. 30, 2013  (JP) ................................. 2013-205327
Mar. 25, 2014  (JP) ................................. 2014-061142
Mar. 25, 2014  (JP) ................................. 2014-061143

(51) Int. Cl.
B60G 17/08 (2006.01)
B60G 13/08 (2006.01)
(Continued)

(52) U.S. Cl.
CPC ............. B60G 13/08 (2013.01); B60G 17/08 (2013.01); F16F 9/32 (2013.01); F16F 9/34 (2013.01); F16F 9/46 (2013.01); B60G 2500/10 (2013.01)

(58) Field of Classification Search
CPC .... B60G 13/08; B60G 17/08; B60G 2500/10; F16F 9/32; F16F 9/34; F16F 9/46
(Continued)

(56) References Cited

U.S. PATENT DOCUMENTS 4,596,320 A * 6/1986 Shimokura ............. F16F 9/462
                                                        188/266.4
4,953,671 A * 9/1990 Imaizumi ................ F16F 9/464
                                                        188/266.3
(Continued)

FOREIGN PATENT DOCUMENTS

DE      19808698 A       9/1999
DE      19808698 A1 *    9/1999   .............. F16F 9/464
(Continued)

OTHER PUBLICATIONS

Machine Translation in English for DE 19808698 A1; Inventor: Schreiber; 2 pages; Retrieve Date: Oct. 25, 2017.*
(Continued)

Primary Examiner — Thomas J Williams
Assistant Examiner — Mariano Sy
(74) Attorney, Agent, or Firm — Leason Ellis LLP

(57) ABSTRACT

A pressure damper includes: a cylinder containing fluid; a defining member disposed in the cylinder movably in an axial direction and configured to define a space in the cylinder into a first fluid chamber and a second fluid chamber that contain the fluid; a passage forming portion configured to form passages of the fluid that flows in accordance with a displacement of the defining member; first passages as defined herein; second passages as defined herein; a control member that opens and closes the first passages and the second passages so as to control flows of the fluid in the first passages and the second passages; and a load application member as defined herein.

12 Claims, 44 Drawing Sheets

(51) Int. Cl.
*F16F 9/34* (2006.01)
*F16F 9/46* (2006.01)
*F16F 9/32* (2006.01)

(58) Field of Classification Search
USPC ............. 188/313, 317, 322.15, 282.8, 282.3, 188/266.3, 285
See application file for complete search history.

(56) References Cited

U.S. PATENT DOCUMENTS

| | | | | |
|---|---|---|---|---|
| 5,133,434 | A | * | 7/1992 | Kikushima ............. F16F 9/464 137/493.9 |
| 5,507,371 | A | * | 4/1996 | Takahashi ............. F16F 9/3485 188/282.5 |
| 6,247,563 | B1 | * | 6/2001 | De Carbon ............... F16F 1/32 188/282.5 |
| 6,260,832 | B1 | * | 7/2001 | Vignocchi ............ B60G 15/061 188/282.5 |
| 8,235,187 | B2 | * | 8/2012 | Murakami ............. F16F 9/466 188/285 |
| 2012/0181126 | A1 | | 7/2012 | De Kock |

FOREIGN PATENT DOCUMENTS

| | | | |
|---|---|---|---|
| EP | 1826453 A1 * | 8/2007 | ............. B62K 25/08 |
| JP | 05-296282 A | 11/1993 | |
| JP | 07-091476 A | 4/1995 | |
| JP | 2009-180233 A | 8/2009 | |

OTHER PUBLICATIONS

International Search Report dated Dec. 2, 2014 for the corresponding PCT Application No. PCT/JP2014/072763.

* cited by examiner

FIG. 39
(a) 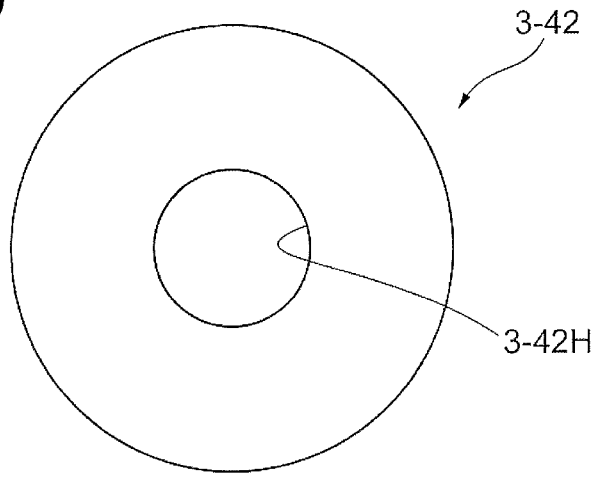
(b) 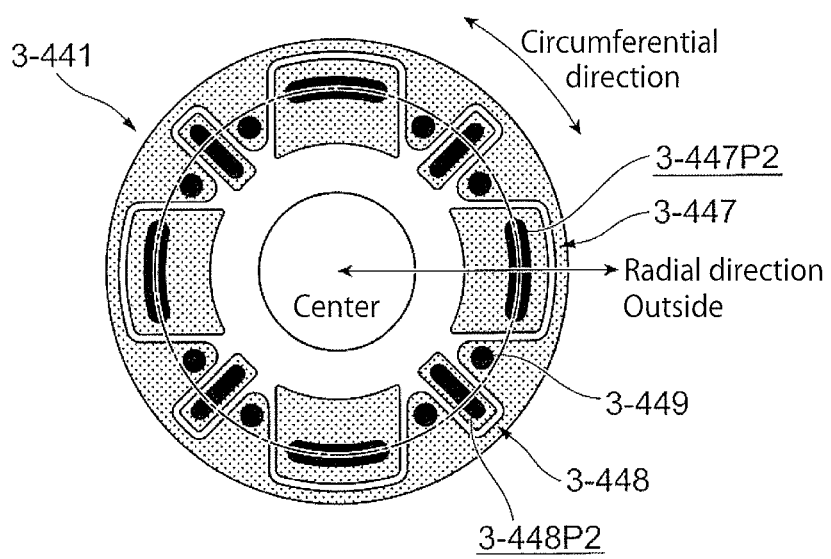
(c) 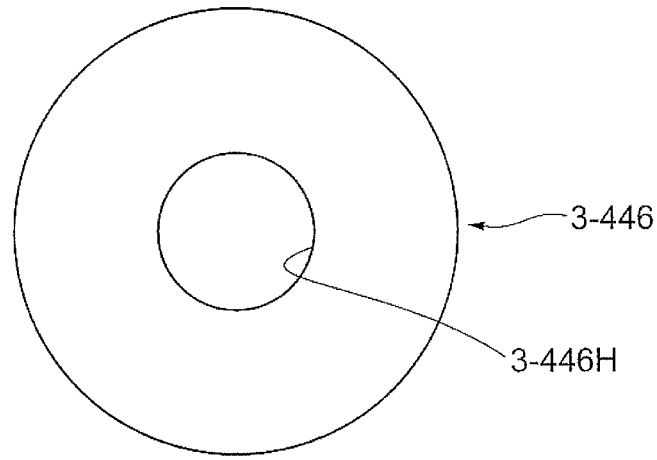

PRESSURE DAMPER AND DAMPING FORCE GENERATION MECHANISM

CROSS REFERENCE TO RELATED APPLICATION

This is a continuation of International Application No. PCT/JP2014/072763 filed on Aug. 29, 2014, and claims priority from Japanese Patent Application No. 2013-205327 filed on Sep. 30, 2013, Japanese Patent Application No. 2014-061142 filed on Mar. 25, 2014 and Japanese Patent Application No. 2014-061143 filed on Mar. 25, 2014, the entire disclosures of which are incorporated herein by reference.

TECHNICAL FIELD

The present invention relates to a pressure damper and a damping force generation mechanism.

BACKGROUND ART

The suspension of a vehicle such as an automobile includes a pressure damper utilizing a damping force generation mechanism to appropriately alleviate vibration transmitted to the vehicle body from a ground surface during travel so as to improve riding comfort and handling stability. The pressure damper includes, for example, a defining member, a rod member, and a damping force generation member. The defining member is movably disposed in a cylinder to define the inside of the cylinder. The rod member is coupled to the defining member. The damping force generation member is disposed in the cylinder to resist against a flow of fluid in accordance with a displacement of the defining member so as to generate damping force. In the pressure damper, damping force is generated by the defining member in accordance with each displacement of the rod member in one direction and in the other direction.

As illustrated in FIG. 44, a patent publication discloses a conventional technique in which a damper is defined into a lower chamber 94A and a reservoir chamber 94B by a piston 93 disposed in an end portion of a cylinder 91. The piston 93 includes a communication hole 931 and a valve 95. The communication hole 931 is formed in a base 932 of the piston 93 to allow the lower chamber 94A and the reservoir chamber 94B to communicate with each other. The valve 95 allows the communication hole 931 to be open and closed to provide damping force. A press member 96 opposed to the valve 95 is displaced to press the valve 95 against the base 932 so as to change the set load of the valve 95. Thus, the damping force in the damper is changed (see patent document 1).

PATENT DOCUMENTS

Patent document 1: Japanese Unexamined Patent Application Publication No. 7-091476.

DISCLOSURE OF THE INVENTION

Problems to be Solved by the Invention

In the conventional technique disclosed in patent document 1, for example, the press member is pressed only against the valve on one side of the piston in the axial direction so as to change the damping force. In the conventional technique, however, damping force cannot be adjusted at a valve on the side where the press member is not disposed. That is, while it was possible to adjust the damping force of a fluid flow generated in accordance with a displacement of the defining member in one direction, damping force of a fluid flow generated in accordance with a displacement of the defining member in the other direction could not be adjusted.

In the conventional technique, in an attempt to adjust damping force generated in accordance with the displacements of the defining member in both of one direction and the other direction, the device configuration inevitably got complicated.

The present invention has an object to implement, with a simplified configuration, adjustment of damping force generated in accordance with displacements of a defining member in both of one direction and the other direction.

SUMMARY OF THE INVENTION

Means of Solving the Problems

In view of the above object, according to the present invention, a pressure damper includes a cylinder, a defining member, a passage forming portion, first passages, second passages, control means, and load application means. The cylinder contains fluid. The defining member is disposed in the cylinder movably in an axial direction and configured to define a space in the cylinder into a first fluid chamber and a second fluid chamber that contain the fluid. The passage forming portion is configured to form passages of the fluid that flows in accordance with a displacement of the defining member. The first passages are formed in the passage forming portion and configured to cause the fluid, which flows from the first fluid chamber to the second fluid chamber in accordance with a displacement of the defining member in one direction of the axial direction, to flow in a specified direction. The second passages are formed in the passage forming portion and configured to cause the fluid, which flows from the second fluid chamber to the first fluid chamber in accordance with a displacement of the defining member in another direction of the axial direction, to flow along the specified direction. The control means opens and closes the first passages and the second passages so as to control flows of the fluid in the first passages and the second passage. The load application means applies a load to the control means in such a direction that the control means closes the first passages and the second passages. The load application means is capable of changing the load of the control means.

With this configuration, the load application means applies a load to the control means in a single direction only so as to apply the load to the control means in such a direction as to close both of the first passages and the second passages. Thus, it is possible to implement, with the simplified configuration, adjustment of the damping force generated in accordance with displacements of the defining member in both of one direction and the other direction.

Effects of the Invention

The present invention provides the simplified configuration to implement adjustment of damping force generated in accordance with displacements of the defining member in both of one direction and the other direction.

BRIEF DESCRIPTION OF THE DRAWINGS

FIG. 39 is exploded perspective views of a damping unit in embodiment 13.

DETAILED DESCRIPTION OF THE INVENTION

[Modes for Carrying Out the Invention]

Embodiments of the present invention will be described in detail below with reference to the accompanying drawings.

(Embodiment 1)

Figure 1:
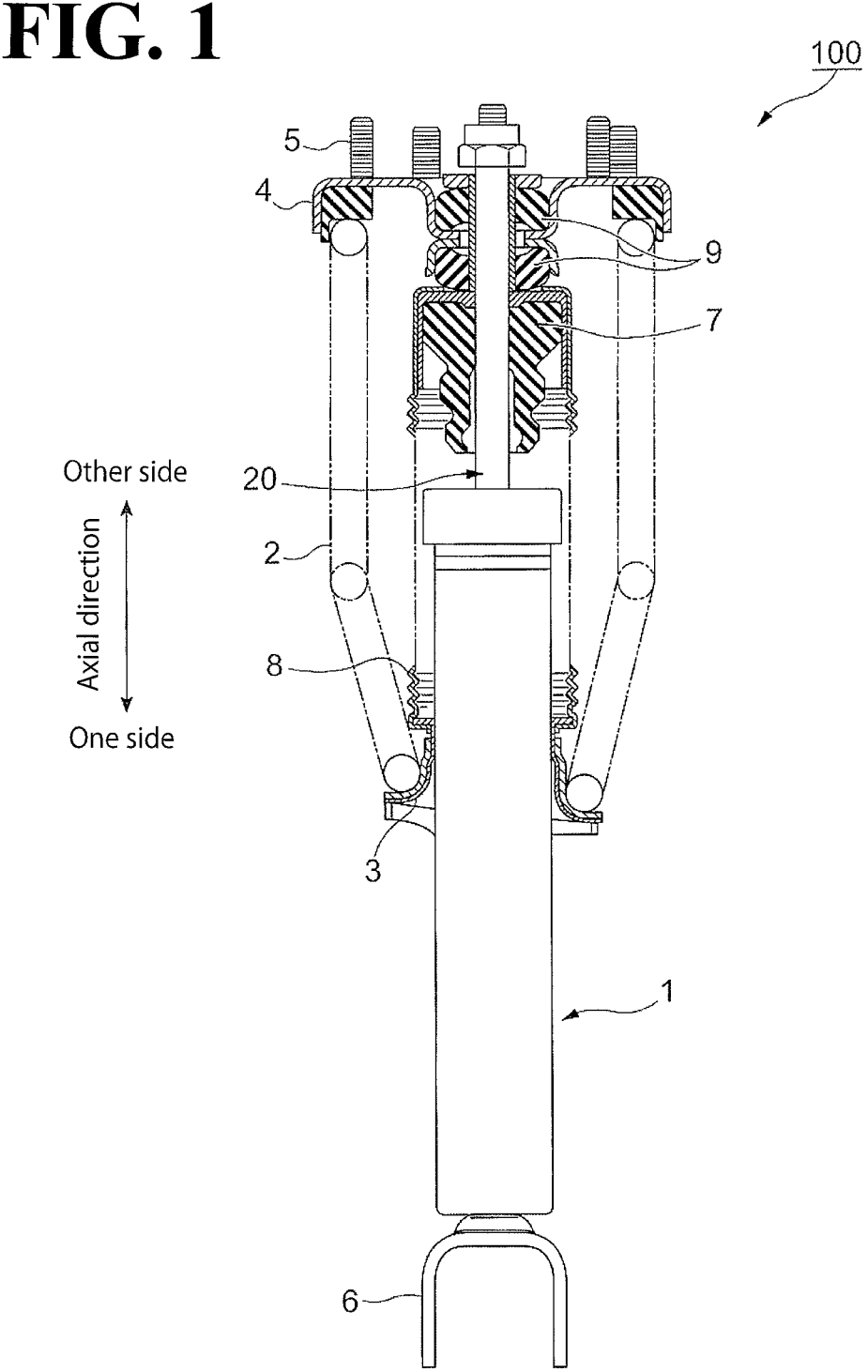
FIG. 1 is a diagram illustrating a schematic configuration of a suspension according to an embodiment.

FIG. 1 is a diagram illustrating a schematic configuration of a suspension 100 according to an embodiment.

[Configuration and Function of Suspension 100]

As illustrated in FIG. 1, the suspension 100 includes a hydraulic damper 1 and a coil spring 2 disposed outside of the hydraulic damper 1. In the suspension 100, the coil spring 2 is held by a spring seat 3 and a spring seat 4 disposed on both ends of the coil spring 2. The suspension 100 includes bolts 5 and a wheel-side mounting portion 6. The bolts 5 are used for mounting the suspension 100 on, for example, a vehicle body. The wheel-side mounting portion 6 is disposed on a lower portion of the hydraulic damper 1.

In the following description, the lower side of the suspension 100 in the axial direction in FIG. 1 will be referred to as "the one side", and the upper side of the suspension 100 in the axial direction in FIG. 1 will be referred to as "the other side".

Also, the suspension 100 includes a bump rubber 7 press-fitted on the outer circumference of a rod portion 20, described later, protruding from the other side of the hydraulic damper 1. The suspension 100 includes a pleated dust cover 8 covering an end portion of the hydraulic damper 1 and the outer circumference of the rod portion 20 that protrudes from the hydraulic damper 1. The suspension 100 further includes a plurality of (two in this embodiment) mount rubbers 9 to absorb vibration. The mount rubbers 9 are disposed vertically on an upper-end side of the rod portion 20.

Figure 2:
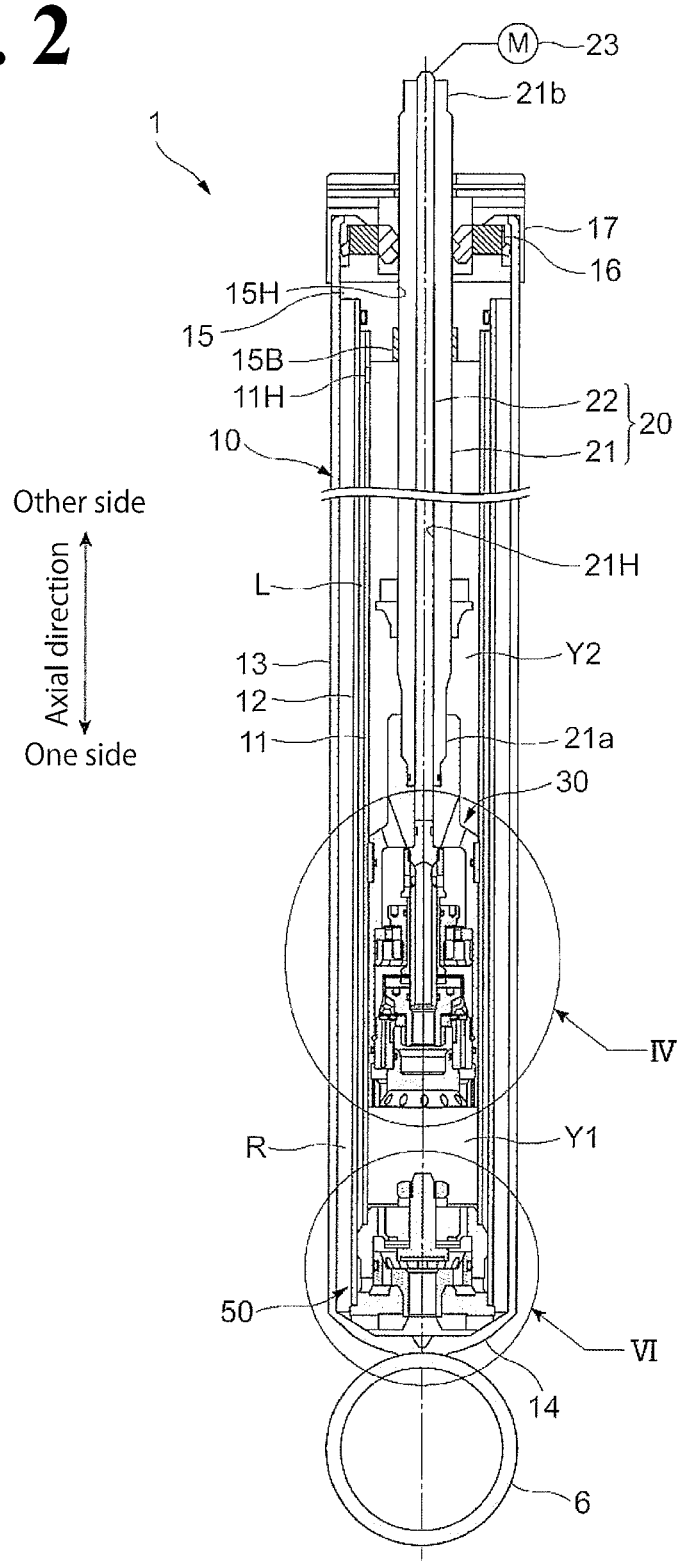
FIG. 2 is a diagram illustrating the general arrangement of a hydraulic damper in the embodiment.

FIG. 2 is a diagram illustrating the general arrangement of the hydraulic damper 1 according to this embodiment.

[Configuration and Function of Hydraulic Damper 1]

As illustrated in FIG. 2, the hydraulic damper 1 includes a cylinder portion 10, the rod portion 20, a piston portion 30, and a bottom valve portion 50. The rod portion 20 protrudes from the cylinder portion 10 on the other side. The rod portion 20 is slidably inserted in the cylinder portion 10 on the one side. The piston portion 30 is disposed on an end portion of the rod portion 20 on the one side. The bottom valve portion 50 is disposed on an end portion of the cylinder portion 10 on the one side.

(Configuration and Function of Cylinder Portion 10)

The cylinder portion 10 includes a cylinder 11, an outer hollow cylindrical member 12, and a damper case 13. The outer hollow cylindrical member 12 is disposed outside of the cylinder 11. The damper case 13 is further disposed outside of the outer hollow cylindrical member 12. The cylinder 11, the outer hollow cylindrical member 12, and the damper case 13 are arranged coaxially (coaxially).

The cylinder portion 10 also includes a bottom portion 14, a rod guide 15, an oil seal 16, and a bump stopper cap 17. The bottom portion 14 closes an end portion of the damper case 13 on the one side in the axial direction. The rod guide 15 guides the rod portion 20. The oil seal 16 prevents oil from leaking from the cylinder portion 10 and prevents foreign matter from entering the cylinder portion 10. The bump stopper cap 17 is attached to an end portion of the damper case 13 on the other side.

The cylinder 11 (cylinder) has a thin, hollow cylindrical shape that is open on the one side and on the other side. The cylinder 11 has an end portion on the one side closed by the bottom valve portion 50, and has an end portion on the other side closed by the rod guide 15. The cylinder 11 contains oil, which is an example of the fluid.

The piston portion 30 (damping force generation mechanism) is slidable in the axial direction relative to the inner surface of the cylinder 11. The piston portion 30 defines a space in the cylinder 11 into a first oil chamber Y1 and a second oil chamber Y2 that contain the oil. In this embodiment, the first oil chamber Y1 is formed on the one side of the piston portion 30, and the second oil chamber Y2 is formed on the other side of the piston portion 30.

The cylinder 11 includes a cylinder opening 11H on the other side, which is open in the radial direction. The cylinder opening 11H is on the one side of the rod guide 15. The cylinder opening 11H communicates the second oil chamber Y2 of the cylinder 11 with a communication passage L, described later. The cylinder opening 11H allows the oil to flow between the second oil chamber Y2 and the communication passage L.

The outer hollow cylindrical member 12 has a thin, hollow cylindrical shape that is open on the one side and on the other side. The outer hollow cylindrical member 12 is disposed outside of the cylinder 11 and inside of the damper case 13. The inner circumference of the outer hollow cylindrical member 12 is at a predetermined interval from the outer circumference of the cylinder 11. Between the outer hollow cylindrical member 12 and the cylinder 11, the communication passage L is formed to allow the oil to flow. The communication passage L serves as a route of the oil among the first oil chamber Y1, the second oil chamber Y2, and a reservoir chamber R, described later.

The damper case 13 is longer than the cylinder 11 and the outer hollow cylindrical member 12. The damper case 13 accommodates the cylinder 11 and the outer hollow cylindrical member 12 inside in the axial direction and in the radial direction. The inner circumference of the damper case 13 is at a predetermined interval from the outer circumference of the outer hollow cylindrical member 12. The reservoir chamber R (fluid pool chamber) is formed between the damper case 13 and the outer hollow cylindrical member 12. The reservoir chamber R takes in oil from the cylinder 11 and supplies oil to the cylinder 11 so as to compensate for oil of a volume corresponding to a displacement amount of the rod portion 20.

The bottom portion 14 is disposed on an end portion of the damper case 13 on the one side and closes the end portion of the damper case 13 on the one side. The bottom portion 14 supports the bottom valve portion 50. Through the bottom valve portion 50, the bottom portion 14 further supports the cylinder 11 and the outer hollow cylindrical member 12 at the end portion of the damper case 13 on the one side in the axial direction.

The rod guide 15 is a thick, hollow cylindrical member having an opening 15H in the center. The rod guide 15 is attached to end portions of the cylinder 11 and the outer hollow cylindrical member 12 on the other side. The rod guide 15 supports the rod portion 20 to allow the rod portion 20 to move in the axial direction through a bush 15B disposed in the opening 15H.

The oil seal 16 is a member including a ring of metal or such material with resin such as rubber integral to the inner circumference and the outer circumference of the ring. The oil seal 16 is secured to an end portion of the damper case 13 on the other side.

The bump stopper cap 17 is disposed on an end portion of the damper case 13 on the other side so as to cover the damper case 13. At the time of a compression stroke of the suspension 100, the bump stopper cap 17 protects an end portion of the hydraulic damper 1 on the other side when receiving a bump of the bump rubber 7 (see FIG. 1).

As illustrated in FIG. 2, the hydraulic damper 1 in this embodiment includes the damping force generation mechanism (piston portion 30) to generate damping force, which is disposed in the cylinder (cylinder 11) containing the fluid. The damping force generation mechanism includes the defining member (piston housing 31), the passage forming portion (valve seat 41, described later), the first passages (second oil passages 412), the second passages (first oil passages 411, reversing oil passage 41R), and control means (damping valve 42). The defining member is disposed in the cylinder to be movable in the axial direction and defines the space in the cylinder into the first fluid chamber (first oil chamber Y1) and the second fluid chamber (second oil chamber Y2) that contain the fluid. The passage forming portion forms passages of the fluid that flows in accordance with displacements of the defining member. The first passages are formed in the passage forming portion. The fluid flows from the first fluid chamber to the second fluid chamber in accordance with a displacement of the defining member in one direction of the axial direction, and the first passages make the fluid flow in a specified direction. The second passages are formed in the passage forming portion. The fluid flows from the second fluid chamber to the first fluid chamber in accordance with a displacement of the defining member in other direction of the axial direction, and the second passages make the fluid flow along the specified direction. The control means opens and closes the first passages and the second passages so as to control flows of the fluid in the first passages and the second passages. The hydraulic damper 1 in this embodiment further includes load application means (displacement means 23, transmission member 22, preset valve unit 32, and press member 43). The load application means applies a load to the control means in such a direction that the control means closes the first passages and the second passages. The load application means is capable of changing the load of the control means. These configurations will be described in detail below.

(Configuration and Function of Rod Portion 20)

The rod portion 20 includes a rod member 21, the transmission member 22, and the displacement means 23. The rod member 21 is a hollow rod-shaped member. The transmission member 22 is disposed inside of the rod member 21. The displacement means 23 is disposed on the other side of the rod member 21.

The rod member 21 has a through hole 21H penetrating the rod member 21 in the axial direction. The rod member 21 includes a one-side attachment portion 21a and an other-side attachment portion 21b. The one-side attachment portion 21a is disposed on an end portion of the rod member 21 on the one side, and the other-side attachment portion 21b is disposed on an end portion of the rod member 21 on the other side.

The one-side attachment portion 21a is provided with a spiral groove formed in the outer circumference of the rod member 21 and functions as a bolt. The piston portion 30 is attached to the one-side attachment portion 21a. The other-side attachment portion 21b is provided with a spiral groove formed in the outer circumference of the rod member 21 and functions as a bolt. A predetermined element to mount the suspension 100 on the body of a vehicle such as an automobile is attached to the other-side attachment portion 21b.

The transmission member 22 is a solid rod-shaped member. The transmission member 22 is formed in such a manner that the outer diameter of a cross-section of the transmission member 22 in a direction perpendicular to the axial direction is smaller than the inner diameter of the through hole 21H of the rod member 21. The transmission member 22 is movable in the axial direction in the rod member 21. An end portion of the transmission member 22 on the one side is contactable with a spool 321, described later, of the piston portion 30.

The displacement means 23 displaces the transmission member 22 and applies a load to the preset valve unit 32, described later, through the transmission member 22. Then, through the preset valve unit 32, as described below, the displacement means 23 applies the load to the damping valve 42. At this time, the direction in which the damping valve 42, described later, receives the load from the preset valve unit 32 is set as a single direction. In view of this, in this embodiment, means for applying a load to the damping valve 42, described later, only in a single direction is employed as the displacement means 23 for applying the load. It is noted that the mechanism of the displacement means 23 for displacing the transmission member 22 should not be limited to a particular mechanism. In this embodiment, however, a linear actuator, for example, is employed to convert rotation of a motor into linear motion using a mechanism such as screws.

(Configuration and Function of Piston Portion 30)

Figure 3:
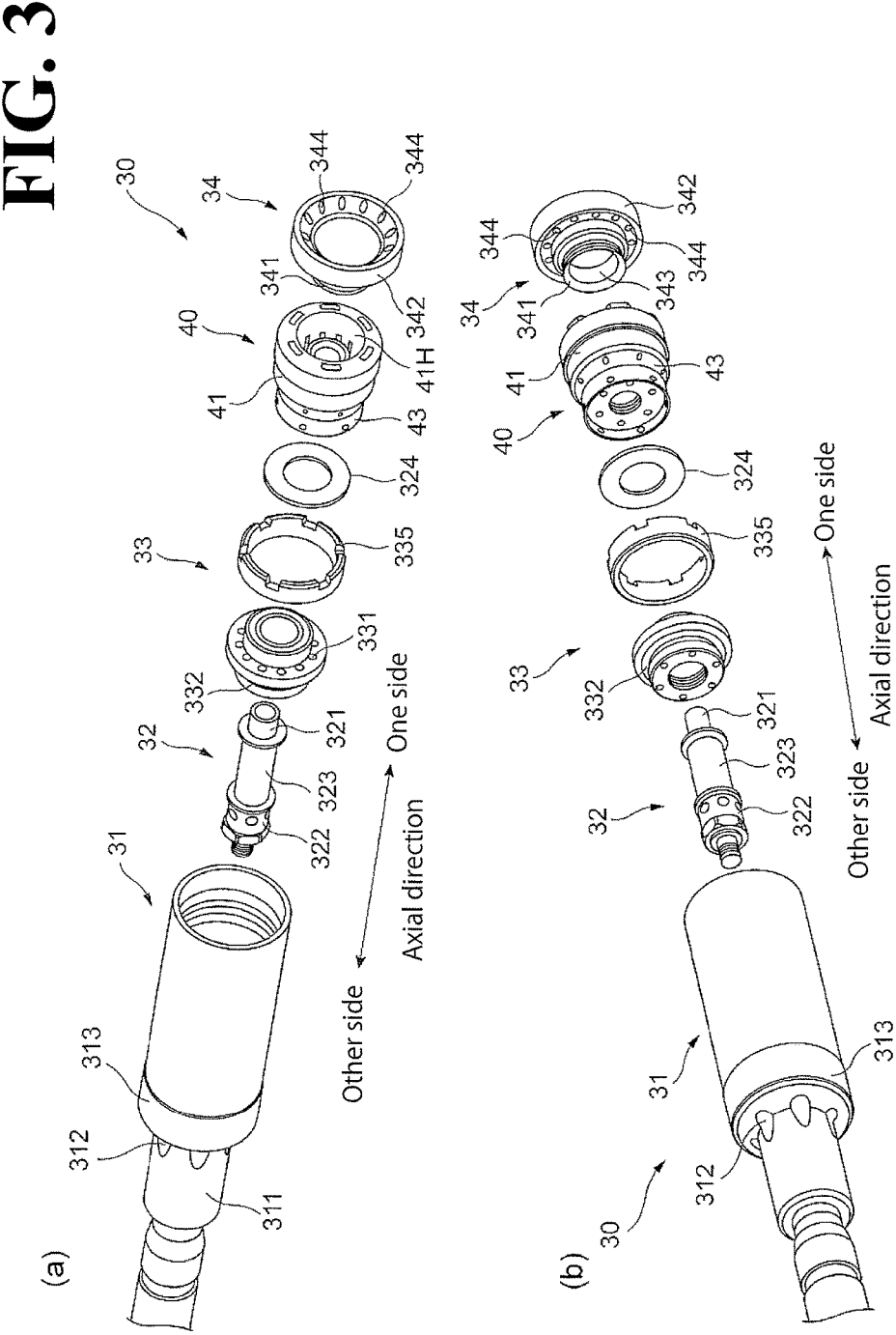
FIG. 3 is exploded perspective views of a piston portion in embodiment 1.

FIG. 3(a) ((a) of FIG. 3) and FIG. 3(b) ((b) of FIG. 3) are exploded perspective views of the piston portion 30 in embodiment 1. FIG. 3(a) is a view of the piston portion 30 from the one side, and FIG. 3(b) is a view of the piston portion 30 from the other side.

Figure 4:
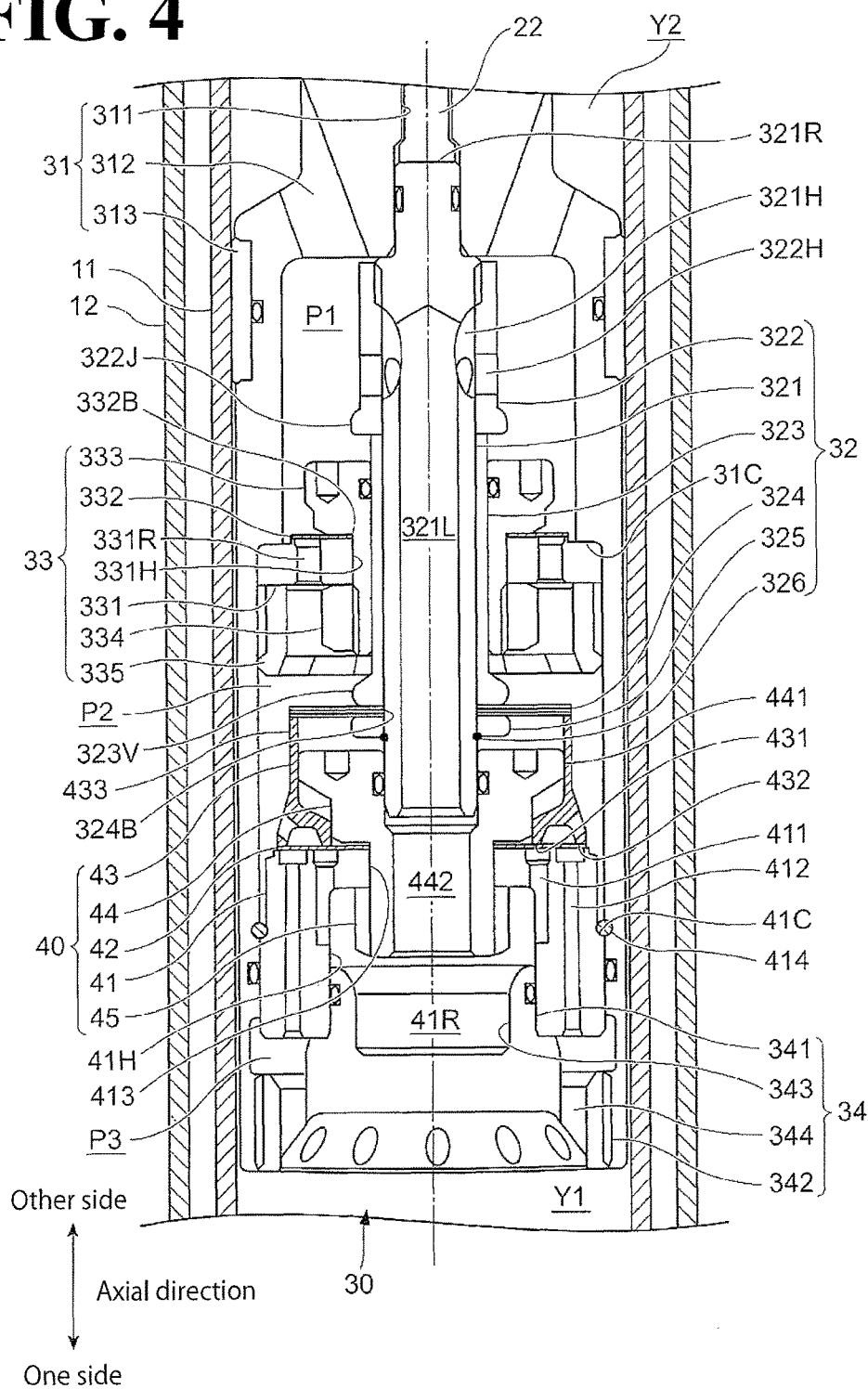
FIG. 4 is an enlarged view of the piston portion and its vicinity indicated by arrow IV in FIG. 2.

FIG. 4 is an enlarged view of the piston portion 30 and its vicinity indicated by arrow VI in FIG. 2.

Figure 5:
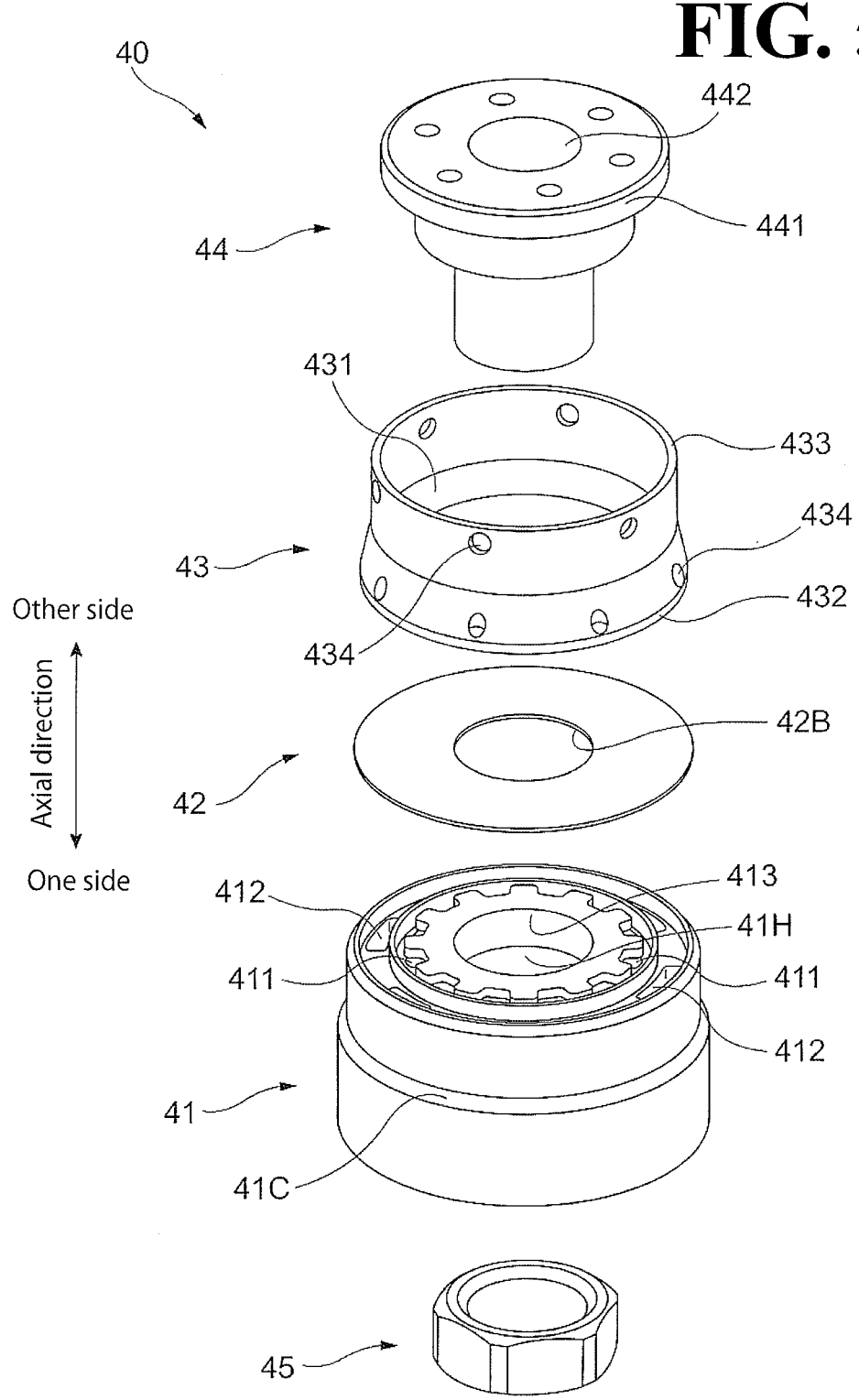
FIG. 5 is an exploded perspective view of a damping unit in embodiment 1.

FIG. 5 is an exploded perspective view of a damping unit 40 in embodiment 1.

As illustrated in FIG. 3, the piston portion 30 includes the piston housing 31, the preset valve unit 32, a check valve unit 33, the damping unit 40, and a lock piece 34. The piston housing 31 accommodates the elements constituting the piston portion 30 and the oil. The preset valve unit 32 extends in the axial direction on the other side in the piston housing 31. The preset valve unit 32 is inserted in the check valve unit 33 in the axial direction. The damping unit 40 is disposed on the one side of the preset valve unit 32. The lock piece 34 is disposed on the one side of the damping unit 40.

In the piston portion 30 in this embodiment, as illustrated in FIG. 4, an other-side oil chamber P1, an intermediate oil chamber P2, and a one-side oil chamber P3 are formed within the piston housing 31. The other-side oil chamber P1 is defined by the preset valve unit 32 and the check valve unit 33. The intermediate oil chamber P2 is defined by the preset valve unit 32, the check valve unit 33, and the damping unit 40. The one-side oil chamber P3 is defined by the damping unit 40 and the lock piece 34.

The piston housing 31 is a hollow member that is open on the one side and closed on the other side. The piston housing 31 includes a coupling portion 311 and housing oil passages 312. The coupling portion 311 is disposed in an end portion of the piston housing 31 on the other side and in the center in the radial direction. The housing oil passages 312 are located outside of the coupling portion 311 in the radial direction. As illustrated in FIGS. 3(a) and 3(b), the piston housing 31 also includes a piston ring 313 on the outer circumference on the other side.

As illustrated in FIG. 4, the coupling portion 311 is a through hole penetrating in the axial direction. An end portion of the rod portion 20 on the one side and an end portion of the preset valve unit 32 on the other side are inserted in the coupling portion 311. The coupling portion 311 is screw-fastened to the one-side attachment portion 21a (see FIG. 2) of the rod member 21. The inner diameter of the coupling portion 311 is larger than the outer diameter of the transmission member 22 and the outer diameter of a receiving portion 321R of the spool 321, described later, of the preset valve unit 32. Therefore, in the coupling portion 311, the transmission member 22 and the spool 321 are movable in the axial direction.

As illustrated in FIGS. 3(a) and 3(b), a plurality of (six in this embodiment) housing oil passages 312 are formed in the circumferential direction. As illustrated in FIG. 4, the housing oil passages 312 allow the second oil chamber Y2 and the other-side oil chamber P1 to communicate with each other.

The piston ring 313 is fitted in a groove formed in the outer circumference of the piston housing 31. The piston ring 313 is in sliding contact with the inner surface of the cylinder 11. The piston ring 313 decreases friction resistance between the cylinder 11 and the piston housing 31.

The preset valve unit 32 includes the spool 321, a collar 322, a second collar 323, a preset valve 324 (elastic member), a valve stopper 325, and a ring 326. The spool 321 extends in the axial direction. The collar 322 is attached outside of the spool 321 on the other side of the spool 321. The second collar 323 is attached outside of the spool 321 on the one side of the collar 322. The preset valve 324 is attached to the spool 321. The valve stopper 325 is disposed on the one side of the preset valve 324. The ring 326 is attached to the one side of the valve stopper 325.

The spool 321 includes the receiving portion 321R, a hollow portion 321L, and spool openings 321H. The receiving portion 321R is disposed on the other side and receives the transmission member 22. The hollow portion 321L is formed on the one side of the receiving portion 321R. The spool openings 321H are on an end portion of the hollow portion 321L on the other side and are open in the radial direction.

The receiving portion 321R is inserted in the coupling portion 311 of the piston housing 31. The end portion of the transmission member 22 on the one side is in contact with the receiving portion 321R. As described below, when the transmission member 22 receives a load, the receiving portion 321R receives the load from the transmission member 22, and the whole spool 321 is moved. The hollow portion 321L is connected to the spool openings 321H on the other side and is open on the one side. The hollow portion 321L is connected to a bolt opening 442, described later, of the damping unit 40. The hollow portion 321L allows the oil to flow between the other-side oil chamber P1 and the bolt opening 442. The spool openings 321H communicate the hollow portion 321L with collar openings 322H, described later.

The collar 322 is an approximately hollow cylindrical member. The collar 322 is screw-fastened to the spool 321. The collar 322 includes the collar openings 322H and a contact portion 322J. The collar openings 322H are open in the radial direction. The contact portion 322J is disposed on an end portion of the collar 322 on the one side.

The collar openings 322H are opposed to the spool openings 321H to communicate the other-side oil chamber P1 with the spool openings 321H. The outer diameter of the contact portion 322J is larger than outer diameters of other portions of the collar 322. The contact portion 322J is in contact with an end portion of the second collar 323 on the other side.

The second collar 323 includes a valve contact portion 323V on the one side. The outer diameter of the valve contact portion 323V is larger than the outer diameters of other portions of the second collar 323. The second collar 323 is in contact with the contact portion 322J of the collar 322 on the other side, and the valve contact portion 323V of the second collar 323 on the other side is in contact with the preset valve 324.

The preset valve 324 includes a plurality of disk-shaped metal plates superposed on one another. An opening 324B in which the spool 321 is inserted is formed in the metal plates. The preset valve 324 is interposed between the second collar 323 and the valve stopper 325 and secured to the spool 321.

The valve stopper 325 presses the preset valve 324 from the one side to the valve contact portion 323V of the second collar 323.

The ring 326 is fitted in the groove formed in the outer circumference of the spool 321. The ring 326 secures the valve stopper 325 in the axial direction. It is noted that the ring 326 is secured on the one side of the spool 321 whereas the above-described collar 322 is secured on the other side of the spool 321. Thus, the second collar 323, the preset valve 324, and the valve stopper 325, which are clamped between the spool 321 and the ring 326, are secured to the spool 321. Therefore, the spool 321, the collar 322, the second collar 323, the preset valve 324, the valve stopper 325, and the ring 326 are integrally moved in the axial direction when receiving the load from the transmission member 22, as described below.

The check valve unit 33 includes a check valve seat 331, a check valve 332, a holding bolt 333, a nut 334, and a lock nut 335. The check valve 332 is disposed on the other side of the check valve seat 331. The holding bolt 333 and the nut 334 hold these elements. The lock nut 335 is disposed on the one side of the check valve seat 331.

The check valve seat 331 is an approximately disk-shaped member. The check valve seat 331 has an end portion on the other side that engages with a stepped portion 31C formed on the inner circumference of the piston housing 31.

The check valve seat 331 also includes an opening 331H and a plurality of oil passages 331R. The opening 331H is formed in the center. The oil passages 331R are formed in the axial direction. The spool 321 and the second collar 323 are inserted in the opening 331H. The oil passages 331R form a passage of the oil between the other-side oil chamber P1 and the intermediate oil chamber P2.

The check valve 332 is a disk-shaped metal plate having a bolt hole 332B in the center in which the spool 321 and the second collar 323 are inserted. The check valve 332 is pressed against an end portion of the check valve seat 331 on the other side though the holding bolt 333. The check valve 332 has such an inner diameter and an outer diameter as to cover end portions of the oil passages 331R of the check valve seat 331 on the other side.

The holding bolt 333 and the nut 334 clamp and hold the check valve seat 331 and the check valve 332.

The lock nut 335 includes a thread portion on the outer circumference that is fitted in a thread groove formed in the inner circumference of the piston housing 31. The lock nut 335 presses the check valve seat 331 from the one side to the stepped portion 31C on the other side. The lock nut 335 secures the check valve seat 331 in the axial direction to secure the whole check valve unit 33.

The damping unit 40 includes the valve seat 41, the damping valve 42 (control means, control member), the press member 43 (contact member), a holding bolt 44, and a nut 45. The valve seat 41 includes a plurality of oil passages. The damping valve 42 is disposed on the other side of the valve seat 41. The press member 43 is disposed on the other side of the damping valve 42. The holding bolt 44 and the nut 45 hold these elements.

The valve seat 41 is a bottomed, hollow cylindrical member including an opening 41H, which is open toward the one side. The valve seat 41 also includes a stepped portion 41C on the outer circumference. The valve seat 41 further includes a bolt hole 413, the first oil passages 411, and the second oil passages 412. The bolt hole 413 is formed in the axial direction to have the holding bolt 44 inserted in the bolt hole 413. The first oil passages 411 are formed in the axial direction outside of the bolt hole 413 in the radial direction. The second oil passages 412 are formed in the axial direction outside of the first oil passages 411 in the radial direction.

The opening 41H forms the reversing oil passage 41R, which is a space defined by the opening 41H and a depression 343 of the lock piece 34. The reversing oil passage 41R communicates a bolt opening 442, described later, of the holding bolt 44 with the first oil passages 411. The reversing oil passage 41R functions to reverse, for example, a flow direction of oil entering from the other side so as to make the oil flow to the other side.

As illustrated in FIG. 5, the stepped portion 41C is formed by making the outer diameter of the valve seat 41 on the one side larger than the outer diameter of the valve seat 41 on the other side. As illustrated in FIG. 4, the stepped portion 41C engages with a stopper ring 414 from the one side. The stopper ring 414 is fitted in a groove formed in the inner circumference of the piston housing 31.

As illustrated in FIG. 5, a plurality of first oil passages 411 and a plurality of second oil passages 412 are formed in the circumferential direction at regular intervals. End portions of the first oil passages 411 and the second oil passages 412 on the other side are arranged side by side in the radial direction on the other side of the valve seat 41.

The first oil passages 411 have a smaller cross-section than the second oil passages 412, and the number of the first oil passages 411 (for example, 12 in this embodiment) is larger than the number of the second oil passages 412. As illustrated in FIG. 4, the first oil passages 411 are communicable with the reversing oil passage 41R on the one side and communicable with the intermediate oil chamber P2 on the other side. The first oil passages 411 form a passage of oil that flows between the reversing oil passage 41R and the intermediate oil chamber P2 in accordance with an open and closed state of the damping valve 42.

As illustrated in FIG. 5, the second oil passages 412 have a larger cross-section than the first oil passages 411, and the number of the second oil passages 412 (for example, 6 in this embodiment) is smaller than the number of the first oil passages 411. As illustrated in FIG. 4, the second oil passages 412 are communicable with the one-side oil chamber P3 on the one side and communicable with the intermediate oil chamber P2 on the other side. The second oil passages 412 form a passage of oil that flows between the one-side oil chamber P3 and the intermediate oil chamber P2 in accordance with an open and closed state of the damping valve 42.

As illustrated in FIG. 5, the damping valve 42 is an annular metal plate having a bolt hole 42B in the center in which the holding bolt 44 is inserted. As illustrated in FIG. 4, the damping valve 42 is pressed against an end portion of the valve seat 41 on the other side by the holding bolt 44. The damping valve 42 has such an inner diameter and an outer diameter as to cover end portions of the first oil passages 411 and the second oil passages 412 of the valve seat 41 on the other side. The damping valve 42 opens and closes the first oil passages 411 and the second oil passages 412 in accordance with a flow of oil.

As illustrated in FIG. 5, the press member 43 is an approximately hollow cylindrical member. As illustrated in FIG. 4, the press member 43 is supported to be slidable in the axial direction by a guide portion 441, described later, of the holding bolt 44. The press member 43 includes a first press portion 431, a second press portion 432, and a contacted portion 433. The first press portion 431 and the second press portion 432 are on the one side and have a U-shaped cross-section. The contacted portion 433 is on the other side.

The first press portion 431 and the second press portion 432 are pressed to the other side of the damping valve 42. The first press portion 431 is at the position on the damping valve 42 that is opposed to the first oil passages 411. The second press portion 432 is at the position on the damping valve 42 that is opposed to the second oil passages 412. The contacted portion 433 has an outer diameter approximately equal to the outer diameter of the preset valve 324 and is in contact with the preset valve unit 32.

In this embodiment, the preset valve unit 32 is arranged in such a manner that the press member 43 applies a load to the damping valve 42 through the preset valve 324. Therefore, the load applied from the preset valve unit 32 causes the press member 43 to apply a predetermined load to the damping valve 42. In particular, in this embodiment, the damping valve 42 is constantly pressed by elasticity of the preset valve 324 through the press member 43.

The load that the preset valve unit 32 applies to the damping valve 42 through the press member 43 is changed to change damping force generated by the damping valve 42. Changeability of the damping force of the damping valve 42 will be described in detail below.

It is noted that, as illustrated in FIG. 5, the press member 43 includes a plurality of holes 434 that are open in the radial direction. These holes 434 form a passage of oil to make a space defined by the press member 43 and other elements communicate with the outside of the press member 43. When the press member 43 is moved to adjust the damping force, as described below, the movement of the press member 43 is prevented from being affected by a pressure difference of oil inside and outside the press member 43, and oil is supplied to a gap between the press member 43 and an element in contact with the press member 43 to decrease friction.

As illustrated in FIG. 4, the holding bolt 44 and the nut 45 clamp and hold the valve seat 41 and the damping valve 42. The holding bolt 44 includes the guide portion 441 and the bolt opening 442. The guide portion 441 has an outer diameter approximately equal to the inner diameter of the contacted portion 433 of the press member 43. The guide portion 441 guides the press member 43 to make it move in the axial direction. The bolt opening 442 is a through hole formed in the axial direction of the holding bolt 44. An end portion of the spool 321 on the one side is inserted in the bolt opening 442 on the other side. The bolt opening 442 communicates with the reversing oil passage 41R on the one side.

It is noted that in embodiment 1, the second oil passages 412 of the valve seat 41 function as "the first passages", and the first oil passages 411 and the reversing oil passage 41R of the valve seat 41 function as "the second passages".

As illustrated in FIG. 3(a) and FIG. 3(b), the lock piece 34 includes a protrusion 341 on the other side and a large-diameter portion 342 on the one side. The large-diameter portion 342 has an outer diameter larger than the outer diameter of the protrusion 341.

The protrusion 341 protrudes toward the one side in the axial direction. The protrusion 341 is inserted in the opening 41H of the valve seat 41. The protrusion 341 includes a depression 343 depressed in the axial direction to form the above-described reversing oil passage 41R. In this embodiment, the depression 343 has a surface facing the other side. When oil flows from the other side to the one side, this surface facing the other side reverses the oil flow toward the other side.

As illustrated in FIG. 3(a) and FIG. 3(b), the large-diameter portion 342 includes a plurality of oil passages 344 in the circumferential direction. The oil passages 344 form a passage of oil between the first oil chamber Y1 and the one-side oil chamber P3. The large-diameter portion 342 also includes a thread portion screwed on a thread groove formed on the piston housing 31.

As illustrated in FIG. 4, the lock piece 34 presses the valve seat 41 from the one side to the stopper ring 414 on the other side. The lock piece 34 secures the valve seat 41 to secure the whole damping unit 40 in the axial direction.

(Configuration and Function of Bottom Valve Portion 50)

Figure 6:
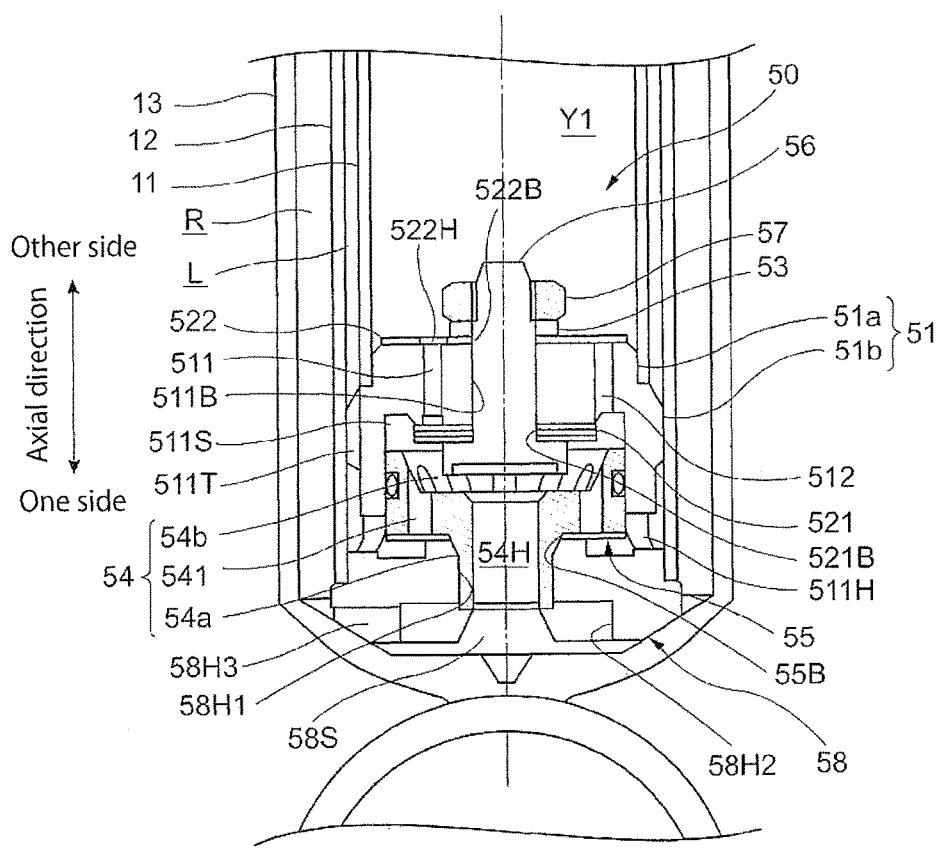
FIG. 6 is an enlarged view of a bottom valve portion and its vicinity indicated by arrow VI in FIG. 2.

FIG. 6 is an enlarged view of the bottom valve portion 50 and its vicinity indicated by arrow VI in FIG. 2.

As illustrated in FIG. 6, the bottom valve portion 50 includes a first valve body 51, a compression-side valve 521, a rebound-side valve 522, a valve stopper 53, a bolt 56, and a nut 57. The first valve body 51 includes a plurality of oil passages. The compression-side valve 521 is disposed on the one side of the first valve body 51. The rebound-side valve 522 is disposed on the other side of the first valve body 51. The valve stopper 53 is located on the other side of the rebound-side valve 522 to press the rebound-side valve 522. The bolt 56 and the nut 57 hold these elements. The bottom valve portion 50 also includes a second valve body 54 and a check valve 55. The second valve body 54 includes a plurality of oil passages and is disposed on the one side of the first valve body 51. The check valve 55 is disposed on the one side of the second valve body 54. The bottom valve portion 50 further includes a base member 58 disposed on the one side of the check valve 55.

The bottom valve portion 50 is disposed on the end portion of the hydraulic damper 1 on the one side to define the reservoir chamber R and the first oil chamber Y1.

The first valve body 51 includes a disk-shaped portion 51a and a hollow cylindrical portion 51b. The disk-shaped portion 51a is an approximately disk-shaped member. The hollow cylindrical portion 51b extends from the outer circumferential edge of the disk-shaped portion 51a toward the one side in the axial direction. The hollow cylindrical portion 51b has an approximately hollow cylindrical shape having an outer diameter larger than the outer diameter of the disk-shaped portion 51a. The first valve body 51 is attached to end portions of the cylinder 11 and the outer hollow cylindrical member 12 on the one side.

The disk-shaped portion 51a includes a bolt hole 511B, first oil passages 511, and second oil passages 512. The bolt hole 511B is formed in the axial direction to have the bolt 56 inserted in the bolt hole 511B. The first oil passages 511 are formed in the axial direction outside of the bolt hole 511B in the radial direction. The second oil passages 512 are formed in the axial direction outside of the first oil passages 511 in the radial direction. A plurality of first oil passages 511 and a plurality of second oil passages 512 are formed at regular intervals in the circumferential direction and allow the first oil chamber Y1 and a space 511S, described later, to communicate with each other.

The hollow cylindrical portion 51b has the space 511S inside of its cylindrical shape. The second valve body 54 is disposed in the space 511S. An end portion of the hollow cylindrical portion 51b on the one side has openings 511H that are open in the radial direction. The openings 511H are opposed to the outer hollow cylindrical member 12. The openings 511H form a passage of oil that flows from the inside of the space 511S to the communication passage L through a groove 511T.

The first valve body 51 includes the groove 511T formed in the axial direction in the outer circumference of the disk-shaped portion 51a and the hollow cylindrical portion 51b. The groove 511T is opposed to the communication passage L formed between the cylinder 11 and the outer hollow cylindrical member 12. The groove 511T allows oil to flow between opposite sides of the first valve body 51 at an end portion of the communication passage L on the one side.

The compression-side valve 521 includes a plurality of disk-shaped metal plates superposed on one another and having a bolt hole 521B in which the bolt 56 is inserted. The compression-side valve 521 has such an outer diameter as to close the first oil passages 511 and not to close the second oil passages 512. The compression-side valve 521 allows the first oil passages 511 of the first valve body 51 to be open and closed on the one side and allows the second oil passages 512 to be constantly open on the one side.

The rebound-side valve 522 is a disk-shaped metal plate having a bolt hole 522B in which the bolt 56 is inserted. The rebound-side valve 522 also includes oil holes 522H at positions corresponding to the first oil passages 511. The rebound-side valve 522 allows the first oil passages 511 of the first valve body 51 to be constantly open on the other side and allows the second oil passages 512 to be open and closed on the other side.

The second valve body 54 includes a protrusion 54a and a depression 54b. The protrusion 54a is formed on the one side, and the depression 54b is formed on the other side. The second valve body 54 is mounted with the depression 54b inserted in the space 511S of the first valve body 51.

The second valve body 54 also includes a through hole 54H and oil passages 541. The through hole 54H penetrates the protrusion 54a in the axial direction. The oil passages 541 are located outside of the through hole 54H in the radial direction and penetrates the second valve body 54 in the axial direction.

The check valve 55 is a disk-shaped metal plate having an opening 55B through which the protrusion 54a of the second valve body 54 is inserted. The check valve 55 allows the oil passages 541 of the second valve body 54 to be open and closed on the one side.

The base member 58 includes a first opening 58H1, a second opening 58H2, and a third opening 58H3. The first opening 58H1 is located and open on the other side. The second opening 58H2 is located and open on the one side. The third opening 58H3 is open in the radial direction on the one side.

The first opening 58H1 has an inner diameter approximately equal to the outer diameter of the protrusion 54a of the second valve body 54. The protrusion 54a is inserted in the first opening 58H1. The second opening 58H2 has an inner diameter larger than the inner diameter of the first opening 58H1. The second opening 58H2 and the bottom portion 14 of the damper case 13 form a space 58S in which oil flows. The second opening 58H2 communicates with the through hole 54H of the second valve body 54. The third opening 58H3 allows the second opening 58H2 and the reservoir chamber R to communicate with each other.

[Operation of Hydraulic Damper 1]

Figure 7:
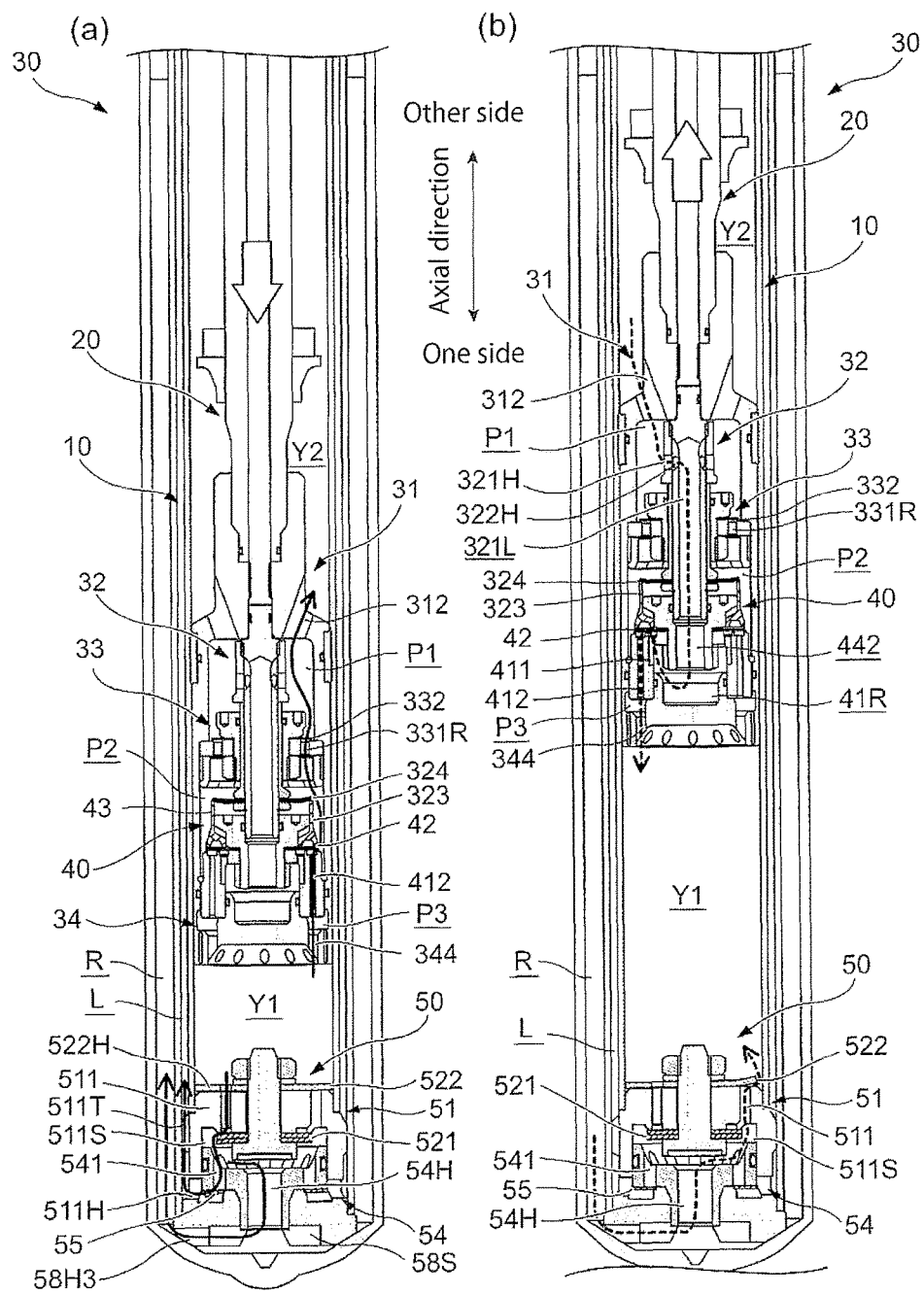
FIG. 7 illustrates an operation of the hydraulic damper.

FIG. 7(a) ((a) of FIG. 7) and FIG. 7(b) ((b) of FIG. 7) illustrate an operation of the hydraulic damper 1. FIG. 7(a) is a diagram illustrating an oil flow at the time of a compression stroke. FIG. 7(b) is a diagram illustrating an oil flow at the time of a rebound stroke.

First, the oil flow at the time of a compression stroke of the hydraulic damper 1 will be described.

As illustrated in FIG. 7(a), when the piston portion 30 is displaced toward the one side in the axial direction relative to the cylinder 11, as indicated by the outlined arrow, the displacement of the piston portion 30 causes oil in the first oil chamber Y1 to be pressed to increase the pressure in the first oil chamber Y1.

The pressure of oil in the first oil chamber Y1 increased by the displacement of the piston portion 30 toward the one side in the axial direction causes the oil to flow from the oil passage 344 of the lock piece 34 to the one-side oil chamber P3. The oil further flows from the one-side oil chamber P3 to the second oil passages 412 of the damping unit 40. Due to the pressure increased by the oil that has flowed in the second oil passages 412 in a specified direction from the one side toward the other side in the axial direction in this manner, the damping valve 42 resists the pressing force from the press member 43 and bends. Then, the oil in the second oil passages 412 forces the damping valve 42 open to flow to the intermediate oil chamber P2. Damping force is generated by resistance occurring when the oil flows in the second oil passages 412 and the damping valve 42.

The oil, which has flowed to the intermediate oil chamber P2, further flows into the oil passages 331R of the check valve unit 33. The check valve 332 is bent by the oil pressure increased in the oil passages 331R. Then, the oil in the oil passages 331R forces the check valve 332 open to make the oil flow to the other-side oil chamber P1. Further, the oil, which has flowed to the other-side oil chamber P1, passes the housing oil passages 312 of the piston housing 31 and flows to the second oil chamber Y2.

In the above-described manner, in accordance with the displacement of the piston portion 30 in one direction, the oil flow is generated from the first oil chamber Y1 to the second oil chamber Y2. The second oil passages 412 and the damping valve 42 apply resistance to and control this oil flow so as to generate the damping force.

In the bottom valve portion 50, the oil pressure in the first oil chamber Y1 is increased by the displacement of the piston portion 30 toward the one side in the axial direction. This pressure causes oil to pass the oil hole 522H of the rebound-side valve 522 and flow to the first oil passages 511 of the first valve body 51. The oil pressure increased in the first oil passages 511 bends the compression-side valve 521 and forces the compression-side valve 521 open to allow the oil to flow from the first oil passages 511 to the space 511S. Further, the oil, which has flowed to the space 511S, flows to the oil passages 541 of the second valve body 54. The oil pressure increased in the oil passages 541 causes the check valve 55 to bend. Then, the oil from the oil passages 541 forces the check valve 55 open, passes the openings 511H and the groove 511T, and flows to the communication passage L. The oil, which has flowed to the communication passage L, flows into the second oil chamber Y2 through the cylinder opening 11H (see FIG. 2) formed in the cylinder 11 on the other side.

Moreover, in the bottom valve portion 50, the oil, which has flowed to the space 511S, flows to the through hole 54H of the second valve body 54. The oil, which has flowed to the through hole 54H, flows to the space 58S. Further, from the space 58S, the oil passes the third opening 58H3 and flows to the reservoir chamber R.

Next, an oil flow at the time of a rebound stroke of the hydraulic damper 1 will be described.

As illustrated in FIG. 7(b), when the piston portion 30 is displaced to the other side in the axial direction relative to the cylinder portion 10, as indicated by the outlined arrow, the displacement of the piston portion 30 causes oil in the second oil chamber Y2 to be pressed to increase the pressure in the second oil chamber Y2.

It is noted that even if the oil moves in an attempt to pass the cylinder opening 11H (see FIG. 2) and flow through the communication passage L, the oil flow is in such a direction as to close the check valve 55, and consequently, the check valve 55 does not open the oil passages 541. Therefore, no oil flow is generated from the second oil chamber Y2 to the first oil chamber Y1 through the communication passage L.

The oil pressure in the second oil chamber Y2 increased by the displacement of the piston portion 30 toward the other side in the axial direction causes the oil to flow from the housing oil passages 312 of the piston housing 31 to the other-side oil chamber P1. Further, from the other-side oil chamber P1, the oil passes the collar openings 322H and the spool openings 321H and flows into the hollow portion 321L.

It is noted that the oil that has flowed to the other-side oil chamber P1 causes the pressure on the other side of the check valve 332 of the check valve unit 33 to be relatively higher than the pressure on the one side where the oil passages 331R are located. Therefore, the check valve 332 does not open the oil passages 331R, and consequently, no oil flow through the check valve unit 33 is generated.

Then, the oil, which has flowed into the hollow portion 321L, passes the bolt opening 442 and flows into the reversing oil passage 41R. The oil, which has flowed in the direction from the other side toward the one side in the axial direction in this manner, is reversed in the reversing oil passage 41R and flows from the one side toward the other side in the axial direction. Then, along the flow in the specified direction in the second oil passages 412 at the time of the compression stroke described above, the oil flows from the reversing oil passage 41R into the first oil passages 411 of the valve seat 41.

Then, the oil pressure increased in the first oil passages 411 causes the damping valve 42 to bend against the pressing force from the press member 43. The oil in the first oil passages 411 forces the damping valve 42 open to flow into the intermediate oil chamber P2. Damping force is generated by resistance occurring when the oil flows in the first oil passages 411 and the damping valve 42.

It is noted that the piston portion 30 is displaced in the other direction to generate negative pressure in the first oil chamber Y1. As described above, the first oil passages 411 cause the damping valve 42 to bend to open from the inside in the radial direction. This causes the damping valve 42 to open on the outside, and the other side of the second oil passages 412 is also open. Consequently, the oil, which has flowed into the intermediate oil chamber P2, flows into the adjacent second oil passages 412. Then, the oil flows from the second oil passages 412 to the one-side oil chamber P3. Further, the oil, which has flowed to the one-side oil chamber P3, passes through the oil passages 344 and flows into the first oil chamber Y1.

In the above-described manner, in accordance with the displacement of the piston portion 30 in the other direction, the oil flow is generated from the second oil chamber Y2 to the first oil chamber Y1. The first oil passages 411 and the damping valve 42 apply resistance to and control this oil flow so as to generate the damping force.

[Changeability of Damping Force]

Changeability of the damping force in the hydraulic damper 1 will now be described.

As illustrated in FIG. 2, for example, the displacement means 23 presses the transmission member 22 toward the one side by a predetermined amount. Then, as illustrated in FIG. 4, the displacement of the transmission member 22 toward the one side causes the spool 321 to move toward the one side. Accordingly, the preset valve 324 secured on the spool 321 is pressed toward the one side. Then, the preset valve 324 is elastically deformed to move the press member 43 toward the one side to make the press member 43 apply a load to the damping valve 42 from the other side toward the one side. In this embodiment, the damping valve 42 bends toward the other side to open the first oil passages 411 or the second oil passages 412. Therefore, the load applied to the damping valve 42 from the other side toward the one side by the press member 43 is increased to hinder the damping valve 42 from opening.

Alternatively, the displacement means 23 draws out the transmission member 22 toward the other side by a predetermined amount. Then, the displacement of the transmission member 22 toward the other side causes the spool 321 to move toward the other side. Accordingly, the load applied to the press member 43 by the preset valve 324 secured to the spool 321 is decreased. As a result, the load applied to the damping valve 42 by the press member 43 is decreased to facilitate opening of the damping valve 42.

In the above-described manner, in this embodiment, the transmission member 22 is displaced to change the load applied to the damping valve 42 by the press member 43. Thus, deformability of the damping valve 42 is adjusted to change the damping force in the hydraulic damper 1.

In this embodiment, the single damping valve 42 is made to generate the damping force in the oil flow in the rebound stroke and the compression stroke. The transmission member 22 and other elements are merely displaced only in one direction relative to the single damping valve 42 so as to comprehensively adjust the damping force in the flows in both of the directions in the rebound stroke and the compression stroke. This simplifies the device configuration for adjustment of the damping force. In this manner, in the hydraulic damper 1 in this embodiment, the adjustment of damping force in the piston portion 30 generated in accordance with the displacements of the piston portion 30 in both of the one direction and the other direction is implemented with the simplified configuration.

Moreover, in the hydraulic damper 1 in this embodiment, as illustrated in FIG. 3(a) and FIG. 3(b), assembly is readily performed by merely inserting the preset valve unit 32, the check valve unit 33, and the damping unit 40, described above, successively into the piston housing 31 from the one side and securing these elements by the lock piece 34. This improves assembly workability.

Furthermore, in this embodiment, it is possible to change the displacement amount of the transmission member 22 not at stages but continuously to change the magnitude of the damping force continuously. Also, in this embodiment, instead of, for example, transmission of the pressure of fluid or such material, force is transmitted among the substantial elements, namely, the transmission member 22, the preset valve unit 32, the press member 43, and the damping valve 42, so as to control the load for opening the damping valve 42. This increases response speed in control of the damping force.

In embodiment 1, the approximately annular damping valve 42 is employed. Thus, the areas of the damping valve 42 for receiving the pressure of oil in both of the rebound stroke and the compression stroke are made equal to each other. This facilitates setting of the damping force in both of the rebound stroke and the compression stroke.

In other words, since the damping valve 42 according to embodiment 1 can control the damping force in both of the rebound stroke and the compression stroke, it is possible to eliminate a check valve 76 in the hydraulic damper 1 according to embodiment 2, described later.

(Embodiment 2)

Next, the hydraulic damper 1 according to embodiment 2 will be described. It is noted that the hydraulic damper 1 in embodiment 2 has a different configuration in the piston portion 30 in embodiment 1. In the following description, similar elements to the elements in embodiment 1 will be denoted with the same reference numerals and will not be elaborated here.

Figure 8:
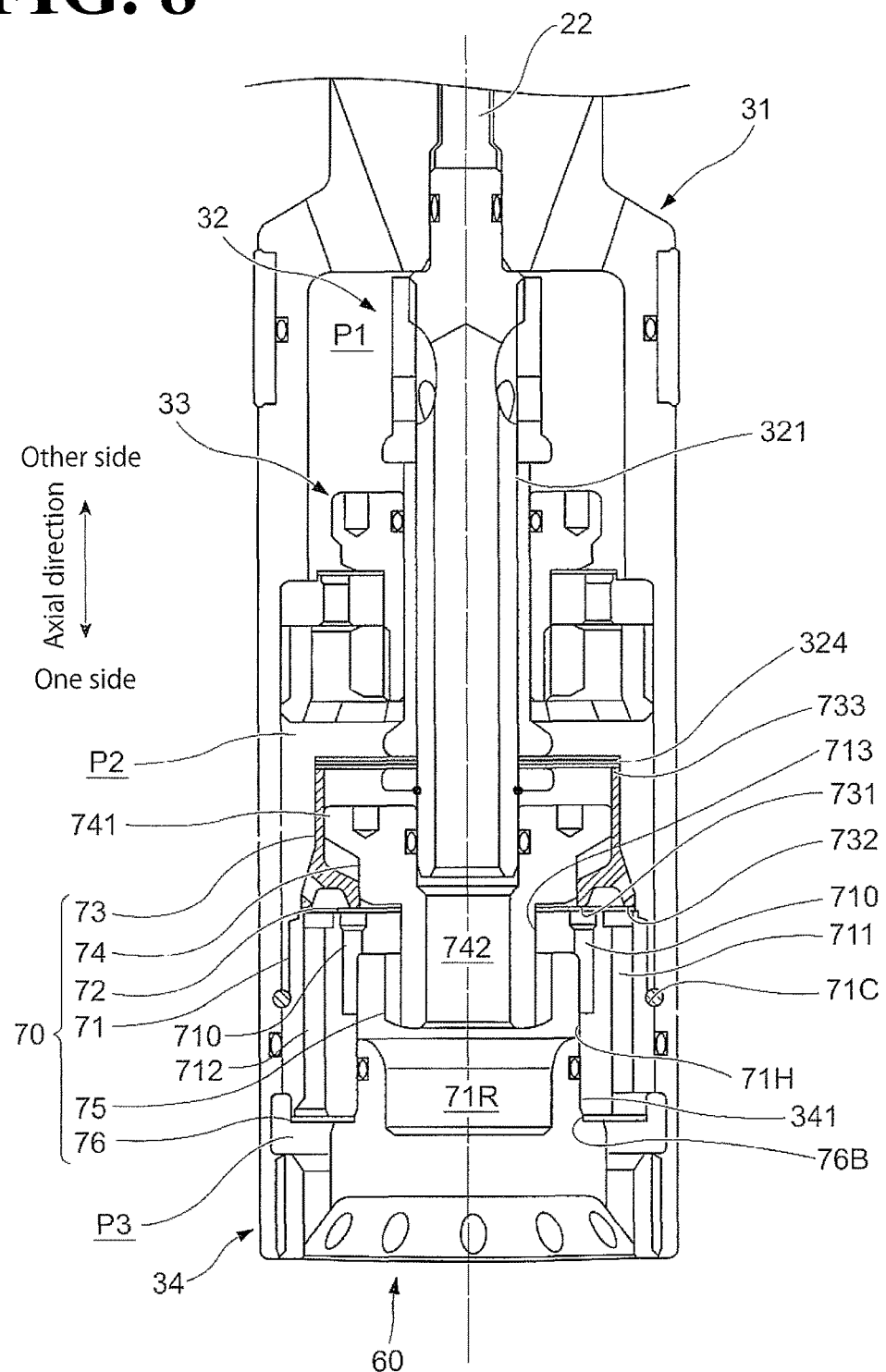
FIG. 8 illustrates a piston portion in embodiment 2.

FIG. 8 illustrates a piston portion 60 in embodiment 2.

Figure 9:
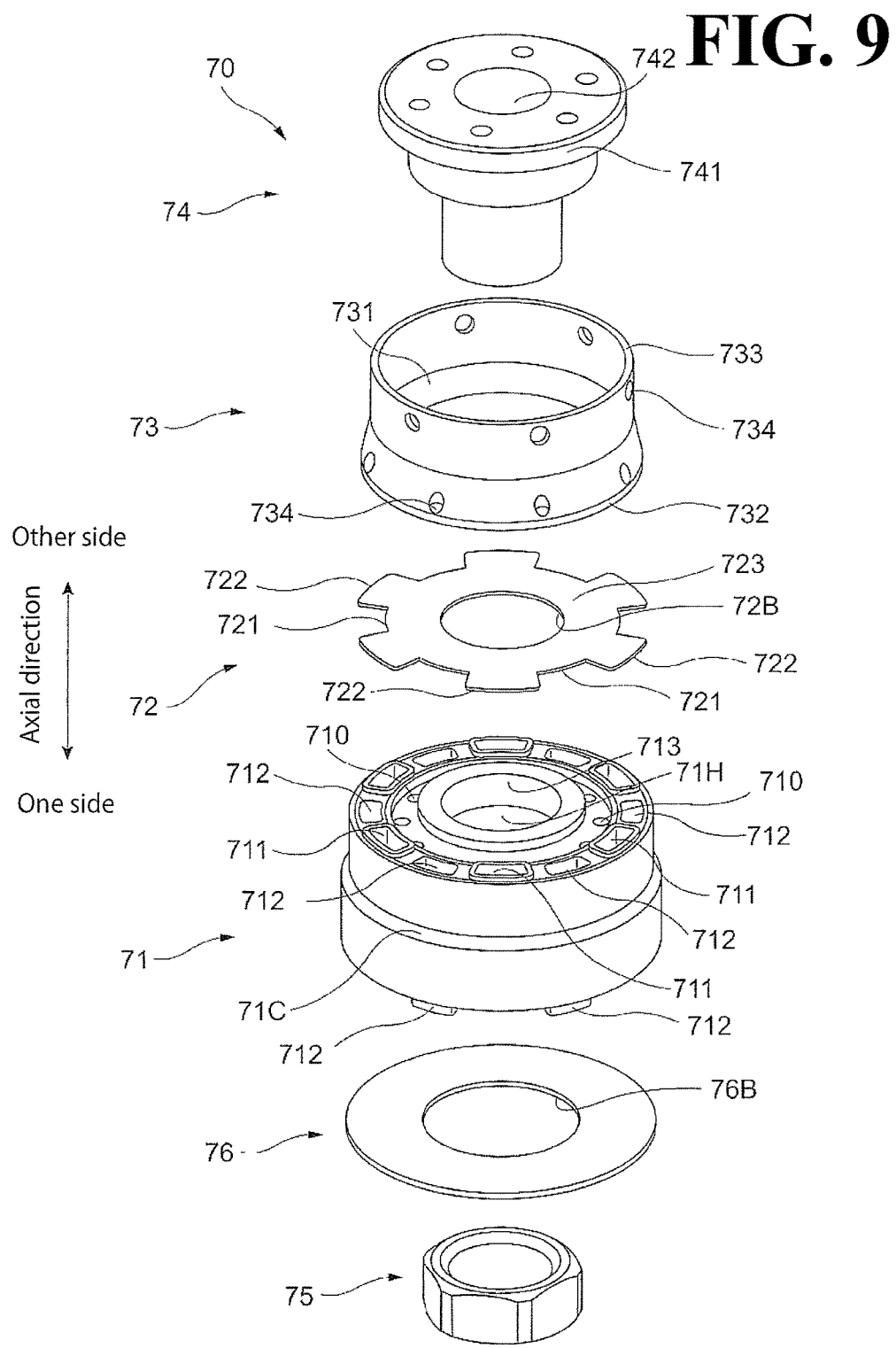
FIG. 9 is an exploded perspective view of a damping unit in embodiment 2.

FIG. 9 is an exploded perspective view of a damping unit 70 in embodiment 2.

As illustrated in FIG. 8, the piston portion 60 includes the piston housing 31, the preset valve unit 32, the check valve unit 33, the damping unit 70, and the lock piece 34. The damping unit 70 is disposed on the one side of the preset valve unit 32.

The damping unit 70 includes a valve seat 71, a damping valve 72 (control means, control member), a press member 73, a holding bolt 74, a nut 75, and a check valve 76. The valve seat 71 includes a plurality of oil passages. The damping valve 72 is disposed on the other side of the valve seat 71. The press member 73 is disposed on the other side of the damping valve 72. The holding bolt 74 and the nut 75 hold these elements. The check valve 76 is disposed on the one side of the valve seat 71.

The valve seat 71 is a bottomed, hollow cylindrical member having an opening 71H inside, which is open toward the one side. The valve seat 71 also includes a stepped portion 71C on the outer circumference. It is noted that the opening 71H and the stepped portion 71C have functions similar to the functions of the opening 41H and the stepped portion 41C in embodiment 1. The opening 71H forms a reversing oil passage 71R, which is a space defined by the opening 71H and the depression 343 of the lock piece 34, described later.

The valve seat 71 further includes a bolt hole 713, inner oil passages 710, first oil passages 711, and second oil passages 712. The bolt hole 713 is formed in the axial direction to have the holding bolt 74 inserted in the bolt hole 713. The inner oil passages 710 are formed in the axial direction outside of the bolt hole 713 in the radial direction. The first oil passages 711 and the second oil passages 712 are formed in the axial direction further outside of the inner oil passages 710 in the radial direction. The first oil passages 711 and the second oil passages 712 are arranged at an approximately equal distance from the center in the radial direction.

As illustrated in FIG. 9, a plurality of inner oil passages 710 are formed at regular intervals in the circumferential direction. A plurality of first oil passages 711 and a plurality of second oil passages 712 are also formed at regular intervals in the circumferential direction. The first oil passages 711 and the second oil passages 712 are arranged alternately in the circumferential direction.

The inner passages 710 have a cross-section smaller than the first oil passages 711 and the second oil passages 712, and the number of the inner passages 710 (for example, 12 in this embodiment) is larger than the number of the first oil passages 711 or the second oil passages 712. As illustrated in FIG. 8, the inner oil passages 710 communicate with the reversing oil passage 71R on the one side and are communicable with the intermediate oil chamber P2 on the other side. The inner oil passages 710 form a passage of oil that flows between the reversing oil passage 71R and the intermediate oil chamber P2 in accordance with an open and closed state of the damping valve 72.

The first oil passages 711 and the second oil passages 712 have cross-sections larger than the inner oil passages 710, and the number of the first oil passages 711 and the number of the second oil passages 712 (for example, 6 each in this embodiment) are smaller than the number of the inner oil passages 710.

As illustrated in FIG. 9, the first oil passages 711 on the one side are depressed in the axial direction from end portions of the second oil passages 712 on the one side, and the first oil passages 711 on the other side protrude in the axial direction from end portions of the second oil passages 712 on the other side. As illustrated in FIG. 8, the first oil passages 711 on the one side are communicable with the one-side oil chamber P3, and the first oil passages 711 on the other side communicate with the intermediate oil chamber P2. The first oil passages 711 form a passage of oil that flows between the one-side oil chamber P3 and the intermediate oil chamber P2 in accordance with an open and closed state of the damping valve 72.

As illustrated in FIG. 9, the second oil passages 712 on the one side protrude in the axial direction from end portions of the first oil passages 711 on the one side, and the second oil passages 712 on the other side are depressed in the axial direction from end portions of the first oil passages 711 on the other side. As illustrated in FIG. 8, the second oil passages 712 on the one side communicate with the one-side oil chamber P3, and the second oil passages 712 on the other side are communicable with the intermediate oil chamber P2. The second oil passages 712 form a passage of oil that flows between the one-side oil chamber P3 and the intermediate oil chamber P2 in accordance with an open and closed state of the damping valve 72.

It is noted that in embodiment 2, the first oil passages 711 of the valve seat 71 function as "the first passages", and the inner oil passages 710 and the reversing oil passage 71R of the valve seat 71 function as "the second passages".

As illustrated in FIG. 9, the damping valve 72 is a disk-shaped metal plate having a bolt hole 72B in the center in which the holding bolt 74 is inserted. The damping valve 72 includes depressions 721, protrusions 722, and an annular portion 723. The depressions 721 and the protrusions 722 are formed in an outer circumferential portion of the damping valve 72. The annular portion 723 is disposed inside of the depressions 721 and the protrusions 722 in the radial direction.

As illustrated in FIG. 9, the depressions 721 of the damping valve 72 are opposed to the second oil passages 712. The protrusions 722 have such an outer diameter as to cover the end portions of the first oil passages 711 on the other side. The width of the annular portion 723 in the radial direction is set to cover end portions of the inner oil passages 710 on the other side.

The damping valve 72 is pressed against an end portion of the valve seat 71 on the other side by the holding bolt 74. The damping valve 72 constantly opens the end portions of the second oil passages 712 on the other side, and opens and closes the end portions of the inner oil passages 710 and the first oil passages 711 on the other side in accordance with an oil flow.

As illustrated in FIG. 9, the check valve 76 is a disk-shaped metal plate having a bolt hole 76B in the center in which the protrusion 341 of the lock piece 34 is inserted. The check valve 76 has such an outer diameter as to cover the end portions of the second oil passages 712 of the valve seat 41 on the one side. The check valve 76 is pressed against an end portion of the valve seat 71 on the one side by the lock piece 34. The check valve 76 opens and closes the end portions of the second oil passages 712 on the one side in accordance with an oil flow. The check valve 76 constantly opens the end portions of the first oil passages 711 on the one side that are depressed in the axial direction on the one side of the valve seat 71.

The press member 73 is an approximately hollow cylindrical member. The press member 73 is supported to be slidable in the axial direction by a guide portion 741, described later, of the holding bolt 74. As illustrated in FIG. 9, the press member 73 includes a first press portion 731, a second press portion 732, a contacted portion 733, and a plurality of holes 734. The first press portion 731 and the second press portion 732 have a U-shaped cross-section on the one side. The contacted portion 733 is disposed on the other side. The holes 734 are open in the radial direction.

The first press portion 731 and the second press portion 732 are portions pressed against the other side of the damping valve 72. The first press portion 731 is at the position on the damping valve 72 that is opposed to the inner oil passages 710. The second press portion 732 is at the position on the damping valve 72 that is opposed to the first oil passages 711 and the second oil passages 712. The contacted portion 733 has an outer diameter approximately equal to the outer diameter of the preset valve 324 and is a portion in contact with the preset valve unit 32.

The holding bolt 74 and the nut 75 clamp and hold the valve seat 71 and the damping valve 72. The holding bolt 74 includes the guide portion 741 and a bolt opening 742. The guide portion 741 has an outer diameter approximately equal to the inner diameter of the contacted portion 733 of the press member 73. Inside of the press member 73, the guide portion 741 guides the press member 73 slidably in the axial direction. The bolt opening 742 is a through hole formed in the axial direction of the holding bolt 74. An end portion of the spool 321 on the one side is inserted in the other side of the bolt opening 742. The one side of the bolt opening 742 communicates with the reversing oil passage 71R.

[Operation of Hydraulic Damper 1 in Embodiment 2]

Figure 10:
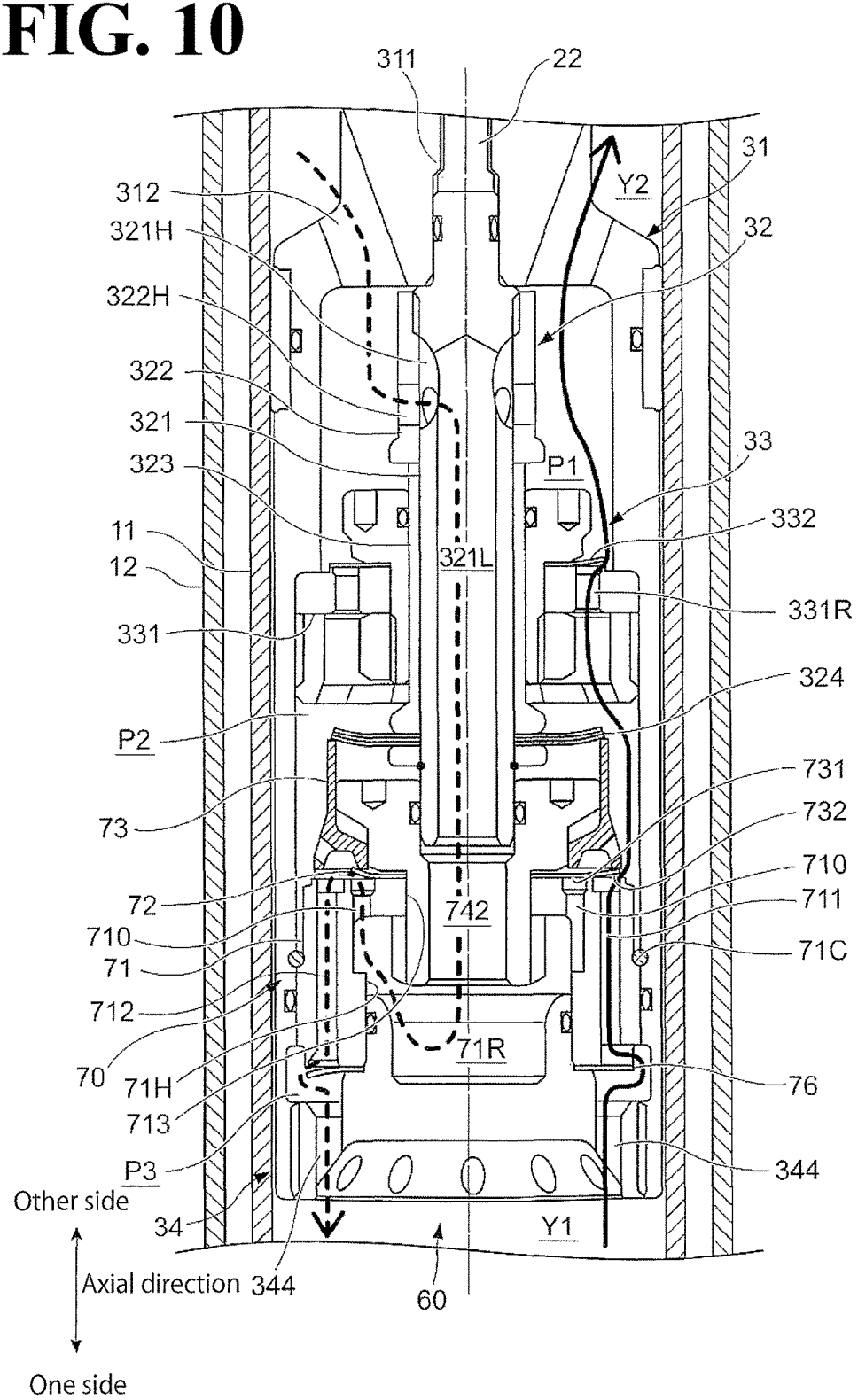
FIG. 10 illustrates an operation of a hydraulic damper in embodiment 2.

FIG. 10 illustrates an operation of the hydraulic damper 1 in embodiment 2.

In the following description, oil flows in the piston portion 60, which has a different configuration from embodiment 1, will be mainly described. In FIG. 10, an oil flow at the time of a compression stroke is indicated by the solid-line arrow, and an oil flow at the time of a rebound stroke is indicated by the dashed-line arrow.

First, the oil flow at the time of a compression stroke of the hydraulic damper 1 will be described.

The oil pressure in the first oil chamber Y1 is increased by the displacement of the piston portion 60 toward the one side in the axial direction. This oil pressure causes the oil to flow from the oil passages 344 of the lock piece 34 to the one-side oil chamber P3. The oil further flows from the one-side oil chamber P3 toward the first oil passages 711 of the damping unit 70. Due to the pressure increased by the oil that has flowed in the first oil passages 711 in a specified direction from the one side toward the other side in the axial direction in this manner, the protrusions 722 (see FIG. 9) of the damping valve 72 bend against the pressing force received from the press member 43. The oil in the first oil passages 711 forces the damping valve 72 open to flow into the intermediate oil chamber P2. Damping force is generated by resistance occurring when the oil flows in the first oil passages 711 and the damping valve 72.

It is noted that of the oil that has flowed into the one-side oil chamber P3, the oil that has flowed into the second oil passages 712 flows in such a direction as to close the check valve 76. Therefore, the check valve 76 keeps closing the second oil passages 712, and no oil flow is generated in the second oil passages 712.

The oil flow after that is similar to the oil flow in embodiment 1. In the above-described manner, in accordance with a displacement of the piston portion 30 in one direction, the oil flow is generated from the first oil chamber Y1 to the second oil chamber Y2. The first oil passages 711 and the damping valve 72 apply resistance to and control this oil flow so as to generate the damping force.

Next, the oil flow at the time of a rebound stroke of the hydraulic damper 1 will be described.

The oil pressure in the second oil chamber Y2 is increased by a displacement of the piston portion 60 toward the other side in the axial direction. This oil pressure causes the oil to flow from the housing oil passages 312 of the piston housing 31 toward the other-side oil chamber P1. Further, from the other-side oil chamber P1, the oil passes through the collar openings 322H and the spool openings 321H and flows into the hollow portion 321L.

The oil, which has flowed into the hollow portion 321L, flows into the reversing oil passage 71R through the bolt opening 742. The oil, which has flowed in a direction from the other side to the one side in the axial direction in this manner, is reversed in the reversing oil passage 71R and flows in a direction from the one side to the other side in the axial direction. Along the flow in the specified direction in the first oil passages 711 at the time of the compression stroke described above, the oil flows from the reversing oil passage 71R to the inner oil passages 710 of the valve seat 71.

The annular portion 723 (see FIG. 9) of the damping valve 72 receives the oil pressure increased in the inner oil passages 710. Then, the damping valve 72 bends against the pressing force from the press member 73. The oil in the inner oil passages 710 forces the damping valve 72 open to flow into the intermediate oil chamber P2. Damping force is generated by resistance occurring when the oil flows in the inner oil passages 710 and the damping valve 72.

The displacement of the piston portion 60 in the other direction causes negative pressure in the first oil chamber Y1. Meanwhile, since the oil pressure in the other-side oil chamber P1 is increased, the check valve 332 does not open. The depressions 721 (see FIG. 9) of the damping valve 72 are opposed to the end portions of the second oil passages 712 on the other side, and the other side of the second oil passages 712 is not closed. Therefore, due to the increased oil pressure in the intermediate oil chamber P2, the oil, which has flowed into the intermediate oil chamber P2, flows into the adjacent second oil passages 712. Then, the oil flows from the second oil passages 712 to the one-side oil chamber P3. The oil, which has flowed into the one-side oil chamber P3, further flows into the first oil chamber Y1 through the oil passages 344.

In the above-described manner, in accordance with the displacement of the piston portion 60 in the other direction, the oil flow is generated from the second oil chamber Y2 to the first oil chamber Y1. The inner oil passages 710 and the damping valve 72 apply resistance to and control this oil flow so as to generate the damping force.

It is noted that also in the hydraulic damper 1 to which embodiment 2 is applied, the transmission member 22 is displaced toward the one side to change the load applied to the damping valve 72 by the preset valve 324 and the press member 73. It is possible to comprehensively change the damping force in the flows in both of the directions of the rebound stroke and the compression stroke.

(Embodiment 3)

Next, the hydraulic damper 1 according to embodiment 3 will be described. It is noted that the hydraulic damper 1 in embodiment 3 has a different configuration in the piston portion 30 in embodiment 1. In the following description, similar elements to the elements in embodiment 1 will be denoted with the same reference numerals and will not be elaborated here.

Figure 11:
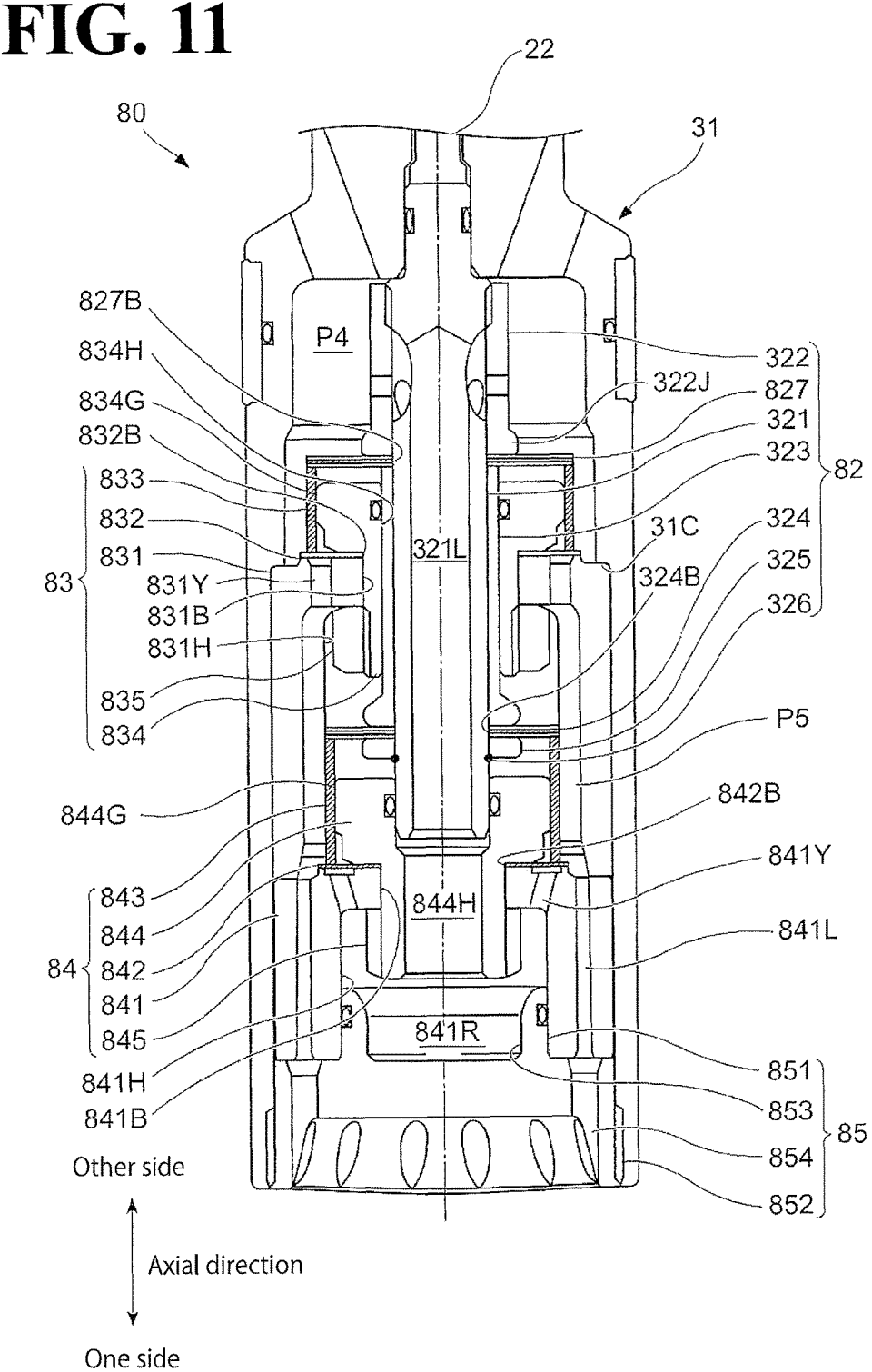
FIG. 11 illustrates a piston portion in embodiment 3.

FIG. 11 illustrates a piston portion 80 in embodiment 3.

As illustrated in FIG. 11, the piston portion 80 includes the piston housing 31, a preset valve unit 82, a first damping unit 83, a second damping unit 84, and a lock piece 85. The first damping unit 83 is disposed on the one side of the preset valve unit 82. The second damping unit 84 is disposed on the other side of the preset valve unit 82.

In the piston portion 80 in embodiment 3, in the piston housing 31, the preset valve unit 82 and the first damping unit 83 define an other-side oil chamber P4, and the preset valve unit 82, the first damping unit 83, and the second damping unit 84 define an intermediate oil chamber P5.

The preset valve unit 82 has a basic configuration similar to the basic configuration of the preset valve unit 32 in embodiment 1. The preset valve unit 82 in embodiment 3 includes the spool 321, the collar 322, the second collar 323, the preset valve 324, the valve stopper 325, the ring 326, and a second preset valve 827 (elastic member) between the spool 321 and the collar 322.

The second preset valve 827 includes a plurality of disk-shaped metal plates superposed on one another, and an opening 827B in which the spool 321 is inserted is formed in the metal plates. The second preset valve 827 is clamped between the contact portion 322J of the collar 322 and an end portion of the second collar 323 on the other side and secured to the spool 321.

The first damping unit 83 includes a valve seat 831, a compression-side damping valve 832 (control means), a press member 833 (contact member), a holding bolt 834, and a nut 835. The valve seat 831 includes a plurality of oil passages. The compression-side damping valve 832 is disposed on the other side of the valve seat 831. The press member 833 is disposed on the other side of the compression-side damping valve 832. The holding bolt 834 and the nut 835 hold these elements.

The valve seat 831 is a bottomed, hollow cylindrical member having an opening 831H inside, which is open toward the one side. The valve seat 831 includes a corner portion 831C on the outer circumference. The valve seat 831 further includes a bolt hole 831B and oil passages 831Y. The bolt hole 831B is formed in the axial direction to have the holding bolt 834 inserted in the bolt hole 831B. The oil passages 831Y are formed in the axial direction outside of the bolt hole 831B in the radial direction.

The opening 831H forms the intermediate oil chamber P5. The corner portion 831C is a portion to secure the valve seat 831 in the piston housing 31 in the axial direction.

A plurality of oil passages 831Y are formed at regular intervals in the circumferential direction. The oil passages 831Y allow the oil to flow between the other-side oil chamber P4 and the intermediate oil chamber P5.

The compression-side damping valve 832 is a disk-shaped metal plate having a bolt hole 832B in the center in which the holding bolt 834 is inserted. The compression-side damping valve 832 is pressed against an end portion of the valve seat 831 on the other side through the holding bolt 834. As illustrated in FIG. 11, the compression-side damping valve 832 has such an outer diameter as to cover end portions of the oil passages 831Y of the valve seat 831 on the other side. The compression-side damping valve 832 opens and closes the other side of the oil passages 831Y in accordance with an oil flow.

The press member 833 is an approximately hollow cylindrical member. The press member 833 is supported slidably in the axial direction by a guide portion 834G, described later, of the holding bolt 834. The press member 833 is in contact with the compression-side damping valve 832 on the one side and is pressed against the second preset valve 827 on the other side.

The holding bolt 834 and the nut 835 clamp and hold the valve seat 831 and the compression-side damping valve 832. The holding bolt 834 includes the guide portion 834G and a bolt opening 834H. The guide portion 834G has an outer diameter approximately equal to the inner diameter of the press member 833. The guide portion 834G guides the press member 833 movably in the axial direction. The bolt opening 834H is a through hole formed in the axial direction of the holding bolt 834. The end portion of the spool 321 on the one side is inserted in the bolt opening 834H on the other side.

The second damping unit 84 includes a valve seat 841, a rebound-side damping valve 842 (control means), a press member 843 (contact member), a holding bolt 844, and a nut 845. The valve seat 841 includes a plurality of oil passages. The rebound-side damping valve 842 is disposed on the other side of the valve seat 841. The press member 843 is disposed on the other side of the rebound-side damping valve 842. The holding bolt 844 and the nut 845 hold these elements.

The valve seat 841 is a bottomed, hollow cylindrical member having an opening 841H inside, which is open toward the one side. The valve seat 841 includes a bolt hole 841B, oil passages 841Y, and outer oil passages 841L. The bolt hole 841B is formed in the axial direction to have the holding bolt 844 inserted in the bolt hole 841B. The oil passages 841Y are formed in the axial direction outside of the bolt hole 841B in the radial direction. The outer oil passages 841L are formed in the axial direction further outside of the oil passages 841Y in the radial direction.

The opening 841H forms a reversing oil passage 841R, which is a space defined by the opening 841H and a depression 853 of the lock piece 85. The reversing oil passage 841R communicates a bolt opening 844H, described later, of the holding bolt 844 with the oil passages 841Y.

A plurality of oil passages 841Y are formed at regular intervals in the circumferential direction. The oil passages 841Y allow the oil to flow between the intermediate oil chamber P5 and the reversing oil passage 841R.

It is noted that in embodiment 3, the oil passages 831Y of the first damping unit 83 function as "the first passages", and the oil passages 841Y and the reversing oil passage 841R of the second damping unit 84 function as "the second passages".

The rebound-side damping valve 842 is a disk-shaped metal plate having a bolt hole 842B in the center in which the holding bolt 844 is inserted. The rebound-side damping valve 842 is pressed against an end portion of the valve seat 841 on the other side through the holding bolt 844. As illustrated in FIG. 11, the rebound-side damping valve 842 has such an outer diameter as to cover end portions of the oil passages 841Y of the valve seat 841 on the other side and not to cover the outer oil passages 841L. The rebound-side damping valve 842 opens and closes the other side of the oil passages 841Y in accordance with an oil flow.

The press member 843 is an approximately hollow cylindrical member. The press member 843 is pressed slidably in the axial direction by a guide portion 844G, described later, of the holding bolt 844. The press member 843 is in contact with the rebound-side damping valve 842 on the one side and is pressed against the preset valve 324 on the other side.

The holding bolt 844 and the nut 845 clamp and hold the valve seat 841 and the rebound-side damping valve 842. The holding bolt 844 includes the guide portion 844G and a bolt opening 844H. The guide portion 844G has an outer diameter approximately equal to the inner diameter of the press member 843. The guide portion 844G guides the press member 843 movably in the axial direction. The bolt opening 844H is a through hole formed in the axial direction of the holding bolt 844. An end portion of the spool 321 on the one side is inserted in the other side of the bolt opening 844H.

The lock piece 85 includes a protrusion 851 on the other side and a large-diameter portion 852 on the one side. The large-diameter portion 852 has a larger outer diameter than the protrusion 851.

The protrusion 851 protrudes toward the one side in the axial direction. The protrusion 851 is inserted in the opening 841H of the valve seat 841. The protrusion 851 includes a depression 853 depressed in the axial direction to form the reversing oil passage 841R described above.

As illustrated in FIG. 11, the large-diameter portion 852 includes a plurality of oil passages 854. The plurality of oil passages 854 are arranged at approximately regular intervals in the circumferential direction. The oil passages 854 form a passage of oil between the first oil chamber Y1 and the oil passages 841Y of the second damping unit 84. The large-diameter portion 852 includes a thread portion screwed on a thread groove formed on the piston housing 31.

The lock piece 85 presses the valve seat 841 from the one side toward the valve seat 831 of the first damping unit 83 on the other side. The lock piece 85 secures the valve seat 841 to secure the whole second damping unit 84 in the axial direction.

[Operation of Hydraulic Damper 1 in Embodiment 3]

Figure 12:
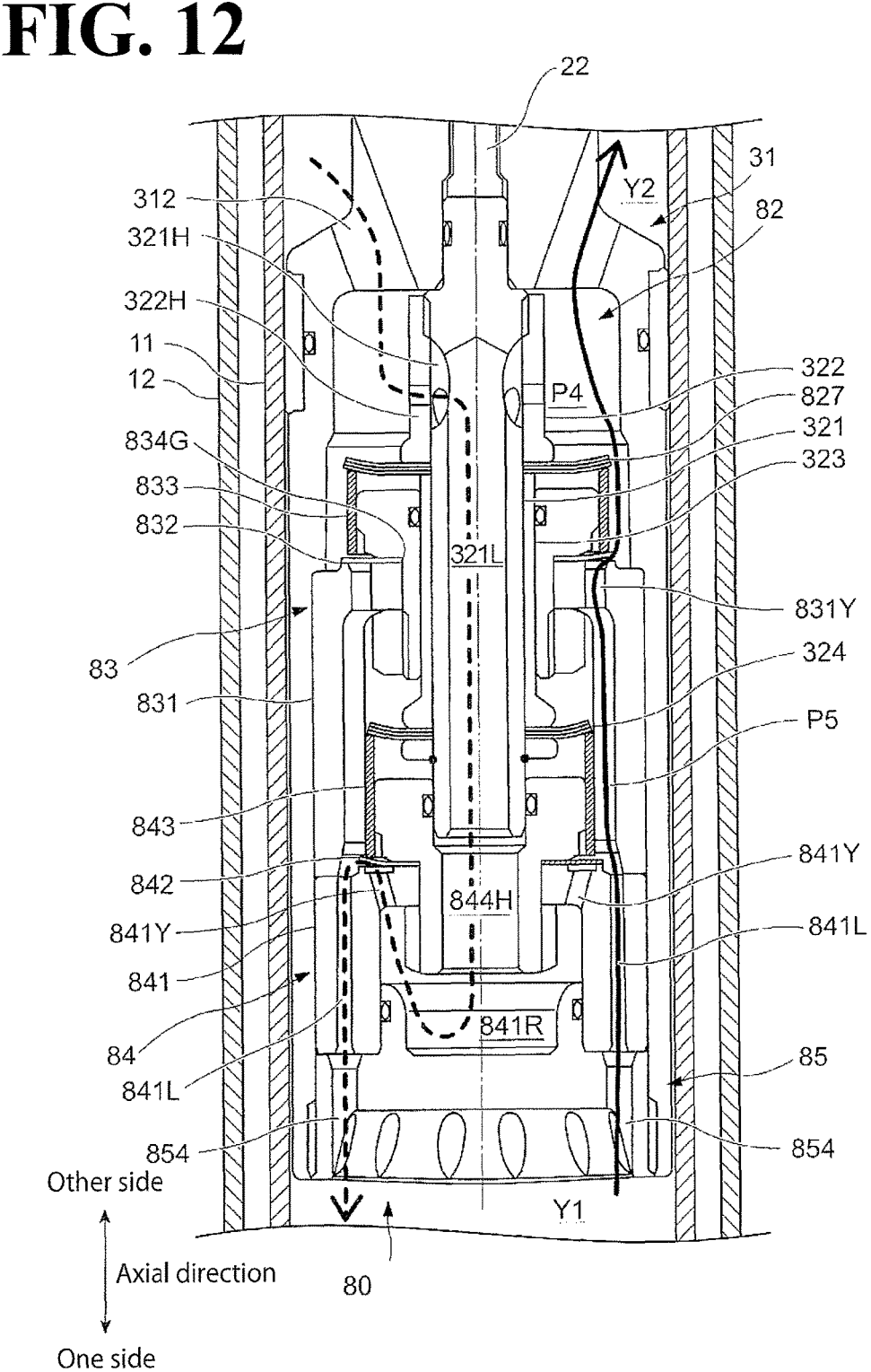
FIG. 12 illustrates an operation of a hydraulic damper in embodiment 3.

FIG. 12 illustrates an operation of the hydraulic damper 1 in embodiment 3.

In the following description, oil flows in the piston portion 80, which has a different configuration from embodiment 1, will be mainly described. In FIG. 12, an oil flow at the time of a compression stroke is indicated by the solid-line arrow, and an oil flow at the time of a rebound stroke is indicated by the dashed-line arrow.

First, the oil flow at the time of a compression stroke of the hydraulic damper 1 will be described.

The oil pressure in the first oil chamber Y1 is increased by the displacement of the piston portion 80 toward the one side in the axial direction. This oil pressure causes the oil to flow from the oil passages 854 of the lock piece 85 to the outer oil passages 841L. Then, the oil flows from the outer oil passages 841L to the intermediate oil chamber P5. The oil further flows from the intermediate oil chamber P5 to the oil passages 831Y of the first damping unit 83.

Due to the pressure increased by the oil that has flowed into the oil passages 831Y in a specified direction from the one side to the other side in the axial direction in this manner, the compression-side damping valve 832 bends against the pressing force from the press member 833. Then, the oil in the oil passages 831Y forces the compression-side damping valve 832 open to flow into the other-side oil chamber P4. Damping force is generated by resistance occurring when the oil flows in the oil passages 831Y and the compression-side damping valve 832.

It is noted that the oil pressure increased in the intermediate oil chamber P5 is exerted in such a direction as to close the rebound-side damping valve 842 of the second damping unit 84. Therefore, the rebound-side damping valve 842 keeps closing the oil passages 841Y, and no oil flow is generated through the oil passages 841Y.

The oil, which has flowed into the other-side oil chamber P4, flows to the second oil chamber Y2 through the housing oil passages 312 of the piston housing 31.

In the above-described manner, the displacement of the piston portion 80 in one direction causes the oil to flow from the first oil chamber Y1 to the second oil chamber Y2. The oil passages 831Y and the compression-side damping valve 832 apply resistance to and control this oil flow so as to generate the damping force.

Next, the oil flow at the time of a rebound stroke of the hydraulic damper 1 will be described.

The oil pressure is increased by the displacement of the piston portion 80 toward the other side in the axial direction. This oil pressure causes the oil to flow from the housing oil passages 312 of the piston housing 31 to the other-side oil chamber P4. From the other-side oil chamber P4, the oil passes through the collar openings 322H and the spool openings 321H and flows to the hollow portion 321L.

The oil, which has flowed into the hollow portion 321L, flows to the reversing oil passage 841R through the bolt opening 844H. The oil, which has flowed in a direction from the other side to the one side in the axial direction in this manner, is reversed in the reversing oil passage 841R and flows in a direction from the one side to the other side in the axial direction. Along the flow in the specified direction in the outer oil passages 841L at the time of the compression stroke described above, the oil flows from the reversing oil passage 841R to the oil passages 841Y of the second damping unit 84.

The oil pressure increased in the oil passages 841Y causes the rebound-side damping valve 842 to bend against the pressing force from the press member 843. Then, the oil in the oil passages 841Y forces the rebound-side damping valve 842 open to flow into the intermediate oil chamber P5. Damping force is generated by resistance occurring when the oil flows in the oil passages 841Y and the rebound-side damping valve 842.

The oil pressure in the other-side oil chamber P4 is increased by the displacement of the piston portion 80 in the other direction, and the compression-side damping valve 832 of the first damping unit 83 does not open. Consequently, the oil, which has flowed into the intermediate oil chamber P5, flows into the outer oil passages 841L. Then, the oil flows from the outer oil passages 841L into the oil passages 854. The oil further flows from the oil passages 854 to the first oil chamber Y1.

In the above-described manner, in accordance with the displacement of the piston portion 80 in the other direction, the oil flow is generated from the second oil chamber Y2 to the first oil chamber Y1. The oil passages 841Y and the rebound-side damping valve 842 apply resistance to and control this oil flow so as to generate the damping force.

It is noted that also in the hydraulic damper 1 to which embodiment 3 is applied, the transmission member 22 displaces the preset valve unit 82 in one direction so as to change the load applied to the compression-side damping valve 832 by the press member 833 through the preset valve 324 and to change the load applied to the rebound-side damping valve 842 by the press member 843 through the second preset valve 827. In this manner, the preset valve unit 82 is merely displaced in a single direction to comprehensively adjust the damping force in the flows in both of the directions of the rebound stroke and the compression stroke.

It is noted that in embodiment 1, for example, the spool 321 applies a load to the press member 43 through an elastic member such as the preset valve 324. Applying the load to the press member 43 through the elastic member such as the preset valve 324, however, should not be construed in a limiting sense.

In the hydraulic damper 1 in embodiment 1, however, the preset valve 324, for example, is provided to apply a predetermined load to the press member 43 by elasticity of the preset valve 324 itself even in a case where the displacement means 23, for example, applies no load to the transmission member 22. The load applied to the damping valve 42 by the press member 43 is made to be constantly equal to or larger than a predetermined force irrespective of outside conditions such as the displacement means 23 so as to stabilize the damping force of the damping valve 42.

Dimensional tolerances of the elements constituting the piston portion 30, for example, may cause gaps between the elements and may inversely cause the elements to be pressed into each other excessively to hinder control of pressing by a predetermined load. In view of this, in this embodiment, interposition of the preset valve 324 absorbs the dimensional tolerances so as to enhance reliability of damping force generation in the hydraulic damper 1.

It is noted that in embodiment 3, for example, the compression-side damping valve 832 to cause damping at the time of a compression stroke and the rebound-side damping valve 842 to cause damping at the time of a rebound stroke are provided as separate elements, and these valves are arranged at different positions in the axial direction. When the valves are provided as separate elements, however, arranging the valves at different positions in the axial direction should not be construed in a limiting sense.

For example, the valve to cause damping at the time of a compression stroke and the valve to cause damping at the time of a rebound stroke may be arranged at different positions in the radial direction, which is a direction intersecting the axis. Specifically, there are provided one ring-shaped valve open inside and another ring-shaped valve inside of the one valve. The another valve has an outer diameter smaller than the outer diameter of the one valve. The one valve and the another valve are arranged to control oil flows in the piston portion generated in accordance with displacements of the piston portion in one direction and in the other direction so as to generate the damping force. In this case, the length of the piston portion in the axial direction may be made smaller than in embodiment 3, for example.

(Embodiment 4)

Figure 13:
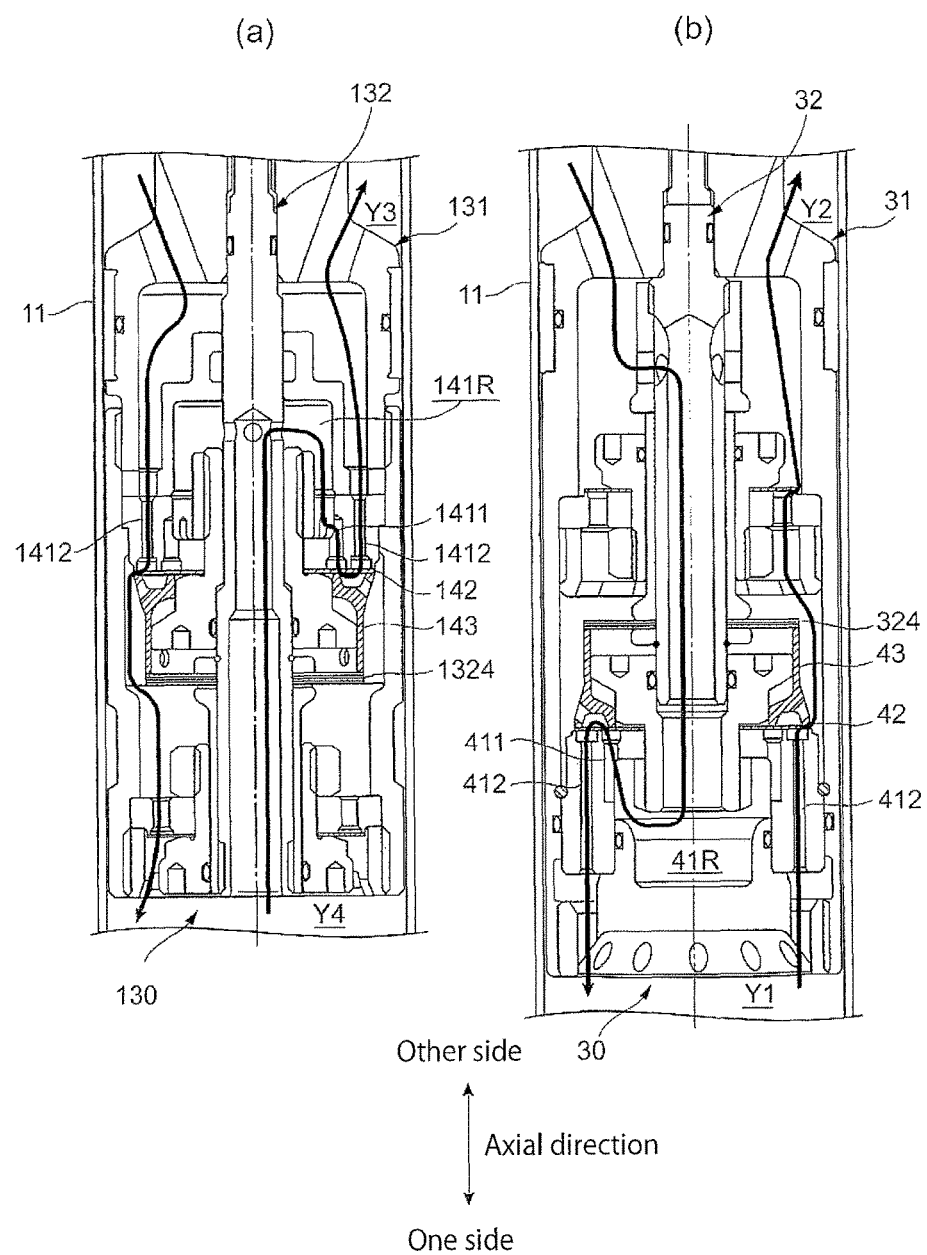
FIG. 13 illustrates a piston portion in embodiment 4.

FIG. 13 illustrates a piston portion 130 according to embodiment 4.

FIG. 13(a) ((a) of FIG. 13) is a whole view of the piston portion 130 in embodiment 4, and FIG. 13(b) ((b) of FIG. 13) is a whole view of the piston portion 30 in embodiment 1.

In embodiment 1 to embodiment 3 described above, in the piston portion 30 in embodiment 1, for example, illustrated in FIG. 13(b), the preset valve unit 32 is displaced by the displacement means 23 (see FIG. 1) from "the other side" (top side of FIG. 13) to "the one side" (bottom side of FIG. 13) in the axial direction in such a direction as to press the press member 43 and the damping valve 42. This, however, should not be construed in a limiting sense. For example, as in the piston portion 130 in embodiment 4, a displacement direction of a preset valve unit 132 may be reversed to the displacement direction of the preset valve unit 32 in embodiment 1 in such a manner that the preset valve unit 132 is drawn from "the one side" (bottom side of FIG. 13, for example) to "the other side" (top side of FIG. 13, for example).

In the piston portion 130 in embodiment 4, as illustrated in FIG. 13(a), a passage (second passages) is formed. In this passage, a flow of oil in a direction from the one side to the other side generated in the piston portion 130 in accordance with a displacement of the piston portion 130 from the other side to "the one side" is reversed to make the oil flow from the other side to the one side (specified direction). On the one side of the passage, a valve is arranged to close the passage from the one side to the other side, and the valve opens and closes the one side of the passage. Further, in accordance with a displacement of the piston portion from the one side to "the other side", the oil flows in a passage (first passages) from the other side to the one side (specified direction) in the piston portion 130. On the one side of this passage, the valve is arranged to close the passage from the one side to the other side, and the valve opens and closes the one side of the passage.

Specifically, in embodiment 4, the piston portion 130 includes a piston housing 131 (defining member), oil passages 1412 (first passages), a reversing oil passage 141R and oil passages 1411 (second passages), a damping valve 142, a preset valve unit 132, and displacement means (load application means). The piston housing 131 is disposed in the cylinder 11 movably in the axial direction, and defines the space in the cylinder 11 into a third oil chamber Y3 (first fluid chamber) and a fourth oil chamber Y4 (second fluid chamber) that contain oil. The oil passages 1412 are formed in the piston housing 131, and allow the oil, which flows from the third oil chamber Y3 to the fourth oil chamber Y4 in accordance with a displacement of the piston housing 131 in one direction toward the other side in the axial direction, to flow in a direction from the other side to the one side (specified direction). The reversing oil passage 141R and the oil passages 1411 are formed in the piston housing 131 and allow the oil, which flows from the fourth oil chamber Y4 to the third oil chamber Y3 in accordance with a displacement of the piston housing 131 in the other direction toward the one side in the axial direction, to flow in the direction from the other side to the one side (specified direction). The damping valve 142 opens and closes the oil passages 1411 and the oil passages 1412 so as to control oil flows in the oil passages 1411 and the oil passages 1412. The preset valve unit 132 applies a load to the damping valve 142 in such a direction that the damping valve 142 closes the oil passages 1411 and the oil passages 1412. The preset valve unit 132 is capable of changing the load of the damping valve 142. The displacement means displaces the preset valve unit 132.

The preset valve unit 132 applies the load to the damping valve 142 in only one direction toward the other side. In embodiment 4, a press member 143 is disposed on the one side of the damping valve 142. The preset valve unit 132 displaces the press member 143 toward the other side to make the press member 143 apply the load to the damping valve 142 from the one side to the other side, and the damping valve 142 closes the oil passages 1411 and the oil passages 1412.

The preset valve unit 132 includes a preset valve 1324, which is an elastic member, and the preset valve unit 132 applies the load to the damping valve 142 through the preset valve 1324.

The oil passages 1412 allow the oil, which has been guided into the piston housing 131 from the other side of the piston housing 131, to flow toward the one side of the piston housing 131. The oil passages 1411 and the reversing oil passage 141R allow the oil, which has been guided into the piston housing 131 from the one side of the piston housing 131, to be reversed and flow toward the one side. The damping valve 142 is made of a single member, and opens and closes the oil passages 1411 and the oil passages 1412 from the one side.

In the above-described manner, in the hydraulic damper 1 to which embodiment 4 is applied, as compared with the piston portion 30 in embodiment 1 illustrated in FIG. 13(*b*), the positions of elements such as the following relative to the oil passages (1411, 1412) to generate the damping force are reversed in the vertical direction: the damping valve 142, the press member 143 to apply the load to the damping valve 142, and the preset valve 1324 to transmit the load of the press member 143. Also, the displacement direction of the preset valve unit 132 and other elements is reversed in the vertical direction. That is, when the preset valve unit 132 is displaced in a "drawing direction" from the one side to the other side by the load application means, the relationship between the passage of the oil flowing at the time of a compression stroke and the passage of the oil flowing at the time of a rebound stroke is reversed to the case when the preset valve unit 32 in embodiment 1 is displaced in a "pressing direction" from the one side to the other side.

It is noted that in the configuration that has been described heretofore as embodiment 4, which is based on the configuration of the hydraulic damper 1 in embodiment 1, the load application direction of the transmission member 22 is changed from the "pressing direction" to the "drawing direction", and the passages of the oil flows at the time of a compression stroke and at the time of a rebound stroke are reversed to each other. This, however, should not be construed in a limiting sense. With the hydraulic dampers 1 according to embodiment 2 and embodiment 3 as a basic configuration, the load application direction of the transmission member 22 may be changed from the "pressing direction" to the "drawing direction", and the passages of the oil flows at the time of a compression stroke and at the time of a rebound stroke may be reversed to each other. As described above, by the displacement in the "drawing direction" from the one side to the other side, the above-described valve is pressed from the one side to the other side so as to adjust deformability of the valve to change the damping force in the hydraulic damper 1.

<Embodiment 5>

Figure 14:
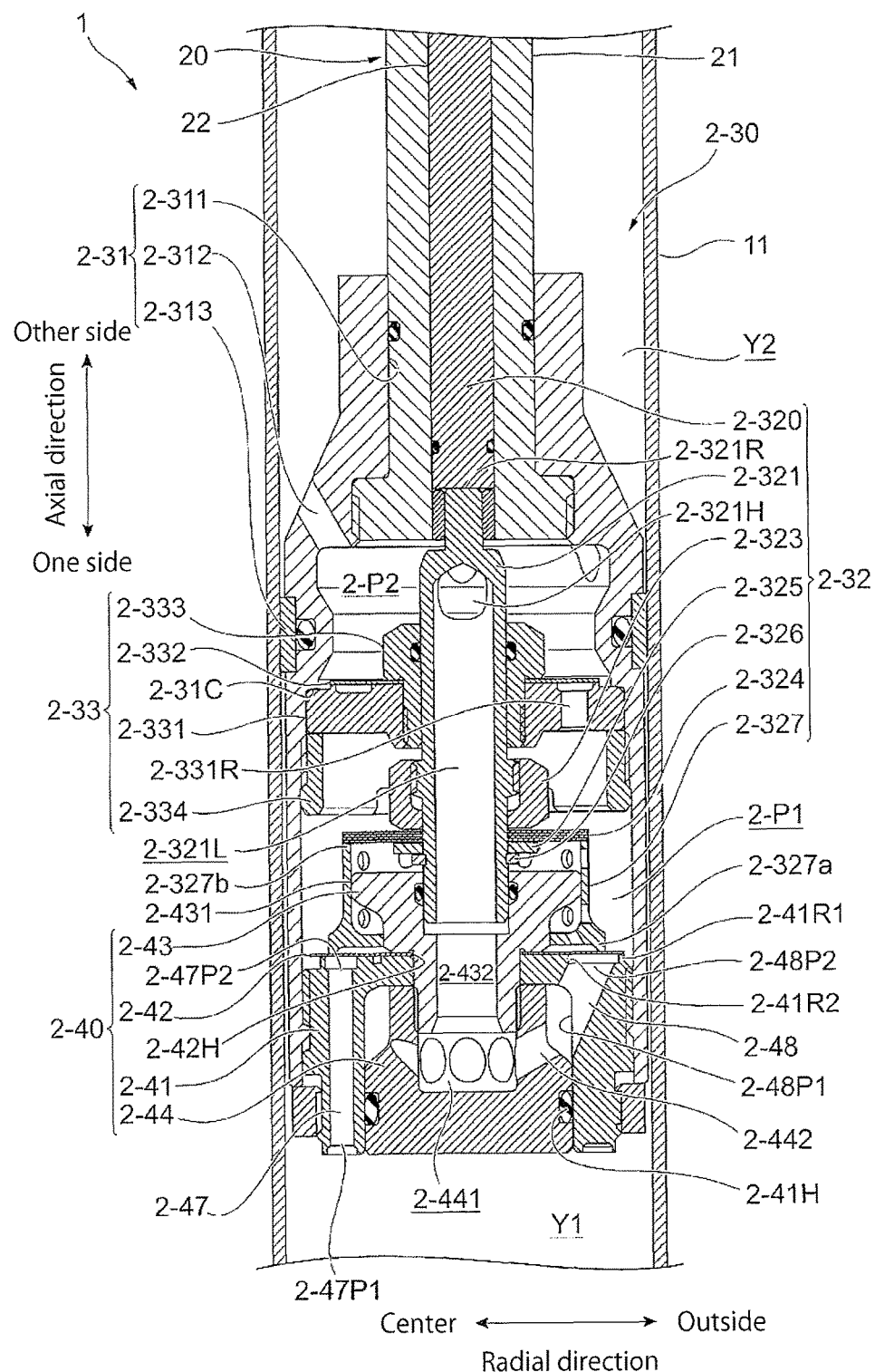
FIG. 14 is an enlarged view of a piston portion and its vicinity in embodiment 5.

FIG. 14 is an enlarged view of a piston portion 2-30 and its vicinity according to embodiment 5.

In embodiment 5, similar elements to the elements in other embodiments will be denoted with the same reference numerals and will not be elaborated here.

As illustrated in FIG. 14, the piston portion 2-30 includes a piston housing 2-31, a damping unit 2-40, a press unit 2-32 (load application means), and a check valve unit 2-33. The piston housing 2-31 accommodates elements constituting the piston portion 2-30 and the oil. The damping unit 2-40 is disposed on the one side of the piston housing 2-31. The press unit 2-32 is disposed on the other side of the damping unit 2-40. The check valve unit 2-33 is disposed on the other side of the damping unit 2-40.

The damping unit 2-40 includes a valve seat 2-41, a damping valve 2-42, a first holding bolt 2-43, and a reversing passage portion 2-44. The valve seat 2-41 includes a plurality of oil passages. The damping valve 2-42 is disposed on the other side of the valve seat 2-41. The first holding bolt 2-43 is disposed on the other side of the valve seat 2-41. The reversing passage portion 2-44 is disposed inside of the valve seat 2-41.

The piston portion 2-30 defines a space in the cylinder 11 into the first oil chamber Y1 and the second oil chamber Y2 that contain the oil. In this embodiment, the first oil chamber Y1 is formed on the one side of the piston portion 2-30, and the second oil chamber Y2 is formed on the other side of the piston portion 2-30.

The piston portion 2-30 includes a first intermediate chamber 2-P1 and a second intermediate chamber 2-P2 (third fluid chamber) in the piston housing 2-31. The first intermediate chamber 2-P1 and the second intermediate chamber 2-P2 are separate from the first oil chamber Y1 and the second oil chamber Y2 and contain the oil. In this embodiment, on the one side of the piston housing 2-31, the first intermediate chamber 2-P1 is formed by the press unit 2-32, the check valve unit 2-33, and the damping unit 2-40. On the other side of the piston housing 2-31, the second intermediate chamber 2-P2 is formed by the press unit 2-32 and the check valve unit 2-33.

As illustrated in FIG. 14, the hydraulic damper 1 (pressure damper) in embodiment 5 includes the cylinder 11, the piston portion 2-30 (defining member), the valve seat 2-41 (passage forming portion), compression-side oil passages 2-47 (first passages), rebound-side oil passages 2-48 (second passages), and the damping valve 2-42. The cylinder 11 contains oil (fluid). The piston portion 2-30 is disposed in the cylinder 11 movably in the axial direction, and defines the space in the cylinder 11 into the first oil chamber Y1 (first fluid chamber) and the second oil chamber Y2 (second fluid chamber). The valve seat 2-41 is disposed in the piston portion 2-30 to form passages of the oil. The compression-side oil passages 2-47 are formed in the valve seat 2-41. The compression-side oil passages 2-47 cause the oil, which flows from the first oil chamber Y1 to the second oil chamber Y2 in accordance with a displacement of the piston portion 2-30 in one direction of the axial direction, to flow in a specified direction and be discharged from second oil passage ports 2-47P2 (first passage ports), described later, arranged on an end portion of the valve seat 2-41. The rebound-side oil passages 2-48 are formed in the valve seat 2-41. The rebound-side oil passages 2-48 cause the oil, which flows from the second oil chamber Y2 to the first oil chamber Y1 in accordance with a displacement of the piston portion 2-30 in the other axial direction, to flow along the specified direction and be discharged from fourth oil passage ports 2-48P2 (second passage ports), described later. The fourth oil passage ports 2-48P2 are disposed on an end portion of the valve seat 2-41 in the axial direction on the circumference on which the second oil passage ports 2-47P2 are located. The damping valve 2-42 opens and closes the second oil passage ports 2-47P2 and the fourth oil passage ports 2-48P2 so as to control oil flows in the compression-side oil passages 2-47 and the rebound-side oil passages 2-48.

The configurations of these elements will be described in detail below.

[Configuration and Function of Piston Portion 2-30]

(Piston Housing 2-31)

As illustrated in FIG. 14, the piston housing 2-31 is a hollow member open on the one side and closed on the other side. The piston housing 2-31 includes a coupling portion 2-311, housing oil passages 2-312, and a piston ring 2-313. The coupling portion 2-311 is an end portion of the piston housing 2-31 on the other side and in the center in the radial direction. The housing oil passages 2-312 are arranged outside in the radial direction. The piston ring 2-313 is on the outer circumference on the one side.

The coupling portion 2-311 is a through hole penetrating in the axial direction. An end portion of the rod member 20 on the one side and an end portion of the press unit 2-32 on the other side are inserted in the coupling portion 2-311. The coupling portion 2-311 is secured to the one-side attachment portion 21a (see FIG. 2) of the rod member 21. The inner diameter of the coupling portion 2-311 is larger than the outer diameters of the transmission member 22 and a transmission rod 2-320, described later, of the press unit 2-32. Therefore, in the coupling portion 2-311, the transmission member 22 and the transmission rod 2-320 are movable in the axial direction.

A plurality of (six, for example, in this embodiment) housing oil passages 2-312 are formed in the circumferential direction. As illustrated in FIG. 14, the housing oil passages 2-312 communicate the second oil chamber Y2 with the second intermediate chamber 2-P2.

The piston ring 2-313 is fitted in a groove formed in the outer circumference of the piston housing 2-31. The piston ring 2-313 is disposed in sliding contact with the inner surface of the cylinder 11. The piston ring 2-313 decreases friction resistance between the cylinder 11 and the piston housing 2-31.

The damping unit 2-40 will now be described in detail.

Figure 27:
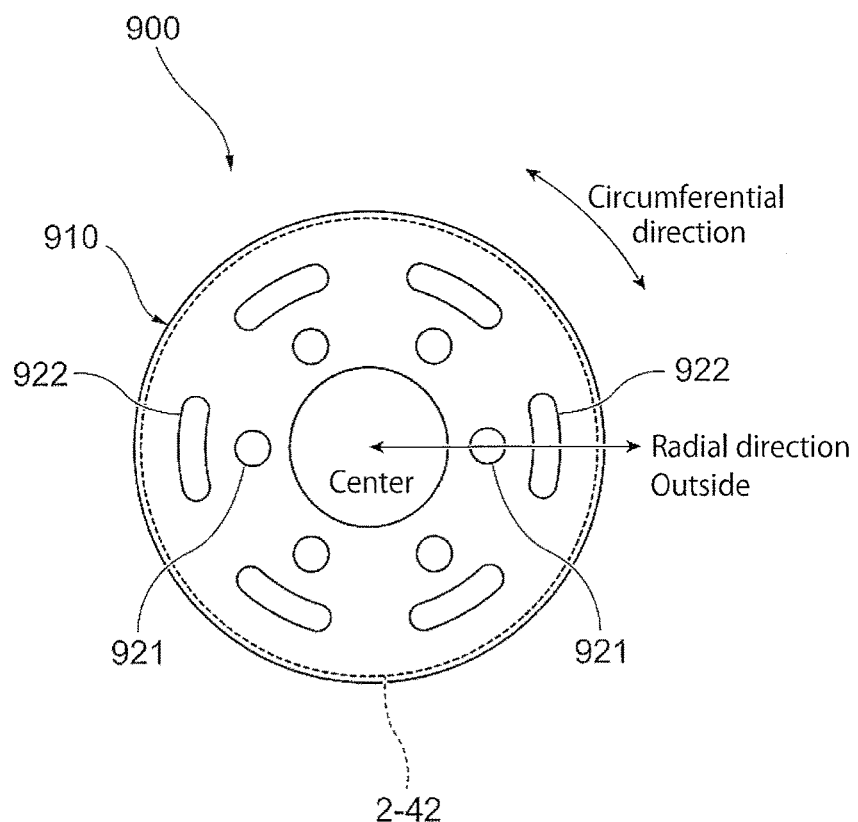
FIG. 27 illustrates a hydraulic damper in a comparative example.

FIG. 27 illustrates a hydraulic damper of a comparative example.

For convenience in describing the damping unit 2-40 in this embodiment, a damping unit 900 in the comparative example will be described first. It is noted that the damping unit 900 in the comparative example is a configuration corresponding to the damping unit 2-40 in this embodiment. FIG. 27 corresponds to an illustration of the valve seat 2-41 in this embodiment in FIG. 16, described later, and is a view of a comparative valve seat 910 from the other side.

In the damping unit 2-40 in this embodiment, as described above, in the valve seat 2-41, the direction of oil that flows at the time of a compression stroke and the direction of oil that flows at the time of a rebound stroke are approximately the same specified direction. With respect to each of the oil flows generated in both of the strokes, the damping valve 2-42 controls the oil flow in the single direction.

Before approaching employment of this configuration, the comparative example to which the comparative valve seat 910 is applied will be described, as illustrated in FIG. 27, for example. The comparative valve seat 910 includes comparative first passages 921 and comparative second passages 922. The comparative first passages 921 cause the oil generated at the time of a compression stroke to flow in a specified direction. The comparative second passages 922 cause the oil generated at the time of a rebound stroke to flow in the same specified direction. The comparative first passages 921 and the comparative second passages 922 are arranged side by side in the radial direction. In the example of FIG. 27, the comparative first passages 921 are arranged inside in the radial direction, and the comparative second passages 922 are arranged outside of the comparative first passages 921 in the radial direction. With respect to the comparative first passages 921 and the comparative second passages 922, the damping valve 2-42 controls the oil flows in the single direction.

In this case, the comparative first passages 921 are located closer to the center of the damping valve 2-42, which is the fulcrum of deformation, than the comparative second passages 922 are to the center. Consequently, the magnitude of force necessary to deform the damping valve 2-42 by the oil is larger in the comparative first passages 921 inside than in the comparative second passages 922 outside. That is, damping force generated at the time of a compression stroke is different from damping force generated at the time of a rebound stroke.

In place of the damping unit 900 in the comparative example described above, the damping unit 2-40 in this embodiment employs the following configuration to make uniform damping force in the compression stroke and in the rebound stroke.

Figure 15:
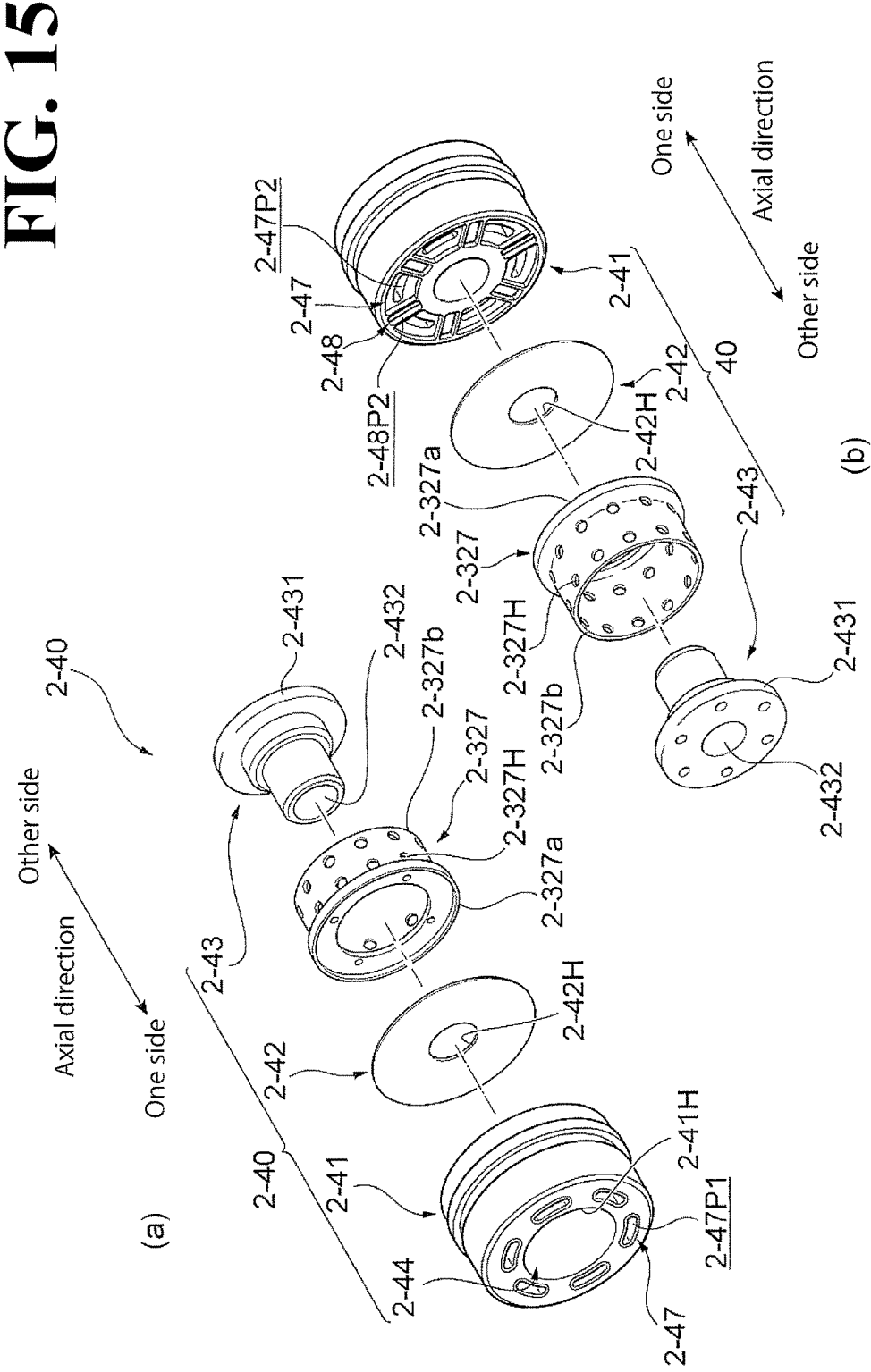
FIG. 15 is exploded perspective views of a damping unit in embodiment 5.

FIG. 15(*a*) ((a) of FIG. 15) and FIG. 15(*b*) ((b) of FIG. 15) are exploded perspective views of the damping unit 2-40 in embodiment 5. FIG. 15(*a*) is a view of the damping unit 2-40 from the one side in the axial direction, and FIG. 15(*b*) is a view of the damping unit 2-40 from the other side in the axial direction. It is noted that FIG. 15 additionally illustrates a press member 2-327 of the press unit 2-32, described later.

Figure 16:
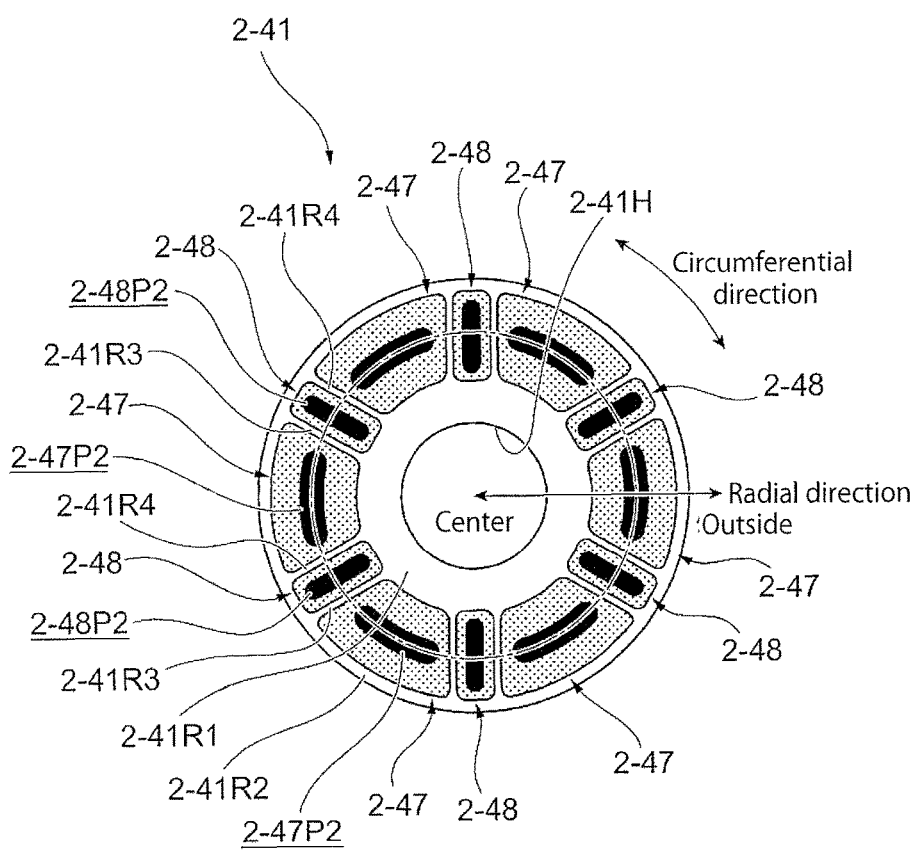
FIG. 16 is a top view of a valve seat in embodiment 5.

FIG. 16 is a top view of the valve seat 2-41 in embodiment 5. FIG. 16 is a view of the valve seat 2-41 from the other side.

(Damping Unit 2-40)

As illustrated in FIG. 15(*a*), the valve seat 2-41 is a bottomed, hollow cylindrical member having an opening 2-41H inside, which is open toward the one side. The opening 2-41H accommodates the reversing passage portion 2-44. The valve seat 2-41 is secured to an end portion of the piston housing 2-31 on the one side not to move in the axial direction.

As illustrated in FIG. 15(*b*), the valve seat 2-41 includes the compression-side oil passages 2-47 and the rebound-side oil passages 2-48 formed in the axial direction outside of a bolt hole in the radial direction. The first holding bolt 2-43 is inserted in the bolt hole.

As illustrated in FIG. 16, a plurality of (six in this embodiment) compression-side oil passages 2-47 are provided. The cross-section of the compression-side oil passages 2-47 has an approximately arcuate shape in the circumferential direction. The compression-side oil passages 2-47 include the first oil passage ports 2-47P1 on the one side and the second oil passage ports 2-47P2 on the other side. As illustrated in FIG. 14, the compression-side oil passages 2-47 are communicable with the first oil chamber Y1 at the first oil passage ports 2-47P1, and communicable with the first intermediate chamber 2-P1 at the second oil passage ports 2-47P2.

As illustrated in FIG. 16, a plurality of (six in this embodiment) rebound-side oil passages 2-48 are provided. In this embodiment, the cross-section of the rebound-side oil passages 2-48 has an approximately linear shape in the radial direction. It is noted that in this embodiment, the cross-sectional area of the rebound-side oil passages 2-48 is approximately equal to the cross-sectional area of the compression-side oil passages 2-47. As illustrated in FIG. 14, the rebound-side oil passages 2-48 include third oil passage ports 2-48P1 on the one side and fourth oil passage ports 2-48P2 on the other side. Similarly to the compression-side oil passages 2-47, the rebound-side oil passages 2-48 extend in the axial direction and extend in the radial direction from the center to the outside. In this embodiment, the rebound-side oil passages 2-48 extend diagonally relative to the axial direction. The positions of the fourth oil passage ports 2-48P2 from the center in the radial direction are approximately the same as the positions of the second oil passage port 2-47P2 of the compression-side oil passages 2-47. The rebound-side oil passages 2-48 are communicable with reversing passages 2-442 of the reversing passage portion 2-44 at the third oil passage ports 2-48P1 and communicable with the first intermediate chamber 2-P1 at the fourth oil passage ports 2-48P2.

As illustrated in FIG. 16, the second oil passage ports 2-47P2 of the compression-side oil passages 2-47 and the fourth oil passage ports 2-48P2 of the rebound-side oil passages 2-48 are arranged side by side in the circumferential direction at an end portion of the valve seat 2-41 on the other side. For example, the fourth oil passage ports 2-48P2 of the rebound-side oil passages 2-48 are formed on the circumference (circumference indicated by the dot-and-dash line in FIG. 16) on which the second oil passage ports 2-47P2 of the compression-side oil passages 2-47 are located.

As illustrated in FIG. 16, the valve seat 2-41 includes an inner common round 2-41R1 and an outer common round 2-41R2 on an end portion on the other side. The inner common round 2-41R1 and the outer common round 2-41R2 have approximately annular shapes and protrude from other surfaces of the valve seat 2-41.

The inner common round 2-41R1 is formed inside of the second oil passage ports 2-47P2 and the fourth oil passage ports 2-48P2 in the radial direction. The outer common round 2-41R2 is formed outside of the second oil passage ports 2-47P2 and the fourth oil passage ports 2-48P2 in the radial direction. In this embodiment, the inner common round 2-41R1 and the outer common round 2-41R2 mutually surround and isolate the plurality of second oil passage ports 2-47P2 and the plurality of fourth oil passage ports 2-48P2.

As illustrated in FIG. 16, the valve seat 2-41 further includes first radial rounds 2-41R3 and second radial rounds 2-41R4 on the end portion on the other side. The first radial rounds 2-41R3 and the second radial rounds 2-41R4 have approximately linear shapes in the radial direction and protrude from other surfaces of the valve seat 2-41.

The first radial rounds 2-41R3 and the second radial rounds 2-41R4 are formed between the second oil passage ports 2-47P2 and the fourth oil passage ports 2-48P2. In this embodiment, the first radial rounds 2-41R3 and the second radial rounds 2-41R4 surround and isolate the second oil passage ports 2-47P2 and the fourth oil passage ports 2-48P2.

At the end portion of the valve seat 2-41 on the other side, the inner common round 2-41R1, the outer common round 2-41R2, the first radial rounds 2-41R3, and the second radial rounds 2-41R4 described above are formed to have approximately equal protrusion heights. The inner common round 2-41R1, the outer common round 2-41R2, the first radial rounds 2-41R3, and the second radial rounds 2-41R4 (corresponding to the first rounds and the second rounds) are arranged on the end portion of the valve seat 2-41 on the other side and form a portion in contact with the damping valve 2-42.

As illustrated in FIG. 15(a) and FIG. 15(b), the damping valve 2-42 is a disk-shaped metal plate having a bolt hole 2-42H in the center in which the first holding bolt 2-43 is inserted. As illustrated in FIG. 14, the damping valve 2-42 is pressed against the end portion of the valve seat 2-41 on the other side through the first holding bolt 2-43. The damping valve 2-42 is capable of opening and closing the second oil passage ports 2-47P2 of the compression-side oil passages 2-47 and the fourth oil passage ports 2-48P2 of the rebound-side oil passages 2-48 of the valve seat 2-41.

As illustrated in FIG. 14, the first holding bolt 2-43 and the valve seat 2-41 clamp the damping valve 2-42, and the first holding bolt 2-43 presses the damping valve 2-42 to the other side of the valve seat 2-41. The first holding bolt 2-43 includes a guide portion 2-431 and an opening 2-432.

The outer diameter of the guide portion 2-431 is approximately equal to the inner diameter of a receiving portion 2-327b, described later, of the press member 2-327. The guide portion 2-431 guides the press member 2-327 movably in the axial direction.

The opening 2-432 is a through hole extending in the axial direction. The inner diameter of the opening 2-432 on the other side is larger than the outer diameter of a spool 2-321. An end portion of the spool 2-321 on the one side is inserted in the other side of the opening 2-432 movably in the axial direction. On the other side, the opening 2-432 communicates with a hollow portion 2-321L, described later, of the spool 2-321. On the one side, the opening 2-432 communicates with an opening 2-441, described later, of the reversing passage portion 2-44.

The reversing passage portion 2-44 includes the opening 2-441 and the reversing passages 2-442. The opening 2-441 penetrates in the axial direction. The reversing passages 2-442 extend diagonally from the one side to the other side. The reversing passage portion 2-44 is secured to the first holding bolt 2-43 on the other side.

The opening 2-441 extends in the axial direction and is closed on the other side. The other side of the opening 2-441 communicates with the one side of the first holding bolt 2-43.

In this embodiment, a plurality of reversing passages 2-442 are provided and open in the radial direction. The reversing passages 2-442 communicate with the opening 2-441 on one side and communicate with the rebound-side oil passages 2-48 on the other side.

(Press Unit 2-32)

The press unit 2-32 includes the transmission rod 2-320, the spool 2-321, a valve holding portion 2-323, a preset valve 2-324, a valve stopper 2-325, a ring 2-326, and the press member 2-327. The transmission rod 2-320 extends in the axial direction and is disposed on the other side in the piston housing 2-31. The spool 2-321 extends in the axial direction and is located on the one side of the transmission rod 2-320. The valve holding portion 2-323 is attached to the outside of the spool 2-321. The preset valve 2-324 is attached to the one side of the valve holding portion 2-323. The valve stopper 2-325 is disposed on the one side of the preset valve 2-324. The ring 2-326 is attached to the one side of the valve stopper 2-325. The press member 2-327 is disposed on the one side of the preset valve 2-324.

The transmission rod 2-320 is in contact with the spool 2-321 on the one side and in contact with the transmission member 22 of the rod portion 20 on the other side. The transmission rod 2-320 receives a load from the transmission member 22 and is displaced to apply the load to the spool 2-321.

The spool 2-321 includes a receiving portion 2-321R, a hollow portion 2-321L, and spool openings 2-321H. The receiving portion 2-321R is disposed on the other side and receives the transmission rod 2-320. The hollow portion 2-321L is formed on the one side of the receiving portion 2-321R. The spool openings 2-321H are open in the radial direction at an end portion of the hollow portion 2-321L on the other side.

The receiving portion 2-321R is in contact with an end portion of the transmission rod 2-320 on the one side. When the transmission rod 2-320 receives a load, as described below, the receiving portion 2-321R receives the load from the transmission rod 2-320, and the whole spool 2-321 is displaced in the axial direction. The hollow portion 2-321L is connected to the spool openings 2-321H on the other side and is open on the one side to communicate with the opening 2-432 of the damping unit 2-40. The hollow portion 2-321L allows the oil to flow between the second intermediate chamber 2-P2 and the opening 2-432. The spool openings 2-321H communicate the hollow portion 2-321L with the second intermediate chamber 2-P2.

The valve holding portion 2-323 is secured to the spool 2-321 by screwing, for example. The valve holding portion 2-323 is in contact with the preset valve 2-324 on the one side. The valve holding portion 2-323 and the valve stopper 2-325 clamp the preset valve 2-324 to hold the preset valve 2-324.

The preset valve 2-324 is an approximately disk-shaped member having an opening in which the spool 2-321 is inserted. In this embodiment, the preset valve 2-324 includes a plurality of disk-shaped metal plates superposed on one another. The preset valve 2-324 is elastically deformed to apply a load to the press member 2-327.

The valve stopper 2-325 presses the preset valve 2-324 from the one side toward the valve holding portion 2-323.

The ring 2-326 is fitted in a groove formed in the outer circumference of the spool 2-321. The ring 2-326 secures the valve stopper 2-325 in the axial direction.

The preset valve 2-324 is clamped between the valve holding portion 2-323 and the valve stopper 2-325 and secured to the spool 2-321. Therefore, when receiving the load from the transmission member 22, as described below, the spool 2-321, the valve holding portion 2-323, the preset valve 2-324, the valve stopper 2-325, and the ring 2-326 are integrally displaced in the axial direction.

As illustrated in FIG. 15(a) and FIG. 15(b), the press member 2-327 is an approximately hollow cylindrical member. The press member 2-327 is supported to be slidable in the axial direction by the guide portion 2-431, described later, of the first holding bolt 2-43. The press member 2-327 includes a contact portion 2-327a, a receiving portion 2-327b, and a plurality of openings 2-327H. The contact portion 2-327a is formed on the one side. The receiving portion 2-327b is formed on the other side. The press member 2-327 presses the damping valve 2-42 toward the one side in such a direction as to close the second oil passage ports 2-47P2 of the compression-side oil passages 2-47 and the fourth oil passage ports 2-48P2 of the rebound-side oil passages 2-48.

The contact portion 2-327a is in contact with the other side of the damping valve 2-42 and forms a portion to which the damping valve 2-42 is pressed. In this embodiment, as illustrated in FIG. 15(a), the contact portion 2-327a has an approximately annular shape. As illustrated in FIG. 14, the contact portion 2-327a is opposed to the portion of the damping valve 2-42 to which the second oil passage ports 2-47P2 of the compression-side oil passages 2-47 and the fourth oil passage ports 2-48P2 of the rebound-side oil passages 2-48 are opposed.

As illustrated in FIG. 14, the contact portion 2-327a is in contact with the portion of the damping valve 2-42 that is opposed to the second oil passage ports 2-47P2 and the fourth oil passage ports 2-48P2 at a single position in the radial direction. More specifically, from the center to the outside in the radial direction of the damping valve 2-42, the contact portion 2-327a is in contact with the portion of the damping valve 2-42 that is opposed to the second oil passage ports 2-47P2 and the fourth oil passage ports 2-48P2 not at a plurality of positions but at a single position. It is noted that the contact portion 2-327a is preferably arranged outside of the inner common round 2-41R1 and closer to the center than the outer common round 2-41R2 is to the center in the radial direction of the valve seat 2-41.

The outer diameter of the receiving portion 2-327b is smaller than the outer diameter of the preset valve 2-324. The receiving portion 2-327b forms a portion in contact with the preset valve 2-324.

As illustrated in FIG. 15(a) and FIG. 15(b), the openings 2-327H are open in the radial direction. The openings 2-327H form a passage of oil between the inside and the outside of the press member 2-327. When the press member 2-327 is displaced to adjust damping force, as described below, the openings 2-327H prevent the displacement of the press member 2-327 from being affected by an oil pressure difference between the inside and the outside of the press member 2-327, and the openings 2-327H supply oil to a gap between the press member 2-327 and an element in contact with the press member 2-327 so as to decrease friction.

The press unit 2-32 of the above-described configuration is capable of changing the load applied to the damping valve 2-42 based on control by the displacement means 23 (see FIG. 2). Specifically, the press unit 2-32 receives a load from the displacement means 23 through the transmission member 22. In accordance with the load from the transmission member 22, the press unit 2-32 changes the load to be pressed against the damping valve 2-42. As a result, it is possible for the press unit 2-32 to change the damping force generated by the damping valve 2-42. The changeability of the damping force of the damping valve 2-42 will be described in detail below.

(Check Valve Unit 2-33)

As illustrated in FIG. 14, the check valve unit 2-33 includes a check valve seat 2-331, a check valve 2-332, a first holding bolt 2-333, and a second holding bolt 2-334. The check valve 2-332 is disposed on the other side of the check valve seat 2-331. The first holding bolt 2-333 is disposed on the other side of the check valve 2-332. The second holding bolt 2-334 is disposed on the one side of the check valve seat 2-331.

The check valve seat 2-331 is a thick, approximately hollow cylindrical member having an opening in which the transmission rod 2-320 and the first holding bolt 2-333 are inserted. The check valve seat 2-331 has an end portion on the other side that engages with the stepped portion 2-31C formed on the inner circumference of the piston housing 2-31.

The check valve seat 2-331 includes a plurality of oil passages 2-331R penetrating in the axial direction outside in the radial direction. The oil passages 2-331R form passages of oil between the first intermediate chamber 2-P1 and the second intermediate chamber 2-P2.

The check valve 2-332 is an approximately disk-shaped metal plate having a bolt hole in the center in the radial direction in which the spool 2-321 and the first holding bolt 2-333 are inserted. The check valve 2-332 has such an inner diameter and an outer diameter as to cover end portions of the oil passages 2-331R of the check valve seat 2-331 on the other side.

The first holding bolt 2-333 is a thick, approximately hollow cylindrical member having a through hole in the center in the radial direction in which the spool 2-321 is inserted. The inner diameter of the first holding bolt 2-333 is larger than the outer diameter of the spool 2-321. The first holding bolt 2-333 is secured to the check valve seat 2-331. The first holding bolt 2-333 and the check valve seat 2-331 clamp the check valve 2-332 in the axial direction so as to hold the check valve 2-332 on an end portion of the check valve seat 2-331.

The second holding bolt 2-334 is a thick, approximately hollow cylindrical member having an opening in the center in the radial direction. The second holding bolt 2-334 is secured inside of the piston housing 2-31 by screwing, for example. The second holding bolt 2-334 presses the check valve seat 2-331 toward the stepped portion 2-31C so as to hold the check valve seat 2-331.

The piston portion 2-30 of the above-described configuration includes the first intermediate chamber 2-P1 and the second intermediate chamber 2-P2, which are separate from the first oil chamber Y1 and the second oil chamber Y2 and contain oil. The second oil passage ports 2-47P2 of the compression-side oil passages 2-47, the fourth oil passage ports 2-48P2 of the rebound-side oil passages 2-48, and the damping valve 2-42 are arranged in the first intermediate chamber 2-P1. In accordance with displacements of the piston portion 2-30 in one direction of the axial direction and in the other axial direction, the check valve unit 2-33 (allowing and restriction member) allows or restricts oil flows from the first oil chamber Y1 and the second oil chamber Y2 to the first intermediate chamber 2-P1 and the second intermediate chamber 2-P2.

[Operation of Hydraulic Damper 1 in Embodiment 5]

Figure 17:
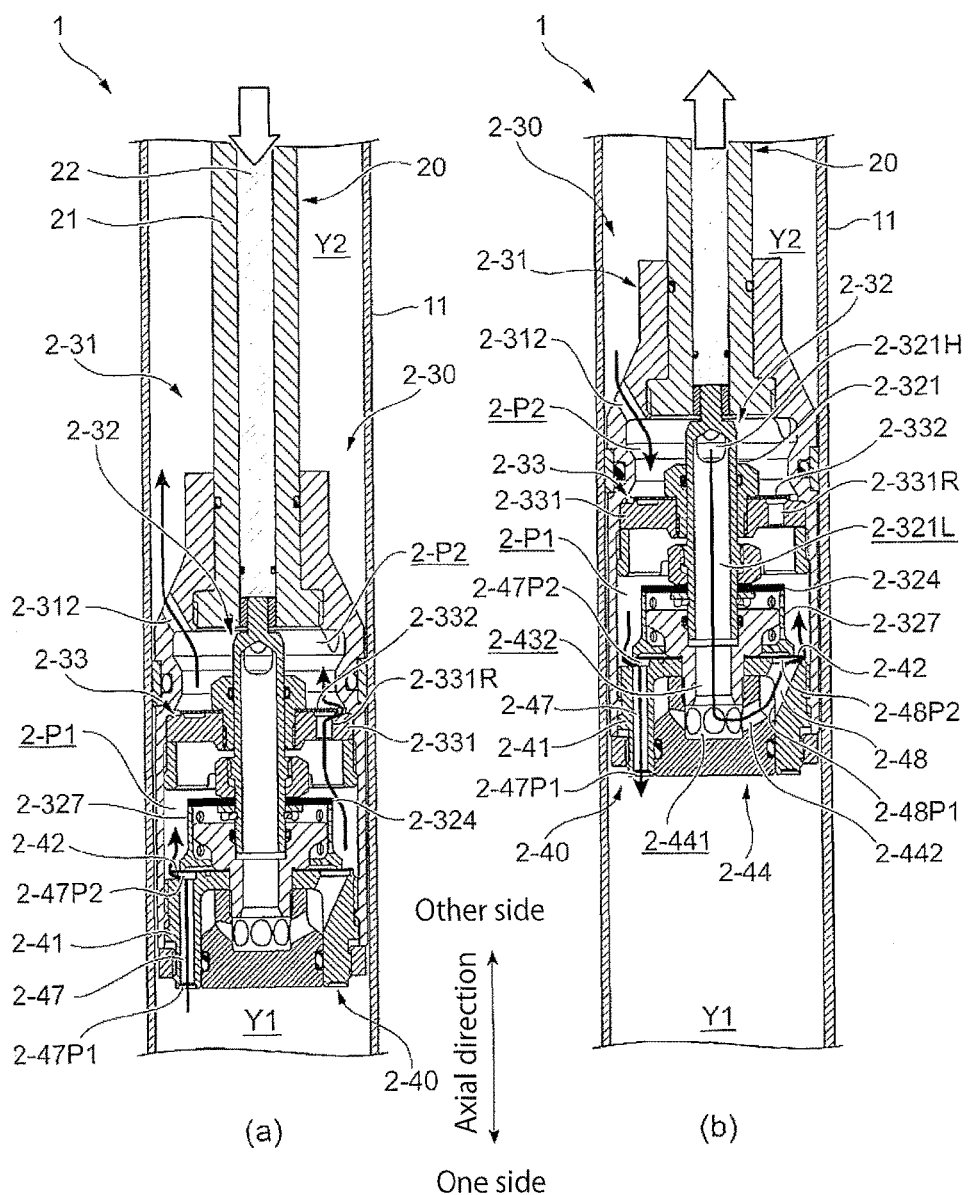
FIG. 17 illustrates an operation of a hydraulic damper in embodiment 5.

FIG. 17(a) ((a) of FIG. 17) and FIG. 17(b) ((b) of FIG. 17) illustrate an operation of the hydraulic damper 1 in embodiment 5. FIG. 17(a) illustrates an oil flow at the time of a compression stroke, and FIG. 17(b) illustrates an oil flow at the time of a rebound stroke.

First, the oil flow at the time of a compression stroke of the hydraulic damper 1 will be described.

As illustrated in FIG. 17(a), when the piston portion 2-30 is displaced toward the one side in the axial direction relative to the cylinder portion 10, as indicated by the outlined arrow, the displacement of the piston portion 2-30 causes the oil in the first oil chamber Y1 to be pressed to increase the pressure in the first oil chamber Y1.

The oil pressure in the first oil chamber Y1 increased by the displacement of the piston portion 2-30 toward the one side in the axial direction causes the oil to flow from the first oil passages ports 2-47P1 of the valve seat 2-41 to the compression-side oil passages 2-47. Then, the oil flows in the compression-side oil passages 2-47 in a specified direction from the one side to the other side in the axial direction. The oil further flows against the force from the press member 2-327 and forces the damping valve 2-42 open so as to be discharged from the second oil passage ports 2-47P2 to the first intermediate chamber 2-P1. Damping force is generated at the time of the compression stroke by resistance occurring when the oil flows in the compression-side oil passages 2-47 and the damping valve 2-42.

The oil, which has been discharged to the first intermediate chamber 2-P1, flows to the oil passages 2-331R of the check valve unit 2-33. Then, the oil forces the check valve 2-332 open to flow into the second intermediate chamber 2-P2. Further, the oil passes through the housing oil passages 2-312 of the piston housing 2-31 and flows into the second oil chamber Y2.

In the above-described manner, in the hydraulic damper 1 in this embodiment, in accordance with the displacement of the piston portion 2-30 in one direction (displacement toward the one side in the axial direction in this embodiment), the oil flow is generated from the first oil chamber Y1 to the second oil chamber Y2. The compression-side oil passages 2-47 and the damping valve 2-42 control this oil flow to generate the damping force.

As illustrated in FIG. 6, in the bottom valve portion 50, due to the oil pressure in the first oil chamber Y1 increased by the displacement of the piston portion 2-30 toward the one side in the axial direction, the oil passes through the oil holes 522H of the rebound-side valve 522 and flows into the first oil passages 511 of the first valve body 51. Then, the oil forces the compression-side valve 521 open to flow from the first oil passages 511 into the space 511S.

The oil, which has flowed into the space 511S, flows to the oil passages 541 of the second valve body 54. Then, the oil forces the check valve 55 open, passes through the openings 511H, the groove 511T, the communication passage L, and the cylinder opening 11H (see FIG. 2), and flows into the second oil chamber Y2.

Meanwhile, the oil, which has flowed into the space 511S, also flows into the through hole 54H of the second valve body 54. The oil, which has flowed into the through hole 54H, passes through the space 58S and the third opening 58H3 and flows to the reservoir chamber R.

Next, the oil flow at the time of a rebound stroke of the hydraulic damper 1 will be described.

As illustrated in FIG. 17(b), when the piston portion 2-30 is displaced toward the other side in the axial direction relative to the cylinder portion 10, as indicated by the outlined arrow, the displacement of the piston portion 2-30 causes the oil in the second oil chamber Y2 to be pressed to increase the pressure in the second oil chamber Y2.

It is noted that as illustrated in FIG. 6, even if the oil moves in an attempt to flow from the cylinder opening 11H through the communication passage L, the check valve 55 keeps closing the oil passages 541. Therefore, no oil flow is generated from the second oil chamber Y2 to the first oil chamber Y1 through the communication passage L.

As illustrated in FIG. 17(b), the oil pressure in the second oil chamber Y2 is increased by the displacement of the piston portion 2-30 toward the other side in the axial direction (displacement toward the other side in the axial direction in this embodiment). This oil pressure causes the oil to flow from the housing oil passages 2-312 of the piston housing 2-31 into the second intermediate chamber 2-P2.

It is noted that the oil under the increased pressure flows into the second intermediate chamber 2-P2, and consequently, the pressure in the second oil chamber Y2 (second intermediate chamber 2-P2) is relatively higher than the pressure in the first intermediate chamber 2-P1. Therefore, the check valve 2-332 does not open the oil passages 2-331R, and no oil flow is generated through the check valve unit 2-33.

The oil in the second intermediate chamber 2-P2 passes through the spool openings 2-321H, the hollow portion 2-321L, and the opening 2-432 and flows into the opening 2-441 of the reversing passage portion 2-44. The direction of the oil flow is reversed in the opening 2-441, and the oil flows through the reversing passages 2-442. The oil further flows from the third oil passage ports 2-48P1 to the rebound-side oil passages 2-48. The oil, which has flowed in the direction from the other side to the one side in the axial direction in this manner, is reversed in the reversing passage 2-44 and flows in the direction from the one side to the other side in the axial direction. That is, the oil flows along the flow in the specified direction in the compression-side oil passages 2-47 at the time of the compression stroke described above.

The oil in the rebound-side oil passages 2-48 flows against the force from the press member 2-327, forces the damping valve 2-42 open, and flows from the fourth oil passage ports 2-48P2 to the first intermediate chamber 2-P1. Damping force is generated by resistance occurring when the oil flows in the rebound-side oil passages 2-48 and the damping valve 2-42.

The oil in the first intermediate chamber 2-P1 flows into the compression-side oil passages 2-47 through the second oil passage ports 2-47P2. At this time, as described above, the oil flowing in the rebound-side oil passages 2-48 causes the damping valve 2-42 to be deformed or displaced in a direction away from the end portion of the valve seat 2-41 on the other side. The second oil passage ports 2-47P2 and the fourth oil passage ports 2-48P2 are arranged side by side in the circumferential direction (see FIG. 15(b) and FIG. 16). Therefore, in this embodiment, the oil, which has flowed from the fourth oil passage ports 2-48P2, flows in the circumferential direction into the second oil passage ports 2-47P2. The oil further flows from the first oil passage ports 2-47P1 of the compression-side oil passages 2-47 into the first oil chamber Y1.

In the above-described manner, in accordance with the displacement of the piston portion 2-30 in the other direction, the oil flow is generated from the second oil chamber Y2 to the first oil chamber Y1. The oil flow is controlled by the rebound-side oil passages 2-48 and the damping valve 2-42 so as to generate the damping force at the time of the rebound stroke.

In the bottom valve portion 50, as illustrated in FIG. 6, the displacement of the piston portion 2-30 toward the other side in the axial direction causes the pressure in the first oil chamber Y1 to decrease. Then, the pressure in the first oil chamber Y1 becomes relatively lower than the pressure in the reservoir chamber R. Therefore, the oil in the reservoir chamber R passes through the third opening 58H3, the through hole 54H, and the space 511S and flows into the first oil passages 511. The oil in the first oil passages 511 forces the rebound-side valve 522 open to flow into the first oil chamber Y1.

[Change Control of Damping Force in Damping Unit 2-40]

Next, change control of damping force in the damping unit 2-40 in the hydraulic damper 1 will be described.

As illustrated in FIG. 2, the displacement means 23 presses the transmission member 22 toward the one side by a predetermined amount. As illustrated in FIG. 14, by the displacement of the transmission member 22 toward the one side, the transmission rod 2-320 is displaced toward the one side. Further, by the displacement of the transmission rod 2-320, the spool 2-321 is displaced toward the one side. Accordingly, the preset valve 2-324 secured to the spool 2-321 is pressed toward the one side. Then, the preset valve 2-324 is elastically deformed and displaces the press member 2-327 toward the one side. In this manner, the press unit 2-32 applies a load to the damping valve 2-42 in only one direction from the other side to the one side.

In this embodiment, the damping valve 2-42 is deformed or displaced toward the other side to open the compression-side oil passages 2-47 and the rebound-side oil passages 2-48. Therefore, the load applied to the damping valve 2-42 from the other side to the one side by the press member 2-327 is increased to prevent the damping valve 2-42 from opening. As a result, the damping force generated in the hydraulic damper 1 is increased.

Meanwhile, the load applied to the transmission member 22 toward the one side by the displacement means 23 is eliminated. This decreases the load applied to the press member 2-327 by the preset vale 2-324 secured to the spool 2-321. As a result, the load applied to the damping valve 2-42 by the press member 2-327 is decreased to facilitate opening of the damping valve 2-42. This consequently decreases the damping force generated in the hydraulic damper 1.

In the above-described manner, in this embodiment, the transmission member 22 is displaced to change the magnitude of the load applied to the damping valve 2-42 by the press member 2-327. Deformability of the damping valve 2-42 is adjusted to change the damping force generated in the hydraulic damper 1.

As has been described heretofore, in this embodiment, the single damping valve 2-42 causes the damping force in the oil flows at the time of a rebound stroke and at the time of a compression stroke. The transmission member 22 and other elements are merely displaced toward the single damping valve 2-42 in only one direction so as to comprehensively adjust the damping force in the flows in both of the directions of the rebound stroke and the compression stroke. This simplifies the device configuration for adjusting the damping force. Thus, the hydraulic damper 1 in this embodiment implements, with the simplified configuration, the adjustment of the damping force generated in the piston portion 2-30 in accordance with the displacements of the piston portion 2-30 in both of one direction and the other direction.

In the hydraulic damper 1, the compression-side oil passages 2-47 and the rebound-side oil passages 2-48 are arranged side by side in the circumferential direction on approximately the same circumference. Thus, in the hydraulic damper 1 in this embodiment, the damping force generated at the time of a compression stroke in which the piston portion 2-30 is displaced toward the one side and the damping force generated at the time of a rebound stroke in which the piston portion 2-30 is displaced toward the other side can be made uniform.

In the hydraulic damper 1 in this embodiment, the distance of the compression-side oil passages 2-47 and the distance of the rebound-side oil passages 2-48 with respect to the center of the damping valve 2-42 are approximately equal to each other. Specifically, when the damping valve 2-42 is deformed and opened, the fulcrum of deformation and the point of force received from the oil are at approximately identical positions with respect to the compression-side oil passages 2-47 and the rebound-side oil passages 2-48. As a result, the damping force generated at the time of a rebound stroke and the damping force generated at the time of a compression stroke can be made to have approximately the same magnitude.

In the press unit 2-32 in this embodiment, the contact portion 2-327a of the press member 2-327 is in contact with the damping valve 2-42 at only one position from the center to the outer circumference in the radial direction. The contact portion 2-327a adjusts the opening degrees of the compression-side oil passages 2-47 and the rebound-side oil passages 2-48 by the contact at the one position. Consequently, in this embodiment, it is possible to decrease a difference between the damping force generated at the time of a rebound stroke and the damping force generated at the time of a compression stroke.

Here, assume that a first contact portion and a second contact portion separate from each other are brought into contact with the compression-side oil passages 2-47 and the rebound-side oil passages 2-48 so as to adjust damping force. In this case, depending on the parallelism of the separate contact portions, for example, there is a high possibility of an error between the adjustments with respect to the compression-side oil passages 2-47 and the rebound-side oil passages 2-48. For example, assume an attempt to bring the first contact portion and the second contact portion into contact with the damping valve 2-42 in the same manner. Even in this attempt, for example, although the first contact portion and the damping valve 2-42 are in contact with each other with no gap, a gap may be caused between the second contact portion and the damping valve 2-42, which may result in a difference between the damping force generated at the time of a rebound stroke and the damping force generated at the time of a compression stroke.

In view of this, in the hydraulic damper 1 in this embodiment, as described above, the contact portion 2-327a of the press member 2-327 is in contact with the damping valve 2-42 at one position. This does not cause a problem of the parallelism. In opening and closing the damping valve 2-42 by the compression-side oil passages 2-47 and opening and closing the damping valve 2-42 by the rebound-side oil passages 2-48, contact of the contact portion 2-327a with the damping valve 2-42 at one position prevents a difference of the fulcrum positions of deformation of the damping valve 2-42 by the contact portion 2-327a. Therefore, the damping force generated at the time of a rebound stroke and the damping force generated at the time of a compression stroke can be made uniform.

In this embodiment, the displacement amount of the transmission member 22 can be changed continuously in the axial direction, for example, so as to change the magnitude of damping force continuously. In this embodiment, in place of transmission of the pressure of a fluid such as oil, force is transmitted among the substantial elements, namely, the transmission member 22, the press unit 2-32, the press member 2-327, and the damping valve 2-42, so as to control the load for opening the damping valve 2-42. This increases response speed in control of the damping force.

In control of damping force in both of the rebound stroke and the compression stroke, the damping valve 2-42 in embodiment 5 can close the passage of oil flowing in the axial direction in the valve seat 2-41. Consequently, in the hydraulic damper 1 in embodiment 5, a second check valve 2-75 in the hydraulic damper 1 in embodiment 6, described later, can be eliminated.

In this embodiment, the press unit 2-32 is arranged in such a manner that the press member 2-327 applies a load to the damping valve 2-42 through the preset valve 2-324. Therefore, the press member 2-327 applies a predetermined load to the damping valve 2-42 by the load applied from the press unit 2-32. In particular, in this embodiment, the damping valve 2-42 is constantly pressed by elasticity of the preset valve 2-324 through the press member 2-327 so as to stabilize the damping force in the hydraulic damper 1.

Moreover, interposition of the preset valve 2-324, which is an elastic member, absorbs dimensional tolerances of the elements constituting the piston portion 2-30, for example. This prevents degradation in reliability of the hydraulic damper 1 that may be caused by a gap between the elements and inversely by excessive pressing of the elements into each other.

<Embodiment 6>

Figure 18:
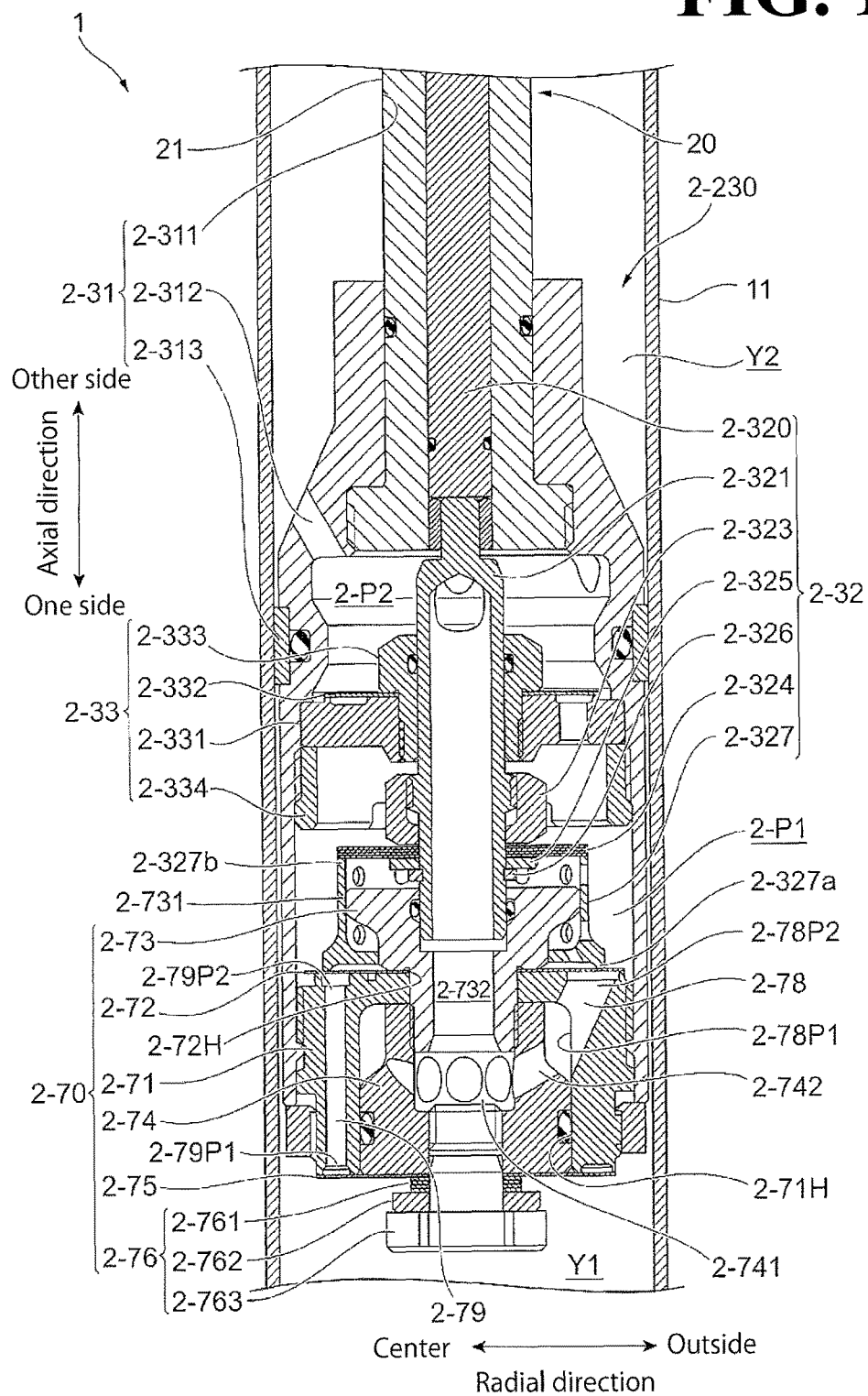
FIG. 18 is an enlarged view of a piston portion and its vicinity in embodiment 6.

FIG. 18 is an enlarged view of a piston portion 2-230 and its vicinity in embodiment 6.

Figure 19:
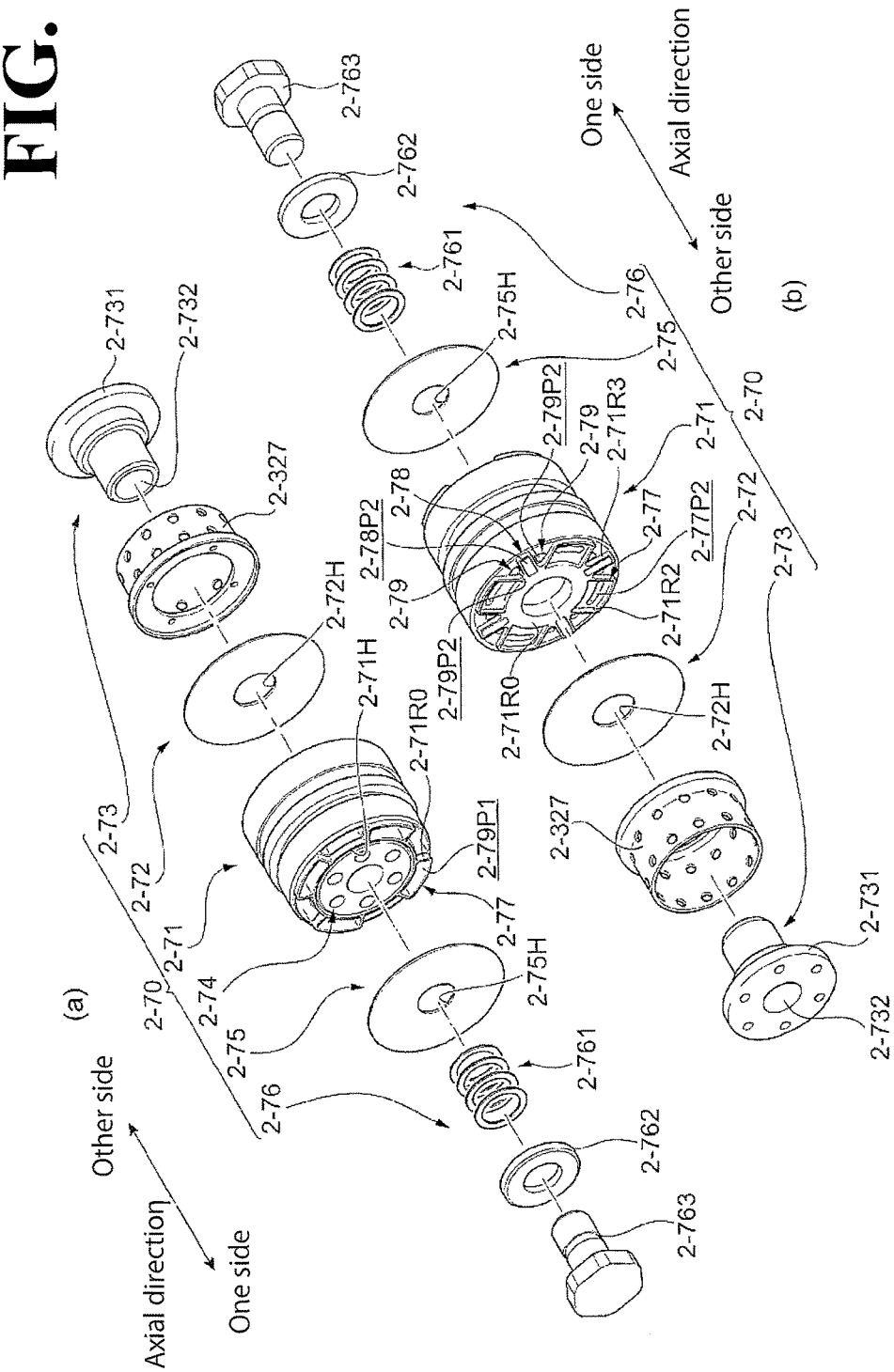
FIG. 19 is exploded perspective views of a damping unit in embodiment 6.

FIG. 19(a) ((a) of FIG. 19) and FIG. 19(b) ((b) of FIG. 19) are exploded perspective views of a second damping unit 2-70 in embodiment 6. FIG. 19(a) is a view of the second damping unit 2-70 from the one side in the axial direction, and FIG. 10(b) is a view of the second damping unit 2-70 from the other side in the axial direction. It is noted that FIG. 19 additionally illustrates the press member 2-327 of the press unit 2-32.

Figure 20:
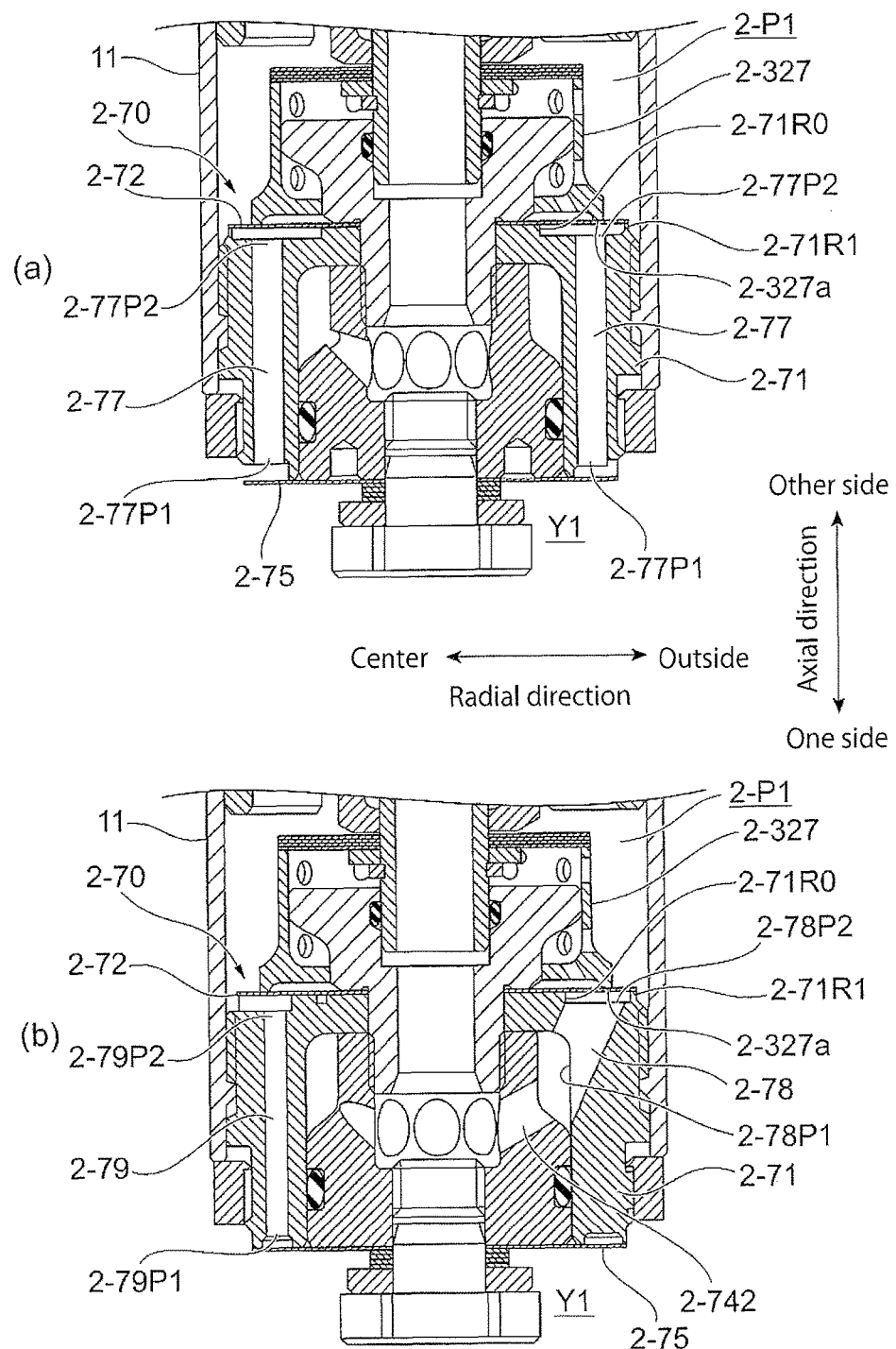
FIG. 20 illustrates oil passages of a valve seat in embodiment 6.

FIG. 20 illustrates oil passages of a valve seat 2-71 in embodiment 6. FIG. 20(a) ((a) of FIG. 20) illustrates the second damping unit 2-70 and its vicinity in cross-section along compression-side oil passages 2-77, and FIG. 20(b) ((b) of FIG. 20) illustrates the second damping unit 2-70 and its vicinity in cross-section along a first rebound-side oil passage 2-78 and a second rebound-side oil passage 2-79.

Figure 21:
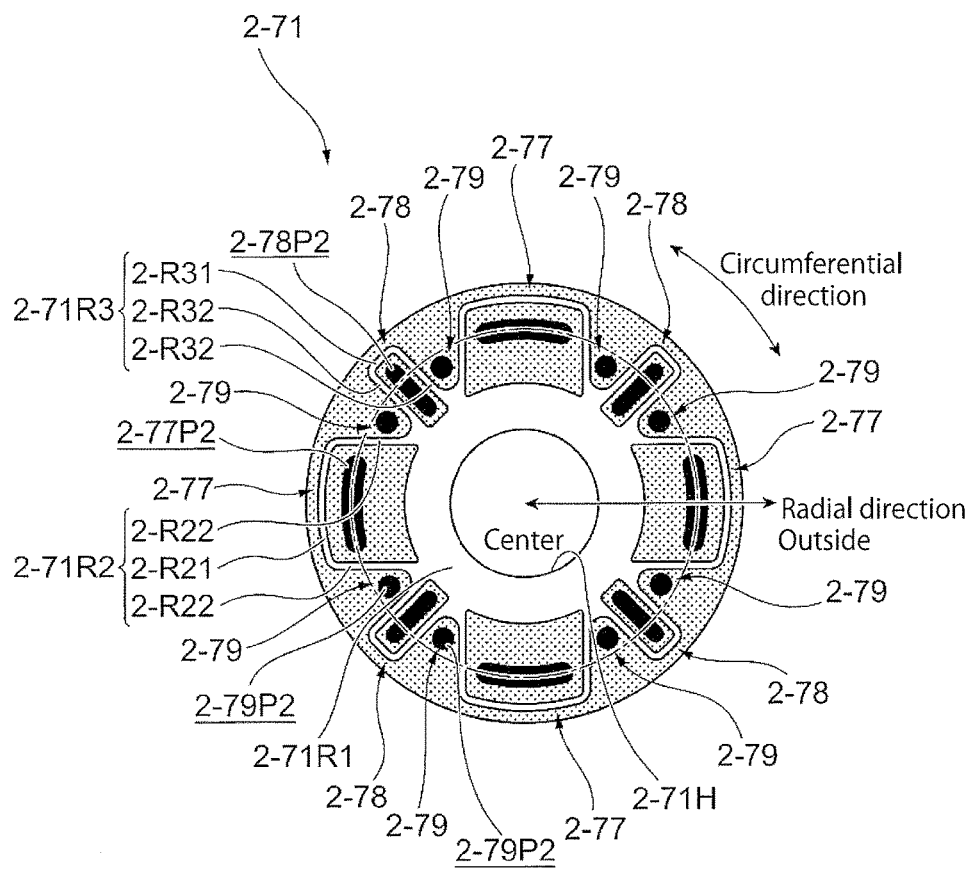
FIG. 21 is a top view of the valve seat in embodiment 6.

FIG. 21 is a top view of the valve seat 2-71 in embodiment 6. FIG. 21 is a view of the valve seat 2-71 from the other side.

In the hydraulic damper 1 in embodiment 6, the configuration of the piston portion 2-230 is different from the configuration of the piston portion 2-230 in embodiment 5. Therefore, in the following description, the piston portion 2-230 will be detailed. Similar elements to the elements in embodiment 5 will be denoted with the same reference numerals and will not be elaborated here.

As illustrated in FIG. 18, the piston portion 2-230 in embodiment 6 includes the piston housing 2-31, the second damping unit 2-70, the press unit 2-32, and the check valve unit 2-33.

(Second Damping Unit 2-70)

As illustrated in FIG. 18, the second damping unit 2-70 includes the valve seat 2-71, a damping valve 2-72, a first holding portion 2-73, a reversing passage portion 2-74, the second check valve 2-75, and a second holding portion 2-76. The valve seat 2-71 includes a plurality of oil passages. The damping valve 2-72 is disposed on the other side of the valve seat 2-71. The first holding portion 2-73 is disposed on the other side. The reversing passage portion 2-74 is disposed inside of the valve seat 2-71. The second check valve 2-75 is disposed on the one side of the reversing passage portion 2-74. The second holding portion 2-76 is disposed on the one side of the second check valve 2-75.

As illustrated in FIG. 18 and FIG. 19, the hydraulic damper 1 (pressure damper) in embodiment 6 includes the cylinder 11, the piston portion 2-230 (defining member), the valve seat 2-71 (passage forming portion), the compression-side oil passages 2-77 (first passages), the first rebound-side oil passages 2-78 (second passages), and the damping valve 2-72. The cylinder 11 contains oil (fluid). The piston portion 2-230 is disposed in the cylinder 11 movably in the axial direction and defines a space in the cylinder 11 into the first oil chamber Y1 (first fluid chamber) and the second oil chamber Y2 (second fluid chamber). The valve seat 2-71 is disposed in the piston portion 2-230 and forms passages of the oil. The compression-side oil passages 2-77 are formed in the piston portion 2-230. The compression-side oil passages 2-77 cause the oil, which flows from the first oil chamber Y1 to the second oil chamber Y2 in accordance with a displacement of the piston portion 2-230 in one direction of the axial direction, to flow in a specified direction and be discharged from second oil passage ports 2-77P2 (first passage ports), described later, disposed on an end portion of the valve seat 2-71. The first rebound-side oil passages 2-78 are formed in the piston portion 2-230. The first rebound-side oil passages 2-78 cause the oil, which flows from the second oil chamber Y2 to the first oil chamber Y1 in accordance with a displacement of the piston portion 2-230 in the other axial direction, to flow along the specified direction and be discharged from fourth oil passage ports 2-78P2 (second passage ports), described later, disposed on the end portion of the valve seat 2-71 in the axial direction and on the circumference on which the second oil passage ports 2-77P2 are located. The damping valve 2-72 opens and closes the second oil passage ports 2-77P2 and the fourth oil passage ports 2-78P2 so as to control the oil flows in the compression-side oil passages 2-77 and the first rebound-side oil passages 2-78.

The configurations of these elements will be described in detail below.

As illustrated in FIG. 19(a), the valve seat 2-71 is a bottomed, hollow cylindrical member having an opening 2-71H inside, which is open toward the one side. The opening 2-71H accommodates the reversing passage portion 2-74. As illustrated in FIG. 18, the valve seat 2-71 is secured to an end portion of the piston housing 2-31 on the one side not to move in the axial direction.

As illustrated in FIG. 20(a) and FIG. 20(b), the valve seat 2-71 includes the compression-side oil passages 2-77, the first rebound-side oil passages 2-78, and the second rebound-side oil passages 2-79, which extend in the axial direction outside of a bolt hole in the radial direction. The first holding portion 2-73 is inserted in this bolt hole.

As illustrated in FIG. 21, a plurality of (four in this embodiment) compression-side oil passages 2-77 are provided. The cross-section of the compression-side oil passages 2-77 has an approximately arcuate shape in the circumferential direction. As illustrated in FIG. 20(a), the compression-side oil passages 2-77 each include a first oil passage port 2-77P1 on the one side and the second oil passage port 2-77P2 on the other side. The compression-side oil passages 2-77 are communicable with the first oil chamber Y1 at the first oil passage ports 2-77P1 and communicable with the first intermediate chamber 2-P1 at the second oil passage ports 2-77P2.

As illustrated in FIG. 21, a plurality of (four in this embodiment) first rebound-side oil passages 2-78 are provided. In this embodiment, the cross-section of the first rebound-side oil passages 2-78 has an approximately linear shape in the radial direction. It is noted that the cross-sectional area of the first rebound-side oil passage 2-78 is approximately equal to the cross-sectional area of the compression-side oil passage 2-77. As illustrated in FIG. 20(b), the first rebound-side oil passages 2-78 each include a third oil passage port 2-78P1 on the one side and the fourth oil passage port 2-78P2 on the other side. The first rebound-side oil passages 2-78 are communicable with reversing passages 2-742 of the reversing passage portion 2-74 at the third oil passage ports 2-78P1 and communicable with the first intermediate chamber 2-P1 at the fourth oil passage ports 2-78P2.

As illustrated in FIG. 21, the second rebound-side oil passages 2-79 are formed on both sides of each first rebound-side oil passage 2-78 in the circumferential direction of the valve seat 2-71 (totally eight second rebound-side oil passages 2-79 are provided in this embodiment). In this embodiment, the cross-section of the second rebound-side oil passages 2-79 has an approximately circular shape. It is noted that the cross-sectional area of the second rebound-side oil passage 2-79 is smaller than the cross-sectional area of the first rebound-side oil passage 2-78. As illustrated in FIG. 20(b), the second rebound-side oil passages 2-79 each include a fifth oil passage port 2-79P1 on the one side and a sixth oil passage port 2-79P2 on the other side. The second rebound-side oil passages 2-79 are communicable with the first oil chamber Y1 at the fifth oil passage ports 2-79P1 and communicable with the first intermediate chamber 2-P1 at the sixth oil passage ports 2-79P2.

In this embodiment, as illustrated in FIG. 21, at an end portion of the valve seat 2-71 on the other side, the second oil passage ports 2-77P2 of the compression-side oil passages 2-77 and the fourth oil passage ports 2-78P2 of the first rebound-side oil passages 2-78 are arranged side by side in the circumferential direction. That is, the fourth oil passage ports 2-78P2 of the first rebound-side oil passages 2-78 are located on the circumference on which the second oil passage ports 2-77P2 of the compression-side oil passages 2-77 are located.

As illustrated in FIG. 19(a), the valve seat 2-71 includes a first round 2-71R0 on an end portion on the one side. The first round 2-71R0 protrudes from other surfaces of the valve seat 2-71 and surrounds the fifth oil passage ports 2-79P1.

As illustrated in FIG. 21, the valve seat 2-71 also includes a common round 2-71R1 on an end portion on the other side. The common round 2-71R1 protrudes from other surfaces of the valve seat 2-71 so as to be a common portion surrounding the second oil passage ports 2-77P2 and the fourth oil passage ports 2-78P2. The valve seat 2-71 includes compression-side rounds 2-71R2 on the end portion on the other side. The compression-side rounds 2-71R2 protrude from other surfaces of the valve seat 2-71. The compression-side round 2-71R2 and the common round 2-71R1 surround each second oil passage port 2-77P2. The valve seat 2-71 includes rebound-side rounds 2-71R3 on the end portion on the other side. The rebound-side rounds 2-71R3 protrude from other surfaces of the valve seat 2-71. The rebound-side round 2-71R3 and the common round 2-71R1 surround each fourth oil passage port 2-78P2.

The common round 2-71R1, the compression-side rounds 2-71R2, and the rebound-side rounds 2-71R3 described above are formed to have approximately the same protrusion height on the end portion of the valve seat 2-71 on the other side. The common round 2-71R1, the compression-side rounds 2-71R2, and the rebound-side rounds 2-71R3 (corresponding to the first rounds and the second rounds) are arranged on the end portion of the valve seat 2-71 on the other side and form a portion in contact with the damping valve 2-72.

As illustrated in FIG. 21, the common round 2-71R1 has an approximately annular shape.

The compression-side round 2-71R2 includes a circumferential wall 2-R21, and two radial walls 2-R22. The circumferential wall 2-R21 is formed outside of the second oil passage port 2-77P2 in the radial direction and extends in an approximately arcuate shape in the circumferential direction. The radial walls 2-R22 are formed outside of the second oil passage port 2-77P2 in the circumferential direction and extend in approximately linear shapes in the radial direction.

The rebound-side round 2-71R3 includes a circumferential wall 2-R31 and two radial walls 2-R32. The circumferential wall 2-R31 is formed outside of the fourth oil passage port 2-78P2 in the radial direction and extends in an approximately arcuate shape in the circumferential direction. The radial walls 2-R32 are formed outside of the fourth oil passage port 2-78P2 in the circumferential direction and extend in an approximately linear shape in the radial direction.

It is noted that in this embodiment, the circumferential wall 2-R21 of the compression-side round 2-71R2 and the circumferential wall 2-R31 of the rebound-side round 2-71R3 are formed on approximately the same circumference.

As illustrated in FIG. 19(a) and FIG. 19(b), the damping valve 2-72 is a disk-shaped metal plate having a through hole 2-72H in the center in the radial direction in which the first holding portion 2-73 is inserted. The damping valve 2-72 is pressed against an end portion of the valve seat 2-71 on the other side by the first holding portion 2-73. As illustrated in FIG. 20(a) and FIG. 20(b), the damping valve 2-72 allows the second oil passage ports 2-77P2 of the compression-side oil passages 2-77 and the fourth oil passage ports 2-78P2 of the first rebound-side oil passages 2-78 in the valve seat 2-71 to be open and closed, and the damping valve 2-72 constantly opens the sixth oil passage ports 2-79P2 of the second rebound-side oil passages 2-79.

It is noted that in embodiment 6, as illustrated in FIG. 20(a) and FIG. 20(b), the contact portion 2-327a of the press member 2-327 is in contact, at a single position in the radial direction, with the portion of the damping valve 2-72 to which the compression-side oil passages 2-77 and the first rebound-side oil passages 2-78 are opposed.

As illustrated in FIG. 18, the first holding portion 2-73 and the valve seat 2-71 clamp the damping valve 2-72, and the first holding portion 2-73 presses the damping valve 2-72 to the other side of the valve seat 2-71. The first holding portion 2-73 includes a guide portion 2-731 and an opening 2-732. It is noted that the configuration of the first holding portion 2-73 is similar to the configuration of the first holding bolt 2-43 in embodiment 5.

The reversing passage portion 2-74 includes an opening 2-741 and the reversing passages 2-742. The opening 2-741 penetrates in the axial direction. The reversing passages 2-742 extend diagonally from the one side to the other side. The reversing passage portion 2-74 is secured to the first holding portion 2-73 on the other side.

The opening 2-741 is a through hole extending in the axial direction. On the other side, the opening 2-741 communicates with the one side of the first holding portion 2-73. A second holding bolt 2-763, described later, of the second holding portion 2-76 is inserted in the opening 2-741 on the one side. The opening 2-741 is closed on the other side.

As illustrated in FIG. 19(a) and FIG. 19(b), the second check valve 2-75 is an approximately disk-shaped metal plate having a through hole 2-75H in the center in which the second holding portion 2-76 is inserted. As illustrated in FIG. 20(a) and FIG. 20(b), the second check valve 2-75 is pressed against an end portion of the valve seat 2-71 on the one side by the second holding portion 2-76. The second check valve 2-75 constantly opens the first oil passage ports 2-77P1 of the compression-side oil passages 2-77 and allows the third oil passage ports 2-78P1 of the first rebound-side oil passages 2-78 and the fifth oil passage ports 2-79P1 of the second rebound-side oil passages 2-79 to be open and closed.

As illustrated in FIG. 19(a) and FIG. 19(b), the second holding portion 2-76 includes a plurality of ring members 2-761, a washer 2-762, and the second holding bolt 2-763. The ring members 2-761 are disposed on the one side of the second check valve 2-75. The washer 2-762 is disposed on the one side of the ring members 2-761. The second holding bolt 2-763 is disposed on the one side of the washer 2-762.

As illustrated in FIG. 18, the ring members 2-761 are opposed to the first oil passage ports 2-77P1 of the compression-side oil passages 2-77 through the second check valve 2-75. The outer diameter of the ring members 2-761 is closer to the center in the radial direction than the positions of the first oil passage ports 2-77P1 are to the center.

The second holding bolt 2-763 is secured on the one side of the opening 2-741 of the reversing passage portion 2-74. The second holding bolt 2-763 and an end portion of the valve seat 2-71 on the one side clamp the second check valve 2-75, the ring members 2-761, and the washer 2-762. The second holding bolt 2-763 presses the second check valve 2-75 to the one side of the valve seat 2-71.

The piston portion 2-230 of the above-described configuration includes the first intermediate chamber 2-P1 and the second intermediate chamber 2-P2. The first intermediate chamber 2-P1 and the second intermediate chamber 2-P2 are separate from the first oil chamber Y1 and the second oil chamber Y2 and contain oil. The second oil passage ports 2-77P2 of the compression-side oil passages 2-77, the fourth oil passage ports 2-78P2 of the first rebound-side oil passages 2-78, and the damping valve 2-72 are disposed in the first intermediate chamber 2-P1. The check valve 2-332 (allowing and restriction member) of the check valve unit 2-33 and the second check valve 2-75 (allowing and restriction member) of the second damping unit 2-70 allow or restrict oil flows from the first oil chamber Y1 and the second oil chamber Y2 to the first intermediate chamber 2-P1 and the second intermediate chamber 2-P2 in accordance with displacements of the piston portion 2-230 in one direction of the axial direction and in other direction of the axial direction.

[Operation of Hydraulic Damper 1 in Embodiment 6]

Figure 22:
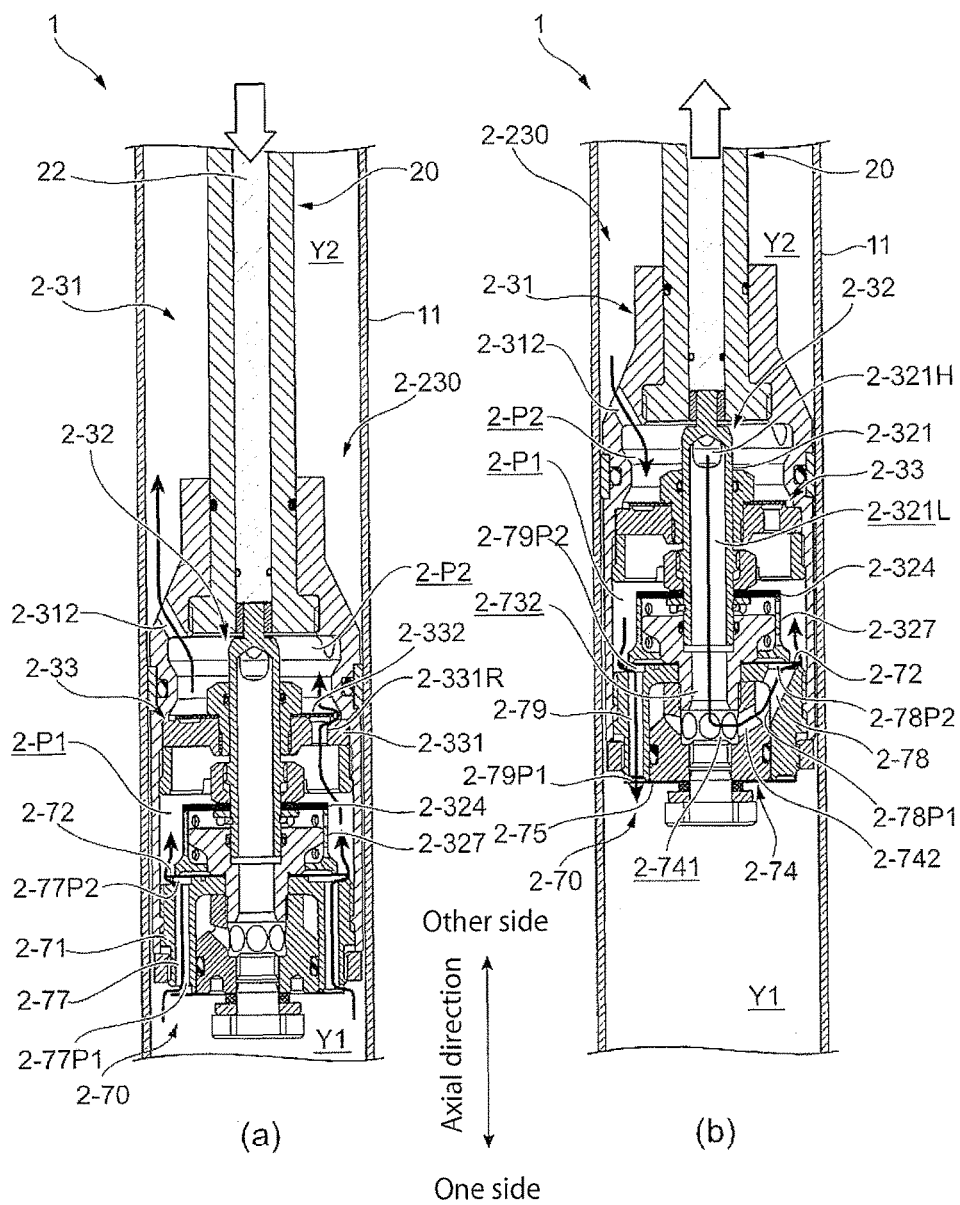
FIG. 22 illustrates an operation of a hydraulic damper in embodiment 6.

FIG. 22(a) ((a) of FIG. 22) and FIG. 22(b) ((b) of FIG. 22) illustrate an operation of the hydraulic damper 1. FIG. 22(a) illustrates the oil flow at the time of a compression stroke, and FIG. 22(b) illustrates the oil flow at the time of a rebound stroke.

First, the oil flow at the time of a compression stroke of the hydraulic damper 1 will be described.

As illustrated in FIG. 22(a), when the piston portion 2-230 is displaced toward the one side in the axial direction relative to the cylinder portion 10, as indicated by the outlined arrow, the displacement of the piston portion 2-230 causes the oil in the first oil chamber Y1 to be pressed to increase the pressure in the first oil chamber Y1.

The oil pressure in the first oil chamber Y1 increased by the displacement of the piston portion 2-230 toward the one side in the axial direction causes the oil to flow from the first oil passage ports 2-77P1 of the valve seat 2-71 to the compression-side oil passages 2-77. Then, the oil flows in the compression-side oil passages 2-77 in a specified direction from the one side to the other side in the axial direction. The oil flows against the force from the press member 2-327, forces the damping valve 2-72 open, and flows from the second oil passage ports 2-77P2 into the first intermediate chamber 2-P1. Resistance occurring when the oil flows in the compression-side oil passages 2-77 and the damping valve 2-72 causes damping force at the time of a compression stroke.

The oil, which has flowed into the first intermediate chamber 2-P1, flows to the oil passages 2-331R of the check valve unit 2-33. Then, the oil forces the check valve 2-332 open and flows into the second intermediate chamber 2-P2. Further, the oil passes through the housing oil passages 2-312 of the piston housing 2-31 and flow into the second oil chamber Y2.

In the above-described manner, in the hydraulic damper 1 in this embodiment, in accordance with the displacement of the piston portion 2-230 in one direction (displacement toward the one side in the axial direction), the oil flow is generated from the first oil chamber Y1 to the second oil chamber Y2. The oil flow is controlled by the compression-side oil passages 2-77 and the damping valve 2-72 so as to generate the damping force.

Next, the oil flow at the time of a rebound stroke of the hydraulic damper 1 will be described.

As illustrated in FIG. 22(b), when the piston portion 2-230 is displaced toward the other side in the axial direction relative to the cylinder portion 10, as indicated by the outlined arrow, the displacement of the piston portion 2-230 causes the oil in the second oil chamber Y2 to be pressed to increase the oil pressure in the second oil chamber Y2.

The oil pressure in the second oil chamber Y2 increased by the displacement of the piston portion 2-230 toward the other side in the axial direction causes the oil to flow from the housing oil passages 2-312 of the piston housing 2-31 into the second intermediate chamber 2-P2.

It is noted that since the oil under the increased pressure flows into the second intermediate chamber 2-P2, the pressure in the second oil chamber Y2 (second intermediate chamber 2-P2) is relatively higher than the pressure in the first intermediate chamber 2-P1. Therefore, the check valve 2-332 does not open the oil passages 2-331R, and no oil flow is generated through the check valve unit 2-33.

Then, the oil in the second intermediate chamber 2-P2 passes through the spool openings 2-321H, the hollow portion 2-321L, and the opening 2-732 and flows into the opening 2-741 of the reversing passage portion 2-74. In the opening 2-741, the flow direction of the oil is reversed, and the oil flows to the reversing passages 2-742. Further, the oil flows from the third oil passage ports 2-78P1 to the first rebound-side oil passages 2-78. The oil, which has flowed from the other side to the one side in the axial direction in this manner, is reversed in the reversing passage portion 2-74 and flows from the one side to the other side in the axial direction. That is, the oil flows along the flow in the specified direction in the compression-side oil passages 2-77 at the time of the compression stroke described above.

Then, the oil in the first rebound-side oil passages 2-78 flows against the force from the press member 2-327, forces the damping valve 2-72 open, and flows from the fourth oil passage ports 2-78P2 into the first intermediate chamber 2-P1. Resistance occurring when the oil flows in the first rebound-side oil passages 2-78 and the damping valve 2-72 causes the damping force.

The oil in the first intermediate chamber 2-P1 flows from the sixth oil passage ports 2-79P2 to the second rebound-side oil passages 2-79. The oil in the second rebound-side oil passages 2-79 forces the second check valve 2-75 open to flow from the fifth oil passage ports 2-79P1 into the first oil chamber Y1.

In the above-described manner, in accordance with the displacement of the piston portion 2-230 in the other direction (displacement toward the other side in the axial direction in this embodiment), the oil flow is generated from the second oil chamber Y2 to the first oil chamber Y1. The oil flow is controlled by the first rebound-side oil passages 2-78, the second rebound-side oil passages 2-79, and the damping valve 2-72 so as to generate the damping force at the time of the rebound stroke.

It is noted that also in the hydraulic damper 1 to which embodiment 6 is applied, the transmission member 22 is displaced toward the one side to change the load applied to the damping valve 2-72 by the press unit 2-32. The hydraulic damper 1 to which embodiment 6 is applied also ensures, with the simplified configuration, comprehensive change of damping force in the flows in both of the directions of the rebound stroke and the compression stroke.

Moreover, in the hydraulic damper 1 in embodiment 6, the compression-side oil passages 2-77 and the first rebound-side oil passages 2-78 are disposed side by side in the circumferential direction on approximately the same circumference. Thus, the hydraulic damper 1 in embodiment 6 makes uniform the damping force generated at the time of the rebound stroke in which the piston portion 2-230 is displaced toward the one side and the damping force generated at the time of the compression stroke in which the piston portion 2-230 is displaced toward the other side.

The contact portion 2-327a of the press member 2-327 is in contact with the damping valve 2-72 at a single position in the radial direction in the portion of the damping valve 2-72 to which the second oil passage ports 2-77P2 and the fourth oil passage ports 2-78P2 are opposed. This further makes uniform the damping force generated at the time of the rebound stroke and the damping force generated at the time of the compression stroke.

<Embodiment 7>

Figure 23:
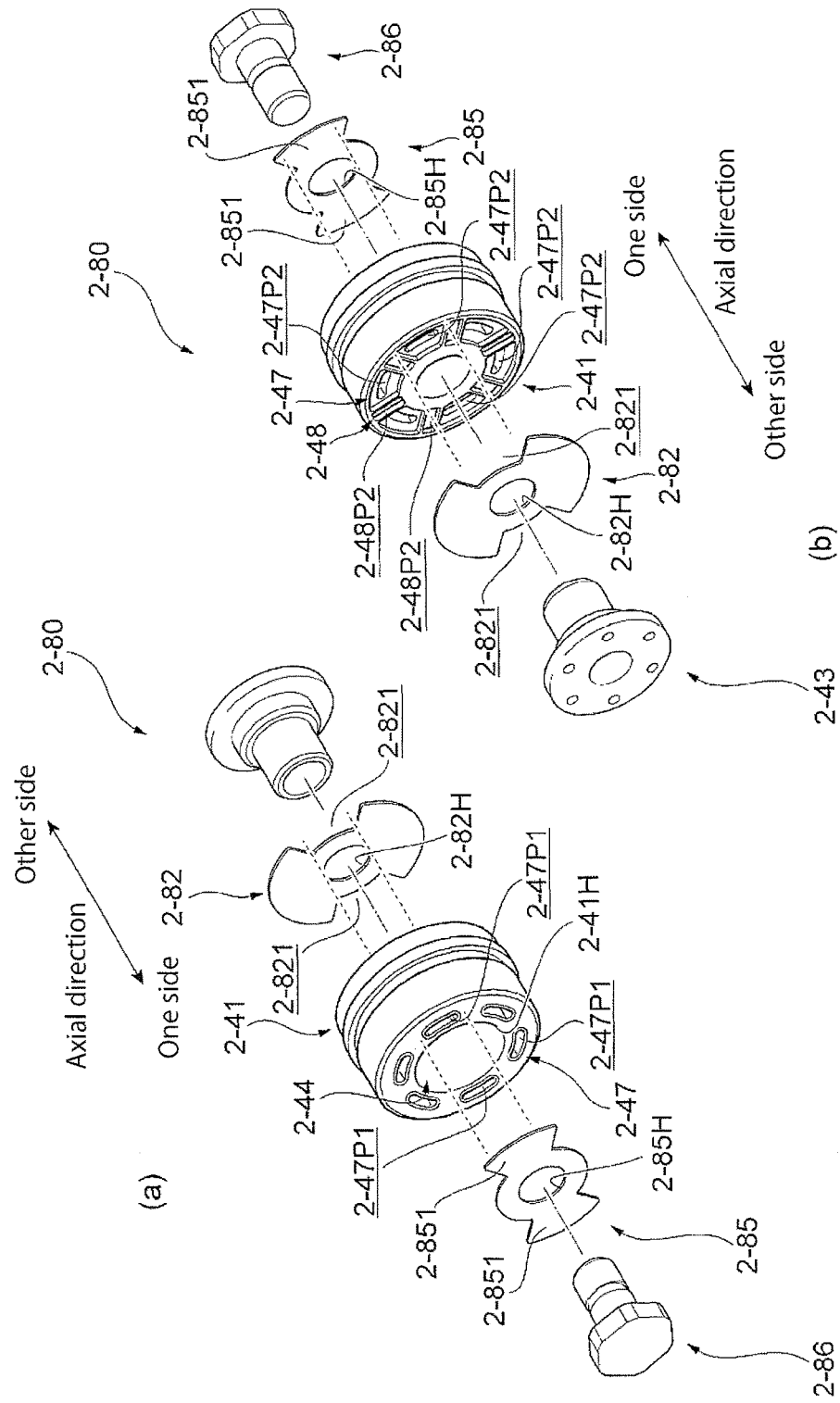
FIG. 23 illustrates a damping unit in embodiment 7.

FIG. 23 is exploded perspective views of a third damping unit 2-80 in embodiment 7. FIG. 23(a) ((a) of FIG. 23) is a view of the third damping unit 2-80 from the one side in the axial direction, and FIG. 23(b) ((b) of FIG. 23) is a view of the third damping unit 2-80 from the other side in the axial direction.

It is noted that similar elements to the elements of other embodiments will be denoted with the same reference numerals and will not be elaborated here.

(Third Damping Unit 2-80)

As illustrated in FIG. 23(a) and FIG. 23(b), the third damping unit 2-80 includes the valve seat 2-41, a third damping valve 2-82, the first holding bolt 2-43, the reversing passage portion 2-44, a third check valve 2-85, and a second holding bolt 2-86. The valve seat 2-41 includes a plurality of oil passages. The third damping valve 2-82 is disposed on the other side of the valve seat 2-41. The first holding bolt 2-43 is disposed on the other side of the valve seat 2-41. The reversing passage portion 2-44 is disposed inside of the valve seat 2-41. The third check valve 2-85 is disposed on the one side of the valve seat 2-41. The second holding bolt 2-86 holds the third check valve 2-85 on the valve seat 2-41.

In this manner, the third damping unit 2-80 is different from the damping unit 2-40 in embodiment 5 in including the third damping valve 2-82, the third check valve 2-85, and the second holding bolt 2-86. The third damping valve 2-82 and the third check valve 2-85 will be described in detail below.

The third damping valve 2-82 is, on the whole, an approximately disk-shaped metal plate having a bolt hole 2-82H in the center in which the first holding bolt 2-43 is inserted. The third damping valve 2-82 also includes a plurality of (two in this embodiment) openings 2-821 formed by cutting away the third damping valve 2-82 from the outer circumference toward the center. As illustrated in FIG. 23(*b*), the openings 2-821 correspond to the second oil passage ports 2-47P2 of the compression-side oil passages 2-47. The third damping valve 2-82 constantly opens the second oil passage ports 2-47P2 opposed to the openings 2-821 at the positions where the openings 2-821 are formed. The third damping valve 2-82 allows the second oil passage ports 2-47P2 and the fourth oil passage ports 2-48P2 to be open and closed at the positions where the openings 2-821 are not formed.

The third check valve 2-85 is, on the whole, an approximately disk-shaped metal plate having a through hole 2-85H in the center in which the second holing bolt 2-86 is inserted. The third check valve 2-85 also includes a plurality of (two in this embodiment) protrusions 2-851 further protruding in the radial direction from the outer circumference. As illustrated in FIG. 23(*a*), the protrusions 2-851 correspond to the first oil passage parts 2-47P1 of the compression-side oil passages 2-47. The phase of the third check valve 2-85 relative to the valve seat 2-41 is arranged in such a manner that the protrusions 2-851 are opposed to the compression-side oil passages 2-47 identical with the compression-side oil passages 2-47 opened by the openings 2-821 of the third damping valve 2-82. The third check valve 2-85 allows, to be open and closed, the first oil passage ports 2-47P1 opposed to the protrusions 2-851 at the positions where the protrusions 2-851 are formed. The third check valve 2-85 constantly opens the first oil passage ports 2-47P1 at the positions where the protrusions 2-851 are not formed.

[Operation of Hydraulic Damper 1 in Embodiment 7]

Figure 24:
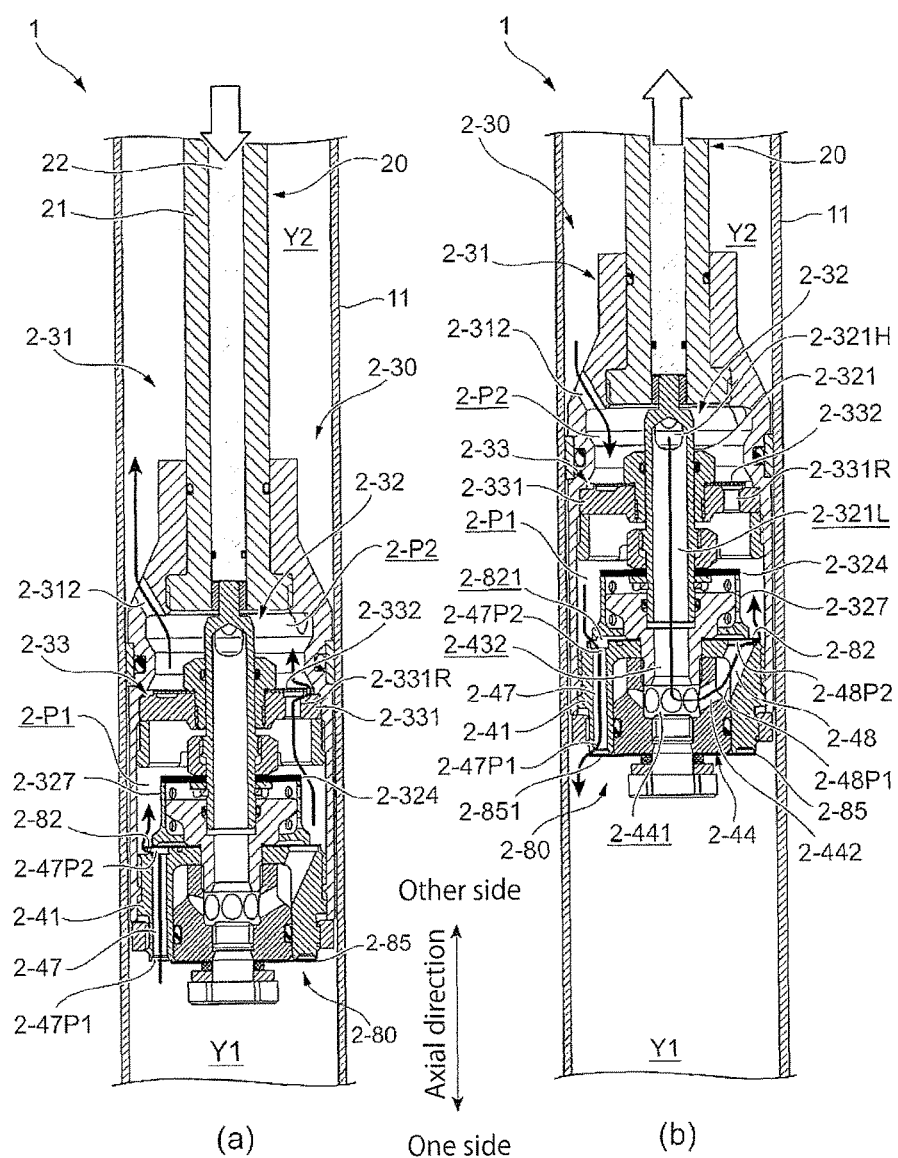
FIG. 24 illustrates an operation of a hydraulic damper in embodiment 7.

FIG. 24(*a*) ((a) of FIG. 24) and FIG. 24(*b*) ((b) of FIG. 24) illustrate an operation of the hydraulic damper 1 in embodiment 7. FIG. 24(*a*) illustrates the oil flow at the time of a compression stroke, and FIG. 24(*b*) illustrates the oil flow at the time of a rebound stroke.

As illustrated in FIG. 24(*a*), at the time of a compression stroke, the oil flows into the compression-side oil passages 2-47 from the first oil passage ports 2-47P1 to which the protrusions 2-851 (see FIG. 24(*a*)) of the third check valve 2-85 are not opposed. The oil flow after this is the same as in the hydraulic damper 1 in embodiment 5.

As illustrated in FIG. 24(*b*), the oil flow at the time of a rebound stroke in the third damping unit 2-80 is the same from the second oil chamber Y2 to the rebound-side oil passages 2-48. Then, in the hydraulic damper 1 in embodiment 7, the oil flow after the rebound-side oil passages 2-48 is different from the oil flow in the hydraulic damper 1 in embodiment 5. Specifically, at the time of the rebound stroke, as illustrated in FIG. 24(*b*), the oil, which has flowed from the fourth oil passage ports 2-48P2 of the rebound-side oil passages 2-48 to the first intermediate chamber 2-P1, flows into the compression-side oil passages 2-47 from the second oil passage ports 2-47P2 to which the openings 2-821 of the third damping valve 2-82 are opposed. The oil from the second oil passage ports 2-47P2 forces the protrusions 2-851 of the third check valve 2-85 open to flow into the first oil chamber Y1.

In the third damping unit 2-80 in embodiment 7, when the oil flows from the first intermediate chamber 2-P1 to the first oil chamber Y1 at the time of the rebound stroke, the oil flows into the compression-side oil passages 2-47 opened by the openings 2-821 so as to stabilize the oil flow.

It is noted that the hydraulic damper 1 to which embodiment 7 is applied also ensures, with the simplified configuration, comprehensive change of the damping force in the flows in both of the directions of the rebound stroke and the compression stroke.

In the hydraulic damper 1 in embodiment 7 as well, the compression-side oil passages 2-47 and the rebound-side oil passages 2-48 are disposed side by side in the circumferential direction and on approximately the same circumference. Thus, the hydraulic damper 1 in embodiment 7 makes uniform the damping force generated at the time of the rebound stroke and the damping force generated at the time of the compression stroke.

<Embodiment 8>

Figure 25:
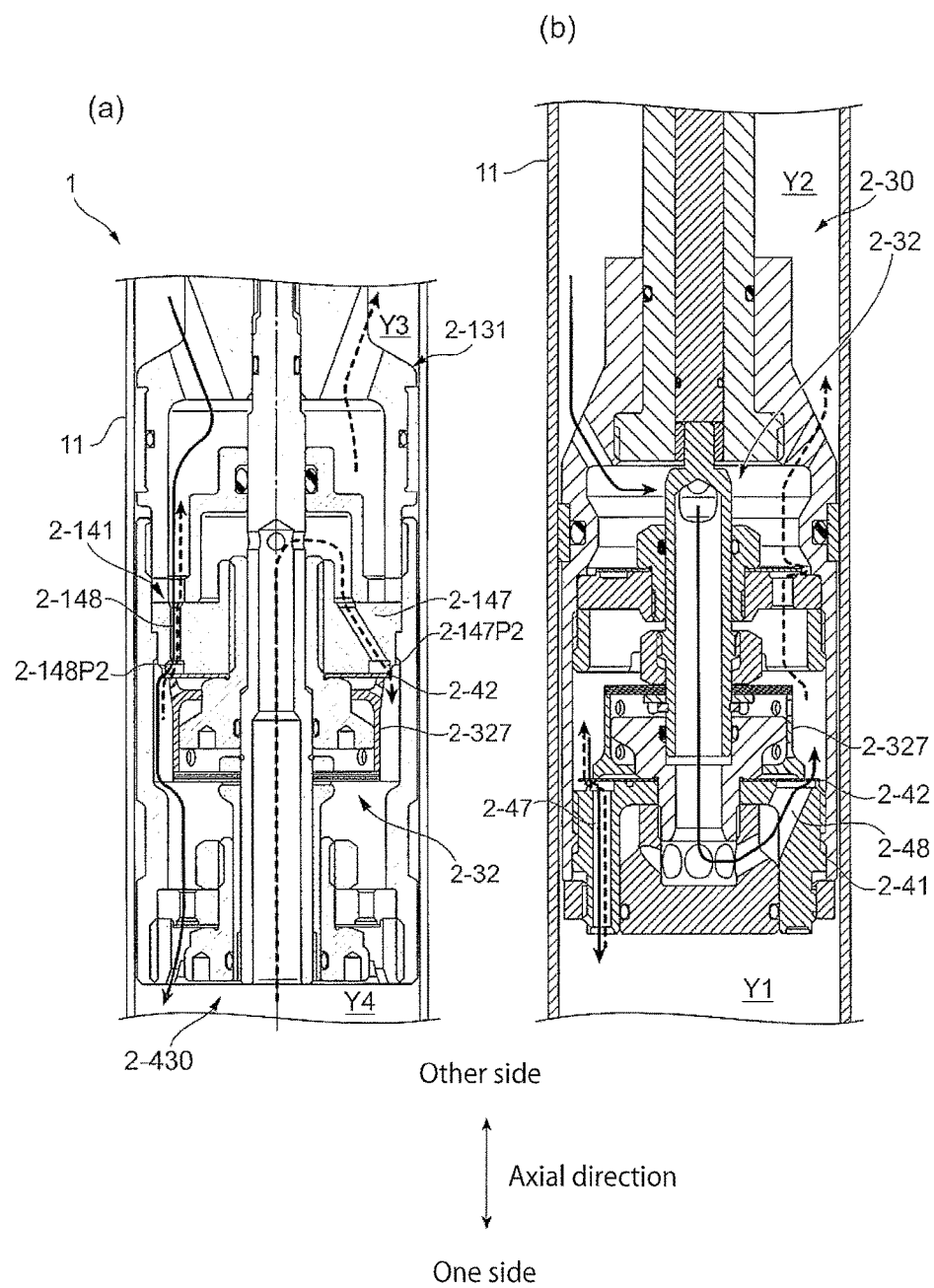
FIG. 25 illustrates a piston portion in embodiment 8.

FIG. 25 illustrates a piston portion 2-430 in embodiment 8.

FIG. 25(*a*) ((a) of FIG. 25) is a whole view of the piston portion 2-430 in embodiment 8, and FIG. 25(*b*) ((b) of FIG. 25) is a whole view of the piston portion 2-30 in embodiment 5 for comparison.

In the hydraulic damper 1 to which embodiment 8 is applied and which is illustrated in FIG. 25(*a*), as compared with the piston portion 2-30 in embodiment 5 illustrated in FIG. 25(*b*), the position and the displacement direction of the damping valve 2-42 relative to the oil passages to generate damping force (2-47, 2-48) and the position and the displacement direction of the press unit 2-32 to apply a load to the damping valve 2-42 are reversed in the vertical direction.

That is, when the press member 2-327 is displaced in the "drawing direction" from the one side to the other side by the press unit 2-32, the relationship between the passages for the oil flow at the time of a compression stroke and the passages for the oil flow at the time of a rebound stroke is reversed to the relationship when the press unit 2-32 in embodiment 5 is displaced in the "pressing direction" from the one side to the other side.

Specifically, as illustrated in FIG. 25, the hydraulic damper 1 (pressure damper) in embodiment 8 includes the cylinder 11, the piston portion 2-430 (defining member), a valve seat 2-141 (passage forming portion), rebound-side oil passages 2-148 (first passages), compression-side oil passages 2-147 (second passages), and the damping valve 2-42. The cylinder 11 contains oil (fluid). The piston portion 2-430 is disposed in the cylinder 11 movably in the axial direction, and defines a space in the cylinder 11 into the third oil chamber Y3 (first fluid chamber) and the fourth oil chamber Y4 (second fluid chamber). The valve seat 2-141 is disposed in the piston portion 2-430 and forms passages of the oil. The rebound-side oil passages 2-148 are formed in the valve seat 2-141. The rebound-side oil passages 2-148 cause the oil, which flows from the third oil chamber Y3 to the fourth oil chamber Y4 in accordance with a displacement of the piston portion 2-430 in one direction of the axial direction (direction toward the other side in FIG. 25), to flow in a direction from the other side to the one side (specified direction) and be discharged from second oil passage ports 2-148P2 (first passage ports) disposed on an end portion of the valve seat 2-141. The compression-side oil passages 2-147 are formed in the valve seat 2-41. The compression-side oil passages 2-147 cause the oil, which flows from the fourth oil chamber Y4 to the third oil chamber Y3 in accordance with a displacement of the piston portion 2-430 in the other axial direction (direction toward the one side in FIG. 25), to flow in the direction from the other side to the one side (specified direction) and be discharged from fourth oil passage ports 2-147P2 (second passage ports) disposed on an end portion of the valve seat 2-41 in the axial direction and on the circumference on which the second oil passage ports 2-148P2 are located. The damping valve 2-42 opens and closes the fourth oil passage ports 2-147P2 and the second oil passage ports 2-148P2 so as to control the oil flows in the rebound-side oil passages 2-148 and the compression-side oil passages 2-147.

It is noted that the configuration that has been described as embodiment 8 is based on the configuration of the hydraulic damper 1 according to embodiment 5. In the configuration in embodiment 8, the load application direction of the press unit 2-32 is changed from the "pressing direction" to the "drawing direction", and the passages in which the oil flows at the time of a compression stroke and at the time of a rebound stroke are reversed. This, however, should not be construed in a limiting sense. The hydraulic dampers 1 according to embodiment 6 and embodiment 7 may be used as a basic configuration, with which the load application direction of the press unit 2-32 may be changed from the "pressing direction" to the "drawing direction", and the passages in which the oil flows at the time of a compression stroke and at the time of a rebound stroke may be reversed. As described above, by the displacement in the "drawing direction" from the one side to the other side, the above-described valve may be pressed from the one side to the other side to adjust deformability of the valve to change the damping force in the hydraulic damper 1.

The hydraulic damper 1 to which embodiment 8 is applied also ensures, with the simplified configuration, comprehensive change of the damping force in the flows in both of the directions of the rebound stroke and the compression stroke.

In the hydraulic damper 1 in embodiment 8 as well, the compression-side oil passages 2-147 and the rebound-side oil passages 2-148 are disposed side by side in the circumferential direction and on approximately the same circumference. Thus, the hydraulic damper 1 in embodiment 8 also makes uniform the damping force generated at the time of the rebound stroke and the damping force generated at the time of the compression stroke.

<Embodiment 9>

Figure 26:
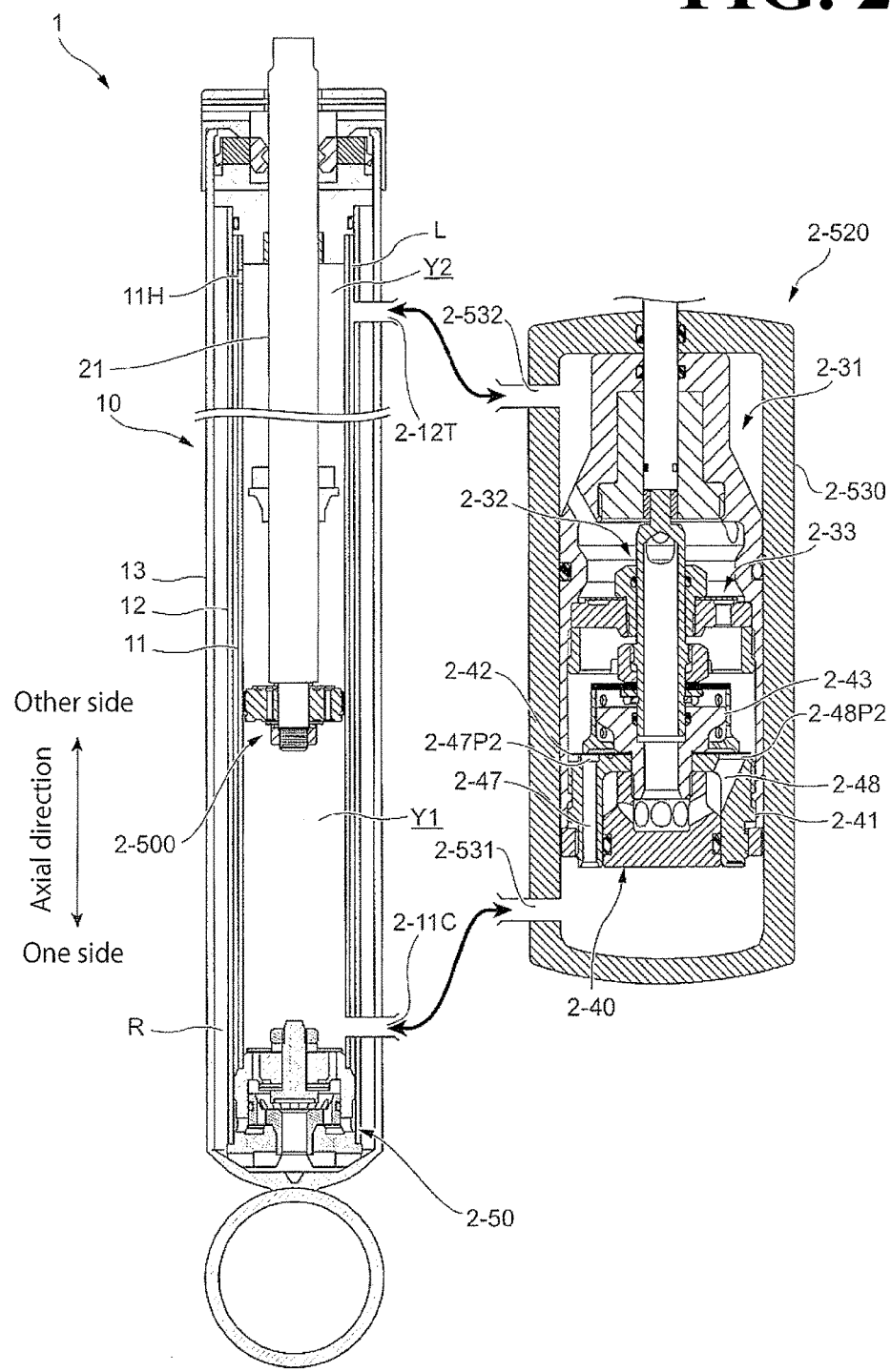
FIG. 26 illustrates a hydraulic damper in embodiment 9.

FIG. 26 illustrates the hydraulic damper 1 in embodiment 9.

In the description of embodiment 9, similar elements to the elements in other embodiments will be denoted with the same reference numerals and will not be elaborated here.

In embodiment 5, for example, the mechanism to generate damping force (piston portion 2-30) is disposed in the cylinder 11. This, however, should not be construed in a limiting sense. A mechanism to generate damping force may be provided separately from the cylinder 11.

As illustrated in FIG. 26, in the hydraulic damper 1 in embodiment 9, a normal piston 2-500 is disposed on an end portion of the rod member 21 on the one side in the cylinder 11. The hydraulic damper 1 in embodiment 9 includes a damping force generator 2-520 outside of the cylinder 11.

The damping force generator 2-520 includes a second cylinder 2-530 having an approximately hollow cylindrical shape and containing oil. The second cylinder 2-530 includes a first communication passage 2-531 and a second communication passage 2-532. The second cylinder 2-530 accommodates the elements of the piston portion 2-30 in embodiment 5 described above. As illustrated in FIG. 26, the first communication passage 2-531 communicates with a cylinder second opening 2-11C formed in the cylinder 11 to allow the oil to flow between the first communication passage 2-531 and the first oil chamber Y1. As illustrated in FIG. 26, the second communication passage 2-532 communicates with an outer hollow cylindrical member opening 2-12T formed in the outer hollow cylindrical member 12 to allow the oil to flow between the second communication passage 2-532 and the communication passage L. It is noted that the second communication passage 2-532 may communicate with the second oil chamber Y2.

In the hydraulic damper 1 in embodiment 9, as illustrated in FIG. 26, the damping force generator 2-520 (damping force generation mechanism) includes the valve seat 2-41 (passage forming portion), the compression-side oil passages 2-47 (first passages), the rebound-side oil passages 2-48 (second passages), and the damping valve 2-42. The valve seat 2-41 forms passages of oil that flows in accordance with a displacement of the piston 2-500 (defining member). The piston 2-500 defines a space in the cylinder 11 that contains the oil (fluid) into the first oil chamber Y1 (first fluid chamber) and the second oil chamber Y2 (second fluid chamber). The piston 2-500 is disposed movably in the axial direction of the cylinder 11. The compression-side oil passages 2-47 are formed in the valve seat 2-41 and cause the oil, which flows from the first oil chamber Y1 to the second oil chamber Y2 in accordance with a displacement of the piston 2-500 in one direction of the axial direction, to flow in a specified direction and be discharged from the second oil passage ports 2-47P2 (first passage ports) arranged on the end portion of the valve seat 2-41. The rebound-side oil passages 2-48 are formed in the valve seat 2-41 and cause the oil, which flows from the second oil chamber Y2 to the first oil chamber Y1 in accordance with a displacement of the piston 2-500 in the other axial direction, to flow along the specified direction and be discharged from the fourth oil passage ports 2-48P2 (second passage ports) arranged on the end portion of the valve seat 2-41 in the axial direction on the circumference on which the second oil passage ports 2-47P2 are located. The damping valve 2-42 opens and closes the second oil passage ports 2-47P2 and the fourth oil passage ports 2-48P2 so as to control the oil flows in the compression-side oil passages 2-47 and the rebound-side oil passages 2-48.

It is noted that the hydraulic damper 1 in embodiment 9 also ensures, with the simplified configuration, comprehensive change of the damping force in the flows in both of the directions of the rebound stroke and the compression stroke.

In the hydraulic damper 1 in embodiment 9 as well, the compression-side oil passages 2-47 and the rebound-side oil passages 2-48 are disposed side by side in the circumferential direction and on approximately the same circumference. Thus, the hydraulic damper 1 in embodiment 9 makes uniform the damping force generated at the time of the rebound stroke and the damping force generated at the time of the compression stroke.

The damping force generator 2-520 in the hydraulic damper 1 in embodiment 9 may incorporate the configuration of the piston portion (30, 60, 80, 130, 2-30, 2-230, 2-430, for example) and the damping unit (2-80) to which embodiment 1 to embodiment 8 are applied.

<Embodiment 10>

Figure 28:
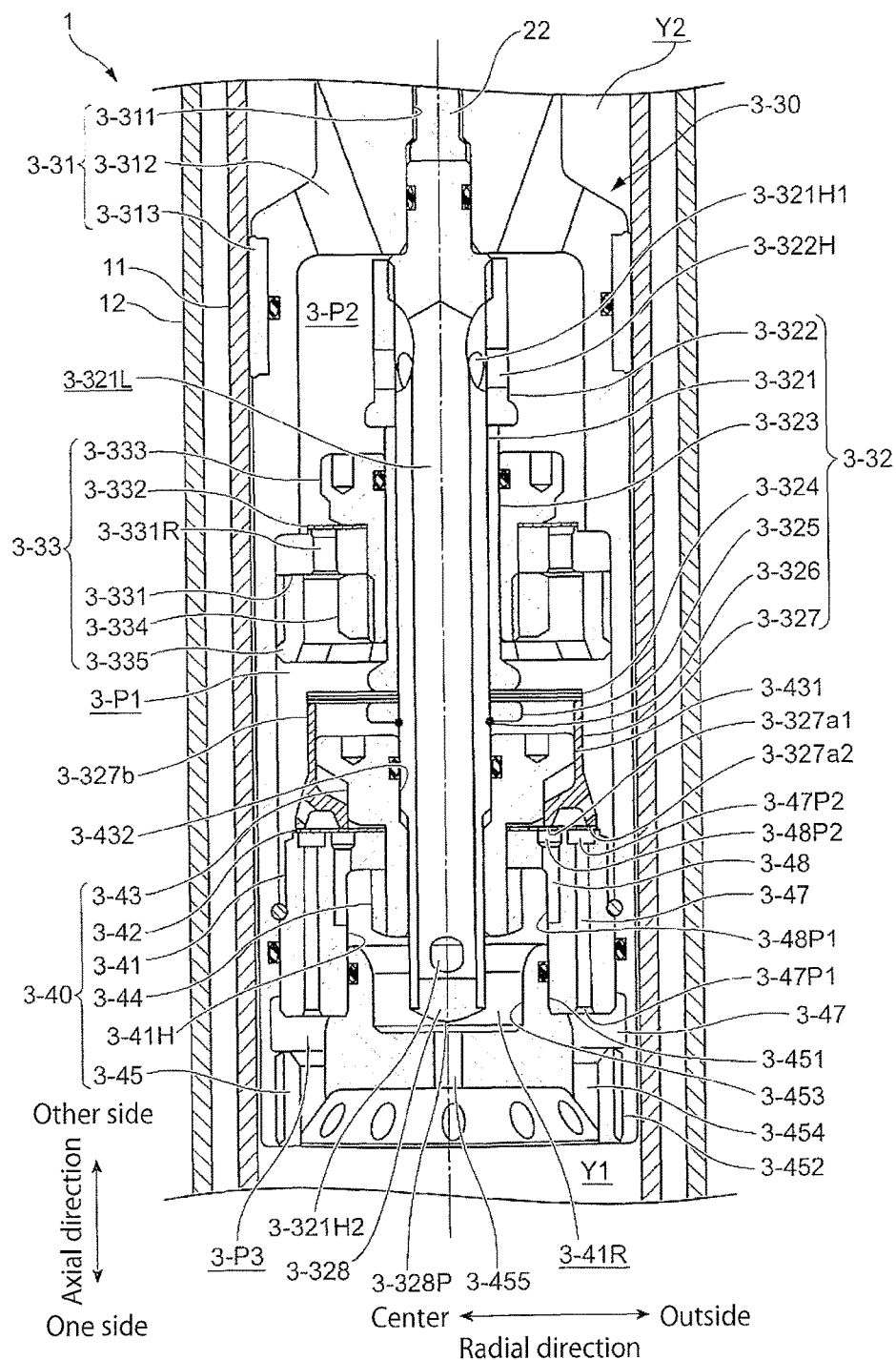
FIG. 28 is an enlarged view of a piston portion and its vicinity in embodiment 10.

FIG. 28 is an enlarged view of a piston portion 3-30 and its vicinity in embodiment 10.

In the description of embodiment 10, similar elements to the elements of other embodiments will be denoted with the same reference numerals and will not be elaborated here.

As illustrated in FIG. 28, the piston portion 3-30 includes a piston housing 3-31, a damping unit 3-40, a press unit 3-32, and a check valve unit 3-33. The piston housing 3-31 accommodates elements constituting the piston portion 3-30 and oil. The damping unit 3-40 is disposed on the one side of the piston housing 3-31. The press unit 3-32 is disposed on the other side of the damping unit 3-40. The check valve unit 3-33 is disposed on the other side of the damping unit 3-40.

The damping unit 3-40 includes a valve seat 3-41, a damping valve 3-42, a holding bolt 3-43, a nut 3-44, and a lock piece 3-45. The valve seat 3-41 includes a plurality of oil passages. The damping valve 3-42 is disposed on the other side of the valve seat 3-41. The holding bolt 3-43 is disposed on the other side of the damping valve 3-42. The nut 3-44 is disposed on the one side of the holding bolt 3-43. The lock piece 3-45 is disposed on the one side of the valve seat 3-41.

As illustrated in FIG. 1 and FIG. 28, the piston portion 3-30 defines a space in the cylinder 11 into the first oil chamber Y1 and the second oil chamber Y2 that contain oil. In this embodiment, the first oil chamber Y1 is formed on the one side of the piston portion 3-30, and the second oil chamber Y2 is formed on the other side of the piston portion 3-30.

As illustrated in FIG. 28, the piston portion 3-30 forms a first intermediate chamber 3-P1, a second intermediate chamber 3-P2, and a third intermediate chamber 3-P3 in the piston housing 3-31. The first intermediate chamber 3-P1, the second intermediate chamber 3-P2, and the third intermediate chamber 3-P3 are separate from the first oil chamber Y1 and the second oil chamber Y2 and contain the oil. In this embodiment, on the one side of the piston housing 3-31, the first intermediate chamber 3-P1 is defined by the press unit 3-32, the check valve unit 3-33, and the damping unit 3-40. On the other side of the piston housing 3-31, the second intermediate chamber 3-P2 is defined by the press unit 3-32 and the check valve unit 3-33. The third intermediate chamber 3-P3 is defined by the damping unit 3-40.

As illustrated in FIG. 1 and FIG. 28, the hydraulic damper 1 (pressure damper) in embodiment 10 includes the cylinder 11, the piston portion 3-30 (defining member), the valve seat 3-41 (passage forming portion), compression-side oil passages 3-47 (first passages), rebound-side oil passages 3-48 (second passages), the damping valve 3-42 (control means), and a through hole 3-455 (bypass passage), described later. The cylinder 11 contains oil (fluid). The piston portion 3-30 is disposed in the cylinder 11 movably in the axial direction, and defines the space in the cylinder 11 into the first oil chamber Y1 and the second oil chamber Y2. The valve seat 3-41 is disposed in the piston portion 3-30 to form passages of the oil. The compression-side oil passages 3-47 are formed in the valve seat 3-41. The compression-side oil passages 3-47 cause the oil, which flows from the first oil chamber Y1 (first fluid chamber) to the second oil chamber Y2 (second fluid chamber) in accordance with a displacement of the piston portion 3-30 in one direction of the axial direction, to flow in a specified direction. The rebound-side oil passages 3-48 are formed in the valve seat 3-41. The rebound-side oil passages 3-48 cause the oil, which flows from the second oil chamber Y2 to the first oil chamber Y1 in accordance with a displacement of the piston portion 3-30 in the other axial direction, to flow along the specified direction. The damping valve 3-42 opens and closes the compression-side oil passages 3-47 and the rebound-side oil passages 3-48 so as to control the oil flows in the compression-side oil passages 3-47 and the rebound-side oil passages 3-48. The through hole 3-455 is formed in the piston portion 3-30. In addition to the compression-side oil passages 3-47 and the rebound-side oil passages 3-48, the through hole 3-455 forms a passage of the oil between the first oil chamber Y1 and the second oil chamber Y2 while reducing the oil flow.

The configurations of these elements will be described in detail below.

Figure 29:
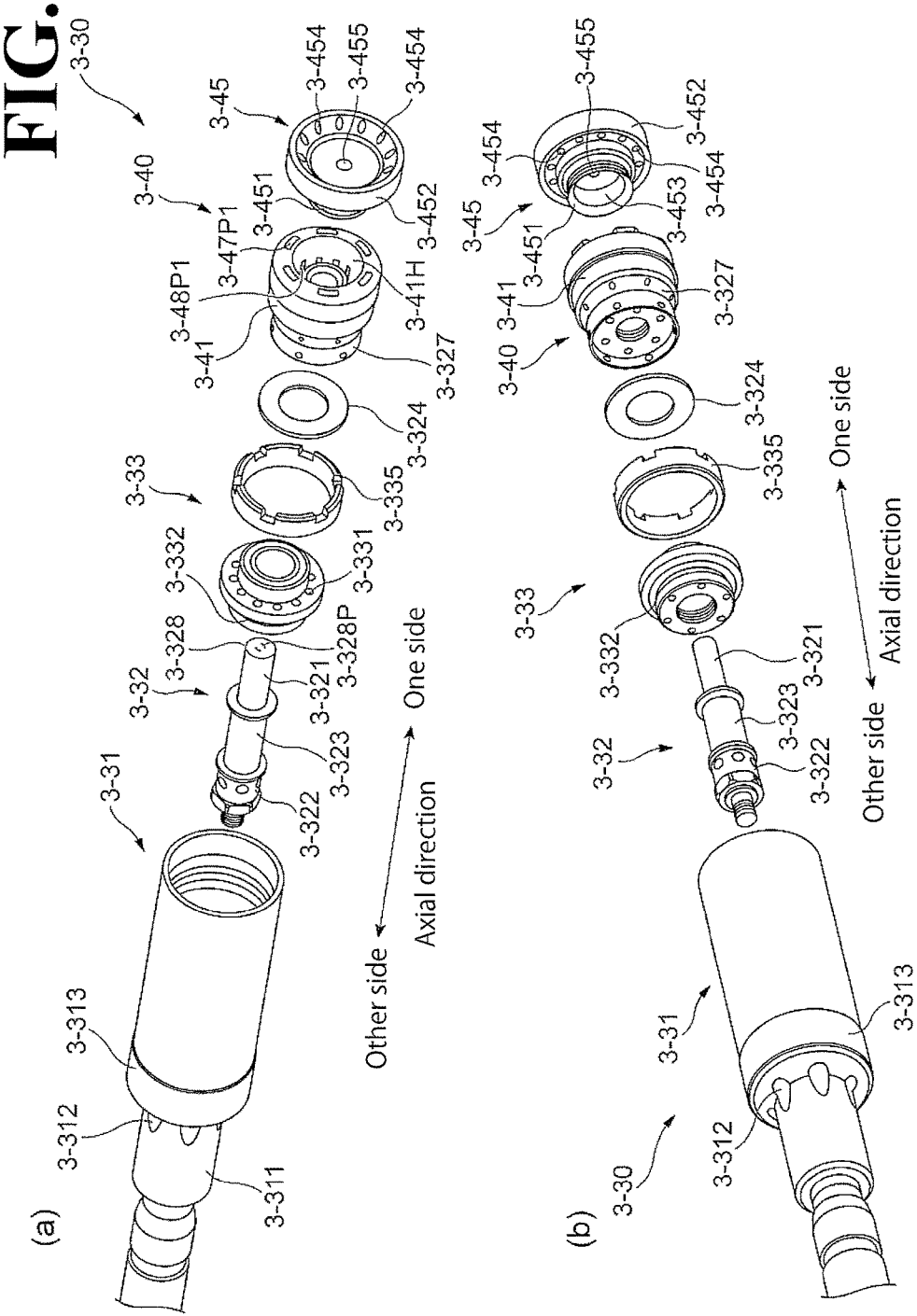
FIG. 29 is exploded perspective views of the piston portion in embodiment 10.

FIG. 29(a) ((a) of FIG. 29) and FIG. 29(b) ((b) of FIG. 29) are exploded perspective views of the piston portion 3-30 in embodiment 10. FIG. 29(a) is a view of the piston portion 3-30 from the one side in the axial direction, and FIG. 29(b) is a view of the piston portion 3-30 from the other side in the axial direction.

[Configuration and Function of Piston Portion 3-30]
(Piston Housing 3-31)

As illustrated in FIG. 29(a) and FIG. 29(b), the piston housing 3-31 is a hollow member open on the one side and closed on the other side. The piston housing 3-31 includes a coupling portion 3-311, housing oil passages 3-312, and a piston ring 3-313. The coupling portion 3-311 is an end portion of the piston housing 3-31 on the other side, and is disposed on a side of the center in the radial direction. The housing oil passages 3-312 are disposed outside in the radial direction. The piston ring 3-313 is disposed on the outer circumference of the piston housing 3-31 on the one side.

As illustrated in FIG. 28, the coupling portion 3-311 is a through hole penetrating in the axial direction. An end portion of the rod portion 20 on the one side and an end portion of the press unit 3-32 on the other side are inserted in the coupling portion 3-311. The coupling portion 3-311 is secured to the one-side attachment portion 21a (see FIG. 2) of the rod member 21. The inner diameter of the coupling portion 3-311 is larger than the outer diameter of the transmission member 22 and the outer diameter of a spool 3-321, described later, of the press unit 3-32. Consequently, the transmission member 22 and the spool 3-321 are disposed in the coupling portion 3-311 movably in the axial direction.

As illustrated in FIG. 29(b), a plurality of (six, for example, in this embodiment) housing oil passages 3-312 are formed in the circumferential direction. As illustrated in FIG. 28, the housing oil passages 3-312 communicate the second oil chamber Y2 with the second intermediate chamber 3-P2.

The piston ring 3-313 is fitted in a groove formed in the outer circumference of the piston housing 3-31. The piston ring 3-313 is in sliding contact with the inner surface of the cylinder 11. The piston ring 3-313 decreases friction resistance between the cylinder 11 and the piston housing 3-31.

Figure 30:
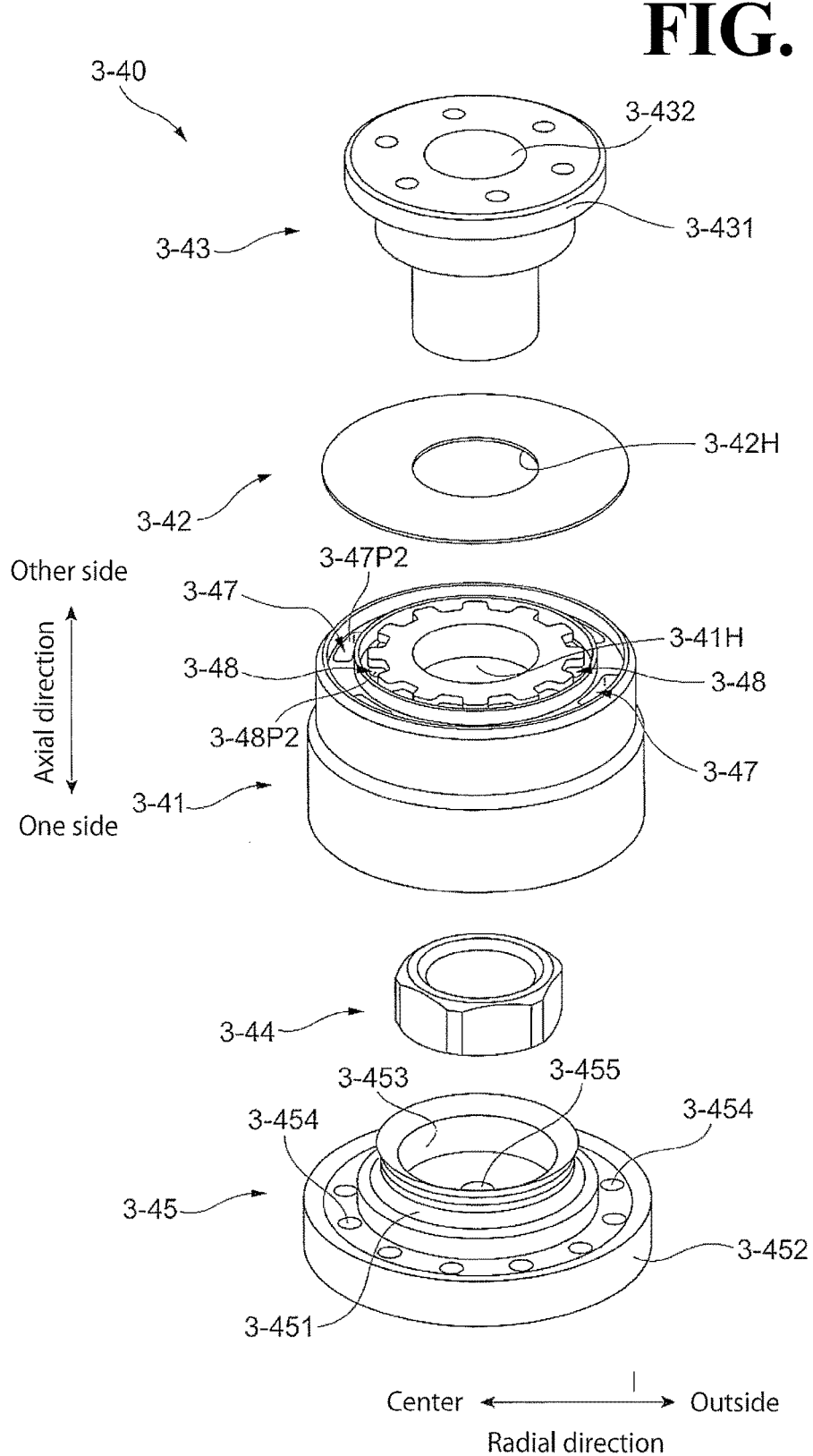
FIG. 30 is an exploded perspective view of a damping unit in embodiment 10.

FIG. 30 is an exploded perspective view of the damping unit 3-40 in embodiment 10.

(Damping Unit 3-40)

As illustrated in FIG. 30, the valve seat 3-41 is a bottomed, hollow cylindrical member having an opening 3-41H inside, which is open toward the one side. The valve seat 3-41 is secured to the piston housing 3-31 (see FIG. 28). The valve seat 3-41 includes the rebound-side oil passages 3-48 and the compression-side oil passages 3-47. The rebound-side oil passages 3-48 are formed in the axial direction outside of a bolt hole in the radial direction. The bolt hole is formed in the axial direction, and the holding bolt 3-43 is inserted in the bolt hole. The compression-side oil passages 3-47 are formed in the axial direction further outside of the rebound-side oil passages 3-48 in the radial direction.

The opening 3-41H forms a reversing oil passage 3-41R (see FIG. 28), which is a space defined by the opening 3-41H and a depression 3-453 of the lock piece 3-45. The reversing oil passage 3-41R communicates second openings 3-321H2 of the spool 3-321, described later, with the rebound-side oil passages 3-48. The reversing oil passage 3-41R functions to reverse the direction of a flow of the oil flowing from the other side, for example, and make the oil flow to the other side.

As illustrated in FIG. 30, a plurality of compression-side oil passages 3-47 are formed at regular intervals in the circumferential direction. As illustrated in FIG. 28, the compression-side oil passages 3-47 each include a first oil passage port 3-47P1 on the one side and a second oil passage port 3-47P2 on the other side. The compression-side oil passages 3-47 are communicable with the third intermediate chamber 3-P3 at the first oil passage ports 3-47P1 and communicable with the first intermediate chamber 3-P1 at the second oil passage ports 3-47P2. The compression-side oil passages 3-47 form passages of oil flowing between the third intermediate chamber 3-P3 and the first intermediate chamber 3-P1 in accordance with an open and closed state of the damping valve 3-42.

As illustrated in FIG. 30, a plurality of rebound-side oil passages 3-48 are formed at regular intervals in the circumferential direction. As illustrated in FIG. 28, the rebound-side oil passages 3-48 each include a third oil passage port 3-48P1 on the one side and a fourth oil passage port 3-48P2 on the other side. The rebound-side oil passages 3-48 are communicable with the reversing passage 3-41R at the third oil passage ports 3-48P1 and communicable with the first intermediate chamber 3-P1 at the fourth oil passage ports 3-48P2. The rebound-side oil passages 3-48 form passages of the oil flowing between the reversing oil passage 3-41R and the first intermediate chamber 3-P1 in accordance with an open and closed state of the damping valve 3-42.

The plurality of rebound-side oil passages 3-48 are located inside of the plurality of compression-side oil passages 3-47 in the radial direction from the center of the valve seat 3-41. The plurality of compression-side oil passages 3-47 are located outside of the plurality of rebound-side oil passages 3-48. That is, on an end portion of the valve seat 3-41 on the other side, the second oil passage ports 3-47P2 of the compression-side oil passages 3-47 and the fourth oil passage ports 3-48P2 of the rebound-side oil passages 3-48 are disposed side by side in the radial direction.

As illustrated in FIG. 30, the damping valve 3-42 is an annular metal plate having a bolt hole 3-42H in the center in which the holding bolt 3-43 is inserted. The damping valve 3-42 is pressed against the end portion of the valve seat 3-41 on the other side through the holding bolt 3-43. The damping valve 3-42 has such an inner diameter and an outer diameter as to cover end portions of the rebound-side oil passages 3-48 and the compression-side oil passages 3-47 of the valve seat 3-41 on the other side. The damping valve 3-42 opens and closes the rebound-side oil passages 3-48 and the compression-side oil passages 3-47 in accordance with an oil flow.

As illustrated in FIG. 28, the holding bolt 3-43 and the nut 3-44 clamp and hold the valve seat 3-41 and the damping valve 3-42. The holding bolt 3-43 includes a guide portion 3-431 and a bolt opening 3-432. The outer diameter of the guide portion 3-431 is approximately equal to the inner diameter of a contacted portion 3-327*b* of the press member 3-327. The guide portion 3-431 guides the press member 3-327 movably in the axial direction. The bolt opening 3-432 is a through hole formed in the axial direction of the holding bolt 3-43. An end portion of the spool 3-321 on the one side is inserted in the other side of the bolt opening 3-432. The bolt opening 3-432 communicates with the reversing oil passage 3-41R on the one side.

As illustrated in FIG. 30, the lock piece 3-45 includes a protrusion 3-451 on the other side and a large-diameter portion 3-452 on the one side. The outer diameter of the large-diameter portion 3-452 is larger than the outer diameter of the protrusion 3-451.

The protrusion 3-451 is a portion protruding toward the one side in the axial direction. The protrusion 3-451 is inserted in the opening 3-41H of the valve seat 3-41. The protrusion 3-451 includes the depression 3-453 and a through hole 3-455. The depression 3-453 is depressed in the axial direction and forms the reversing oil passage 3-41R described above. The through hole 3-455 penetrates in the axial direction.

In this embodiment, the depression 3-453 has a surface facing the other side. The surface facing the other side reverses the flow of oil, which has flowed from the other side to the one side, and causes the oil to flow toward the other side.

The through hole 3-455 communicates with the reversing oil passage 3-41R on the other side and communicates with the first oil chamber Y1 on the one side. In this embodiment, the through hole 3-455 has an approximately circular cross-section and is formed on an approximately straight line in the axial direction. In addition to the rebound-side oil passages 3-48 and the compression-side oil passages 3-47 of the valve seat 3-41 described above, the through hole 3-455 functions as a bypass passage to allow the oil to flow between the first oil chamber Y1 and the second oil chamber Y2 while reducing the oil flow.

As illustrated in FIG. 30, the large-diameter portion 3-452 includes a plurality of oil passages 3-454 in the circumferential direction. The oil passages 3-454 form passages of the oil between the first oil chamber Y1 and the third intermediate chamber 3-P3. The large-diameter portion 3-452 includes a thread portion screwed on a thread groove formed in the piston housing 3-31.

As illustrated in FIG. 28, the lock piece 3-45 secures the valve seat 3-41 to secure the whole damping unit 3-40 in the axial direction.

(Press Unit 3-32)

As illustrated in FIG. 28, the press unit 3-32 includes the spool 3-321, a collar 3-322, a second collar 3-323, a preset valve 3-324, a valve stopper 3-325, a ring 3-326, the press member 3-327, and a flow reducing member 3-328. The spool 3-321 extends in the axial direction. The collar 3-322 is attached to the outside of the spool 3-321 on the other side of the spool 3-321. The second collar 3-323 is attached to the outside of the spool 3-321 on the one side of the collar 3-322. The preset valve 3-324 is attached to the spool 3-321. The valve stopper 3-325 is disposed on the one side of the preset valve 3-324. The ring 3-326 is attached to the one side of the valve stopper 3-325. The press member 3-327 is disposed on the one side of the preset valve 3-324. The flow reducing member 3-328 is disposed on an end portion of the spool 3-321 on the one side.

The spool 3-321 extends in the axial direction from an end portion of the transmission member 22 on the one side to an end portion of the lock piece 3-45 on the other side. The spool 3-321 includes a hollow portion 3-321L, first openings 3-321H1, and second openings 3-321H2. The hollow portion 3-321L is formed in the axial direction. The first openings 3-321H1 are open in the radial direction at an end portion of the hollow portion 3-321L on the other side. The second openings 3-321H2 are open in the radial direction at an end portion of the hollow portion 3-321L on the one side.

The first openings 3-321H1 are opposed to collar openings 3-322H. The first openings 3-321H1 communicate the hollow portion 3-321L with the second intermediate chamber 3-P2. The second openings 3-321H2 are opposed to the reversing oil passage 3-41R. The second openings communicate the hollow portion 3-321L with the reversing oil passage 3-41R. That is, the spool 3-321 allows the oil to flow between the second intermediate chamber 3-P2 and the reversing oil passage 3-41R.

As illustrated in FIG. 29(a), the spool 3-321 holds the flow reducing member 3-328 on an end portion of the spool 3-321 on the one side. When moving in the axial direction, the spool 3-321 displaces the flow reducing member 3-328 in the axial direction.

As illustrated in FIG. 29(a) and FIG. 29(b), the collar 3-322 is an approximately hollow cylindrical member. The collar 3-322 is screw-fastened to the spool 3-321. As illustrated in FIG. 28, the collar 3-322 includes the collar openings 3-322H open in the radial direction. The collar openings 3-322H are opposed to the first openings 3-321H1 and communicate the second intermediate chamber 3-P2 with the first openings 3-321H1.

The second collar 3-323 is in contact with the preset valve 3-324 on the one side. The second collar 3-323 and the valve stopper 3-325 clamp the preset valve 3-324 to hold the preset valve 3-324.

As illustrated in FIG. 29(a) and FIG. 29(b), the preset valve 3-324 is an approximately disk-shaped member having an opening in which the spool 3-321 is inserted. In this embodiment, the preset valve 3-324 includes a plurality of disk-shaped metal plates superposed on one another. The preset valve 3-324 is elastically deformed to apply a load to the press member 3-327.

As illustrated in FIG. 28, the valve stopper 3-325 presses the preset valve 3-324 from the one side toward the second collar 3-323.

The ring 3-326 is fitted in a groove formed in the outer circumference of the spool 3-321. The ring 3-326 secures the valve stopper 3-325 in the axial direction.

The preset valve 3-324 is clamped between the second collar 3-323 and the valve stopper 3-325 and secured to the spool 3-321. Therefore, the spool 3-321, the collar 3-322, the second collar 3-323, the preset valve 3-324, the valve stopper 3-325, and the ring 3-326 are integrally displaced in the axial direction (toward the one side in this embodiment) when receiving a load from the transmission member 22, as described below.

The press member 3-327 is an approximately hollow cylindrical member (see FIG. 29(b)). As illustrated in FIG. 28, the press member 3-327 is supported to be slidable in the axial direction by the guide portion 3-431 of the holding bolt 3-43. The press member 3-327 includes a first press portion 3-327a1, a second press portion 3-327a2, and a contacted portion 3-327b. The first press portion 3-327a1 and the second press portion 3-327a2 have a U-shaped cross-section on the one side. The contacted portion 3-327b is formed on the other side.

The first press portion 3-327a1 and the second press portion 3-327a2 are portions to be pressed against the other side of the damping valve 3-42. As illustrated in FIG. 28, the first press portion 3-327a1 and the second press portion 3-327a2 are arranged side by side from the center to the outside in the radial direction. The first press portion 3-327a1 is at the portion of the damping valve 3-42 that is opposed to the rebound-side oil passages 3-48. The second press portion 3-327a2 is at the portion of the damping valve 3-42 that is opposed to the compression-side oil passages 3-47. The contacted portion 3-327b has an outer diameter approximately equal to the outer diameter of the preset valve 3-324 and forms a portion in contact with the preset valve 3-324.

As illustrated in FIG. 29(a), the flow reducing member 3-328 has an approximately solid cylindrical shape on the whole. As illustrated in FIG. 28, a distal end portion 3-328P of the flow reducing member 3-328 has an approximately arcuate cross-section. The flow reducing member 3-328 is opposed to the through hole 3-455 of the lock piece 3-45 described above. In accordance with a displacement of the spool 3-321 in the axial direction, the flow reducing member 3-328 approaches and withdraws from an end portion of the through hole 3-455 on the other side. The distal end portion 3-328P of the flow reducing member 3-328 changes the amount of oil flowing through the through hole 3-455 in accordance with the distance to the through hole 3-455. Specifically, the flow reducing member 3-328 closes the through hole 3-455 at the distal end portion 3-328P and changes the flow reduction amount of oil in the through hole 3-455.

It is noted that in this embodiment, the flow reducing member 3-328 is disposed on the press unit 3-32 to press the damping valve 3-42 so as to control the damping valve 3-42. That is, the press unit 3-32 not only controls the damping valve 3-42 but also regulates the flow reduction amount of the oil in the through hole 3-455. In this manner, the press unit 3-32 additionally changes the magnitude of the damping force generated by the damping valve 3-42 and the through hole 3-455 so as to further simplify the device configuration.

Based on control of the transmission member 22 by the displacement means 23 (see FIG. 2), the press unit 3-32 of the above-described configuration ensures changing the load applied to the damping valve 3-42 and the opening degree of the through hole 3-455 of the lock piece 3-45.

Specifically, the displacement means 23 is controlled to displace the transmission member 22 in the axial direction in such a manner that the press member 3-327 of the press unit 3-32 changes the press load to the damping valve 3-42. This enables the press unit 3-32 to change the damping force generated by the damping valve 3-42. Also, the displacement means 23 is controlled to displace the transmission member 22 in the axial direction in such a manner that the press unit 3-32 changes the distance of the flow reducing member 3-328 to the through hole 3-455 of the lock piece 3-45. This enables the press unit 3-32 to control the oil flow in the through hole 3-455.

It is noted that changeability of the damping force of the damping valve 3-42 by the press unit 3-32 and control of the oil flow in the through hole 3-455 will be described in detail below.

(Check Valve Unit 3-33)

As illustrated in FIG. 28, the check valve unit 3-33 includes a check valve seat 3-331, a check valve 3-332, a first holding bolt 3-333, a nut 3-334, and a lock nut 3-335. The check valve 3-332 is disposed on the other side of the check valve seat 3-331. The first holding bolt 3-333 is disposed on the other side of the check valve 3-332. The nut 3-334 is disposed on the one side of the check valve seat 3-331. The lock nut 3-335 is disposed on the one side of the check valve seat 3-331.

The check valve seat 3-331 is a thick, approximately hollow cylindrical member having an opening in which the spool 3-321 and the second collar 3-323 are inserted. The check valve seat 3-331 is secured to the piston housing 3-31.

The check valve seat 3-331 includes a plurality of oil passages 3-331R penetrating in the axial direction outside in the radial direction. The oil passages 3-331R form passages of oil between the first intermediate chamber 3-P1 and the second intermediate chamber 3-P2.

The check valve 3-332 is an approximately disk-shaped metal plate having a bolt hole in the center in the radial direction in which the spool 3-321 and the first holding bolt 3-333 are inserted. The check valve 3-332 has such an inner diameter and an outer diameter as to cover end portions of the oil passages 3-331R of the check valve seat 3-331 on the other side.

The first holding bolt 3-3333 is a thick, approximately hollow cylindrical member having a through hole in the center in the radial direction in which the spool 3-321 is inserted. The inner diameter of the first holding bolt 3-333 is larger than the outer diameter of the spool 3-321. The first holding bolt 3-333 is secured to the check valve seat 3-331. The first holding bolt 3-333 and the check valve seat 3-331 clamp the check valve 3-332 in the axial direction so as to hold the check valve 3-332 on an end portion of the check valve seat 3-331.

The first holding bolt 3-333 and the nut 3-334 clamp and hold the check valve seat 3-331 and the check valve 3-332.

The lock nut 3-335 is a thick, approximately hollow cylindrical member having an opening in the center in the radial direction. The lock nut 3-335 is secured to the inside of the piston housing 3-31 by screwing, for example. The lock nut 3-335 secures the check valve seat 3-331 in the axial direction to secure the whole check valve unit 3-33 to the piston housing 3-31.

The piston portion 3-30 of the above-described configuration includes the first intermediate chamber 3-P1 and the second intermediate chamber 3-P2, which are separate from the first oil chamber Y1 and the second oil chamber Y2 and contain oil. The second oil passage ports 3-47P2 of the compression-side oil passages 3-47, the fourth oil passage ports 3-48P2 of the rebound-side oil passages 3-48, and the damping valve 3-42 are disposed in the first intermediate chamber 3-P1. In accordance with a displacement of the piston portion 3-30 in one direction of the axial direction and in other direction of the axial direction, the check valve unit 3-33 allows or restricts oil flows from the first oil chamber Y1 and the second oil chamber Y2 to the first intermediate chamber 3-P1 and the second intermediate chamber 3-P2.

[Operation of Hydraulic Damper 1 in Embodiment 10]

In the hydraulic damper 1 of the above-described configuration, the magnitude of the damping force is changed in accordance with a displacement speed (for example, low speed V1 and high speed V2) of the piston portion 3-30 (rod member 21). In this embodiment, low speed V1 is a speed when the oil mainly flows in the through hole 3-455 in the damping unit 3-40 although it may vary depending on an adjustment of the valve, for example. High speed V2 is a speed when the oil mainly flows in the rebound-side oil passages 3-48 or the compression-side oil passages 3-47 in the damping unit 3-40.

The oil flow at the time of a compression stroke of the piston portion 3-30 (rod member 21) (low speed V1 and high speed V2) and the oil flow at the time of a rebound stroke (low speed V1 and high speed V2) will be described in detail in this order below.

Figure 31:
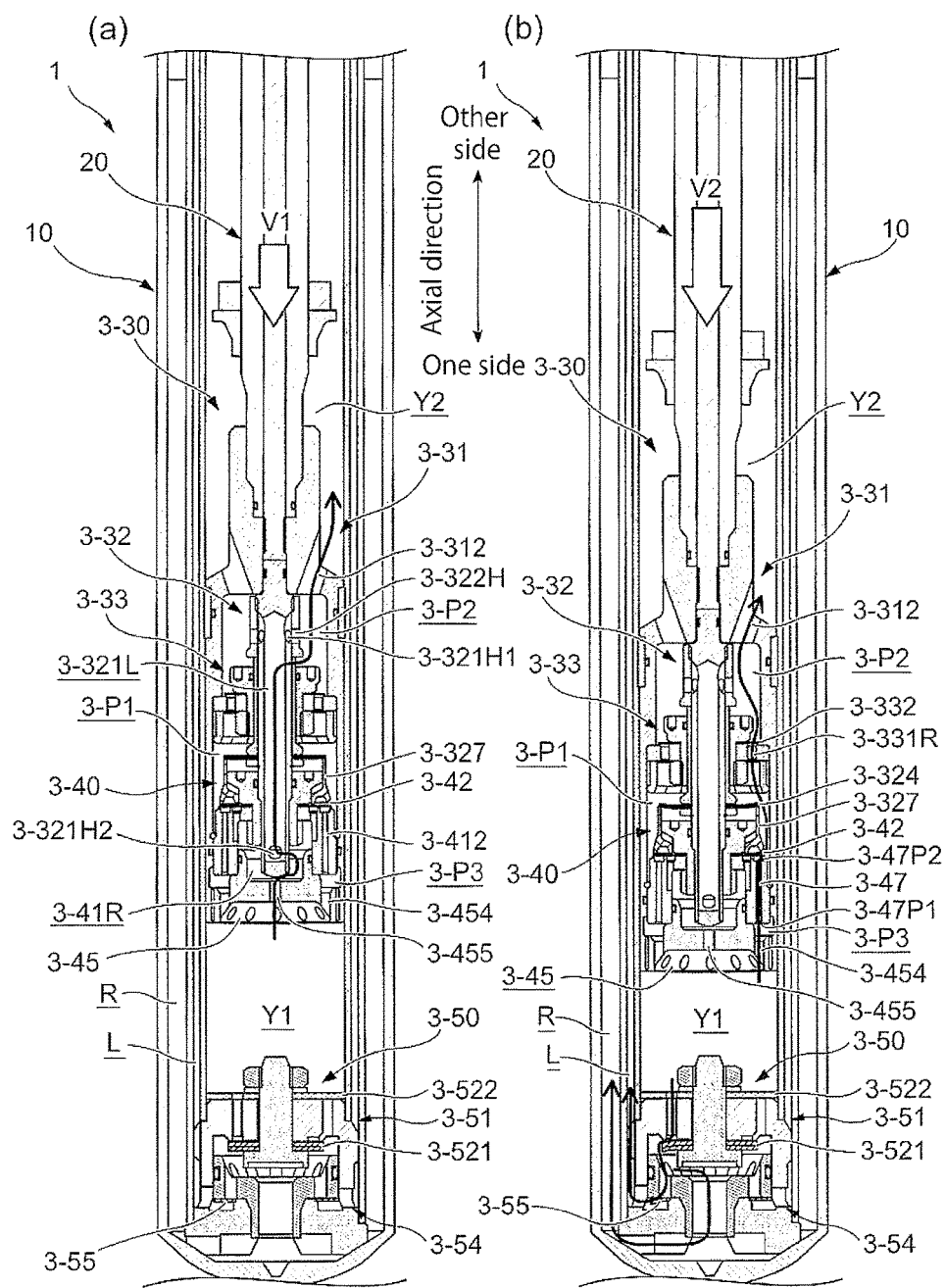
FIG. 31 is diagrams illustrating oil flows at the time of a compression stroke of a hydraulic damper in embodiment 10.

FIG. 31 is a diagram illustrating oil flows at the time of a compression stroke of the hydraulic damper 1 in embodiment 10. FIG. 31(a) ((a) of FIG. 31) illustrates an oil flow at the time of low speed V1, and FIG. 31(b) ((b) of FIG. 31) illustrates an oil flow at the time of high speed V2.

(Compression Stroke [Low Speed V1])

First, the oil flow at the time of a compression stroke of the hydraulic damper 1 will be described. The oil flow when the piston portion 3-30 is displaced at low speed V1 will be described first.

As illustrated in FIG. 31(a), when the piston portion 3-30 is displaced toward the one side in the axial direction relative to the cylinder portion 10, as indicated by the outlined arrow, the displacement of the piston portion 3-30 causes the oil in the first oil chamber Y1 to be pressed to increase the pressure in the first oil chamber Y1.

The oil under the pressure increased in the first oil chamber Y1 flows into the through hole 3-455 of the lock piece 3-45. Then, the oil flows through the through hole 3-455, the reversing oil passage 3-41R, the second openings 3-321H2, the hollow portion 3-321L, the first openings 3-321H1, and the collar openings 3-322H. The oil flows from the collar openings 3-322H to the second intermediate chamber 3-P2. From the second intermediate chamber 3-P2, the oil flows through the housing oil passages 3-312 to the second oil chamber Y2. In the case of low speed V1 at the time of the compression stroke, the through hole 3-455 reduces the oil flow (in other words, applies fluid resistance to the oil) so as to generate a predetermined damping force.

Specifically, in the case of low speed V1, instead of flowing in the compression-side oil passages 3-47 of the valve seat 3-41 as in the case of high speed V2, described below, the oil bypasses the compression-side oil passages 3-47 and flows from the first oil chamber Y1 to the second oil chamber Y2. The above-described damping force generated at this time is smaller than damping force generated when the oil flows in the compression-side oil passages 3-47 and the damping valve 3-42.

(Compression Stroke [High Speed V2])

When the piston portion 3-30 is displaced at high speed V2, the oil pressure in the first oil chamber Y1 is increased at once. As illustrated in FIG. 31(b), the oil under the pressure increased in the first oil chamber Y1 cannot be made to sufficiently flow to the second oil chamber Y2 through the through hole 3-455 only. At this time, the oil in the first oil chamber Y1 flows into the oil passages 3-454 of the lock piece 3-45. Then, the oil flows from the oil passages 3-454 into the third intermediate chamber 3-P3. Further, the oil flows from the first oil passage ports 3-47P1 into the compression-side oil passages 3-47.

Then, the oil flows in the compression-side oil passages 3-47 in the specified direction from the one side to the other side in the axial direction. The oil flows against the force from the press member 3-327, forces the damping valve 3-42 open, and flows from the second oil passage ports 3-47P2 to the first intermediate chamber 3-P1. In the case of high speed V2 at the time of the compression stroke, resistance generated when the oil flows in the compression-side oil passages 3-47 and the damping valve 3-42 causes relatively high damping force.

The oil, which has flowed to the first intermediate chamber 3-P1, flows to the oil passages 3-331R of the check valve unit 3-33. Then, the oil forces the check valve 3-332 open to flow to the second intermediate chamber 3-P2. The oil passes through the housing oil passages 3-312 of the piston housing 3-31 and flows to the second oil chamber Y2.

It is noted that at the time of the compression stroke, in the bottom valve portion 50, as illustrated in FIG. 31(b), the oil under the pressure increased by the displacement of the piston portion 3-30 toward the one side in the axial direction passes through the communication passage L and the cylinder opening 11H (see FIG. 2) and flows into the second oil chamber Y2. The oil also flows to the reservoir chamber R in the bottom valve portion 50.

Figure 32:
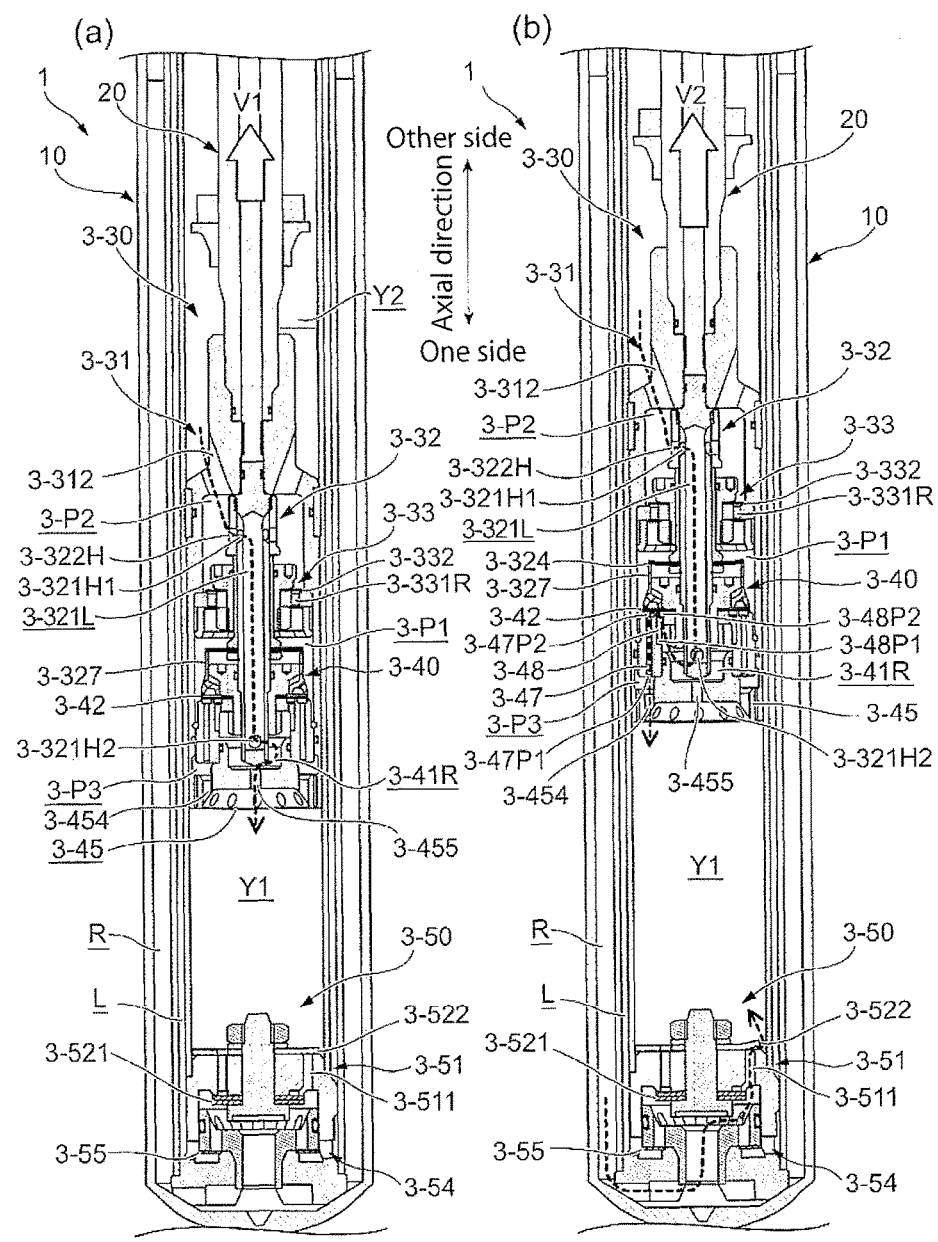
FIG. 32 is diagrams illustrating oil flows at the time of a rebound stroke of the hydraulic damper in embodiment 10.

FIG. 32 is a diagram illustrating oil flows at the time of a rebound stroke of the hydraulic damper 1 in embodiment 10. FIG. 32(a) ((a) of FIG. 32) illustrates an oil flow at the time of low speed and FIG. 32(b) ((b) of FIG. 32) illustrates an oil flow at the time of high speed V2.

(Rebound Stroke [Low Speed V1])

As illustrated in FIG. 32(a), when the piston portion 3-30 is displaced toward the other side in the axial direction relative to the cylinder portion 10, as indicated by the outlined arrow, the displacement of the piston portion 3-30 causes the oil in the second oil chamber Y2 to be pressed to increase the pressure in the second oil chamber Y2.

It is noted that, as illustrated in FIG. 2, even if the oil moves in an attempt to flow through the communication passage L from the cylinder opening 11H, the bottom valve portion 50 hinders an oil flow from the second oil chamber Y2 to the first oil chamber Y1 through the communication passage L.

As illustrated in FIG. 32(a), the oil pressure in the second oil chamber Y2 increased by the displacement of the piston portion 3-30 toward the other side in the axial direction causes the oil to flow from the housing oil passages 3-312 of the piston housing 3-31 into the second intermediate chamber 3-P2.

It is noted that since the oil under high pressure flows into the second intermediate chamber 3-P2, the pressure in the second intermediate chamber 3-P2 is relatively higher than the pressure in the first intermediate chamber 3-P1. Therefore, the check valve 3-332 does not open the oil passages 3-331R, and no oil flow is generated through the check valve unit 3-33.

The oil in the second intermediate chamber 3-P2 passes through the collar openings 3-322H, the first openings 3-321H1, the hollow portion 3-321L, and the second openings 3-321H2 and flows into the reversing oil passage 3-41R. The oil in the reversing oil passage 3-41R flows into the through hole 3-455 of the lock piece 3-45. Through the through hole 3-455, the oil flows to the first oil chamber Y1. In the case of low speed V1 at the time of the compression stroke, the damping force is generated by reducing the oil flow by the through hole 3-455 to apply fluid resistance to the oil. This is called a square hole function.

In the case of low speed V1, in the piston portion 3-30, instead of flowing in the rebound-side oil passages 3-48 of the valve seat 3-41, as in the case of high speed V2, described below, the oil bypasses the rebound-side oil passages 3-48 and flows from the second oil chamber Y2 to the first oil chamber Y1. The above-described damping force generated at this time is smaller than the damping force generated when the oil flows in the rebound-side oil passages 3-48 and the damping valve 3-42, described below.

(Rebound Stroke [High Speed V2])

When the piston portion 3-30 is displaced at high speed V2, the oil pressure in the second oil chamber Y2 is increased at once. As illustrated in FIG. 32(b), the oil under the pressure increased in the second oil chamber Y2 flows into the second intermediate chamber 3-P2 from the housing oil passages 3-312. The oil in the second intermediate chamber 3-P2 passes through the collar openings 3-322H, the first openings 3-321H1, the hollow portion 3-321L, and the second openings 3-321H2 and flows into the reversing oil passage 3-41R. The oil under the increased pressure cannot be made to sufficiently flow into the first oil chamber Y1 through the through hole 3-455 only.

The oil in the reversing oil passage 3-41R flows from the third oil passage ports 3-48P1 to the rebound-side oil passages 3-48. The oil, which has flowed from the other side to the one side in the axial direction in this manner, is reversed in the reversing oil passage 3-41R and flows from the one side to the other side in the axial direction. That is, the oil flows along the flow in the specified direction in the compression-side oil passages 3-47 at the time of the compression stroke described above.

The oil in the rebound-side oil passages 3-48 flows against the force from the press member 3-327, forces the damping valve 3-42 open, and flows from the fourth oil passage ports 3-48P2 to the first intermediate chamber 3-P1. In the case of high speed V2 at the time of the rebound stroke, resistance occurring when the oil flows in the rebound-side oil passages 3-48 and the damping valve 3-42 causes relatively high damping force.

It is noted that the displacement of the piston portion 3-30 in the other direction causes negative pressure in the first oil chamber Y1. As described above, the rebound-side oil passages 3-48 cause the damping valve 3-42 to bend to open from the inside in the radial direction. Consequently, the outside of the damping valve 3-42 is also opened to make open the second oil passage ports 3-47P2 of the compression-side oil passages 3-47. Therefore, the oil, which has flowed to the first intermediate chamber 3-P1, flows to the adjacent compression-side oil passages 3-47. Then, the oil flows from the compression-side oil passages 3-47 to the third intermediate chamber 3-P3. The oil, which has flowed to the third intermediate chamber 3-P3, flows through the oil passages 3-454 to the first oil chamber Y1.

In the bottom valve portion 50, as illustrated in FIG. 32(b), the displacement of the piston portion 3-30 toward the other side in the axial direction causes the pressure in the first oil chamber Y1 to decrease. Then, the pressure in the first oil chamber Y1 is relatively lower than the pressure in the reservoir chamber R. Consequently, the oil in the reservoir chamber R flows into the first oil chamber Y1 in the bottom valve portion 50.

[Change Control of Damping Force in Damping Unit 3-40]

Next, change control of damping force in the damping unit 3-40 in the hydraulic damper 1 will be described.

As illustrated in FIG. 2, the transmission member 22 is pressed by a predetermined amount toward the one side in the axial direction by the displacement means 23. As illustrated in FIG. 28, the displacement of the transmission member 22 toward the one side causes the press unit 3-32 to be displaced toward the one side. By the press unit 3-32, the spool 3-321 is displaced toward the one side. Accordingly, the preset valve 3-324 secured to the spool 3-321 is pressed toward the one side. The preset valve 3-324 is elastically deformed and displaces the press member 3-327 toward the one side. The press member 3-327 presses the damping valve 3-42 from the other side to the one side. In this manner, the press unit 3-32 applies a load to the damping valve 3-42 only in one direction from the other side to the one side.

In this embodiment, the damping valve 3-42 is deformed or displaced toward the other side to open the compression-side oil passages 3-47 and the rebound-side oil passages 3-48. Consequently, the load applied to the damping valve 3-42 from the other side to the one side by the press member 3-327 is increased to make it difficult to open the damping valve 3-42. This increases damping force generated in the hydraulic damper 1.

When the spool 3-321 is displaced toward the one side in the press unit 3-32, the flow reducing member 3-328, which is disposed on the end portion of the spool 3-321, is displaced toward the one side. Then, the flow reducing member 3-328 causes the distal end portion 3-328P to close the through hole 3-455 of the lock piece 3-45 or decrease the cross-sectional area of the through hole 3-455 in which the oil flows.

In this embodiment, basically at the time of low speed V1, the oil is made to flow in the through hole 3-455. As described above, the press unit 3-32 makes it difficult for the oil to flow in the through hole 3-455 so as to increase damping force generated in the through hole 3-455 at low speed V1, for example. When the press unit 3-32 stops the oil flow in the through hole 3-455, even if the speed of the piston portion 3-30 is low speed V1, the oil is made to flow in the compression-side oil passages 3-47, the rebound-side oil passages 3-48, and the damping valve 3-42 to increase the damping force. That is, it is possible to increase the damping force at low speed V1.

The displacement means 23 eliminates the load applied to the press unit 3-32 toward the one side by the transmission member 22. This decreases the load applied to the press member 3-327 by the preset valve 3-324 secured to the spool 3-321. Then, the load applied to the damping valve 3-42 by the press member 3-327 is decreased to facilitate opening of the damping valve 3-42. This decreases the damping force generated in the hydraulic damper 1.

The load applied toward the one side of the spool 3-321 in the press unit 3-32 is eliminated to make the flow reducing member 3-328, which is disposed on the end portion of the spool 3-321, withdraw from the through hole 3-455. The flow reducing member 3-328 increases the cross-sectional area of the through hole 3-455 in which the oil flows. This decreases the damping force generated in the through hole 3-455 in the case of low speed V1, for example. That is, it is possible to make the damping force at low speed V1 particularly small.

As has been described heretofore, in this embodiment, the single damping valve 3-42 causes damping force in the oil flow in the rebound stroke and the compression stroke. The transmission member 22 and other elements are merely displaced only in one direction relative to the single damping valve 3-42 so as to comprehensively adjust the damping force in the flows in both of the directions of the rebound stroke and the compression stroke.

In this manner, the hydraulic damper 1 in this embodiment implements, with the simplified configuration, adjustment of the damping force in the piston portion 3-30 generated in accordance with displacements of the piston portion 3-30 in both of one direction and the other direction.

In the hydraulic damper 1 in this embodiment, the through hole 3-455 of the lock piece 3-45 decreases the damping force generated in, for example, a low speed range (low speed V1). Moreover, the flow reducing member 3-328 of the press unit 3-32 changes the magnitude of the damping force generated by the through hole 3-455.

The hydraulic damper 1 in embodiment 10 has the simplified configuration described above with which the damping force generated in accordance with displacements of the piston portion 3-30 in both of one direction and the other direction is changed in a wider range with respect to the displacement speed of the defining member.

Figure 33:
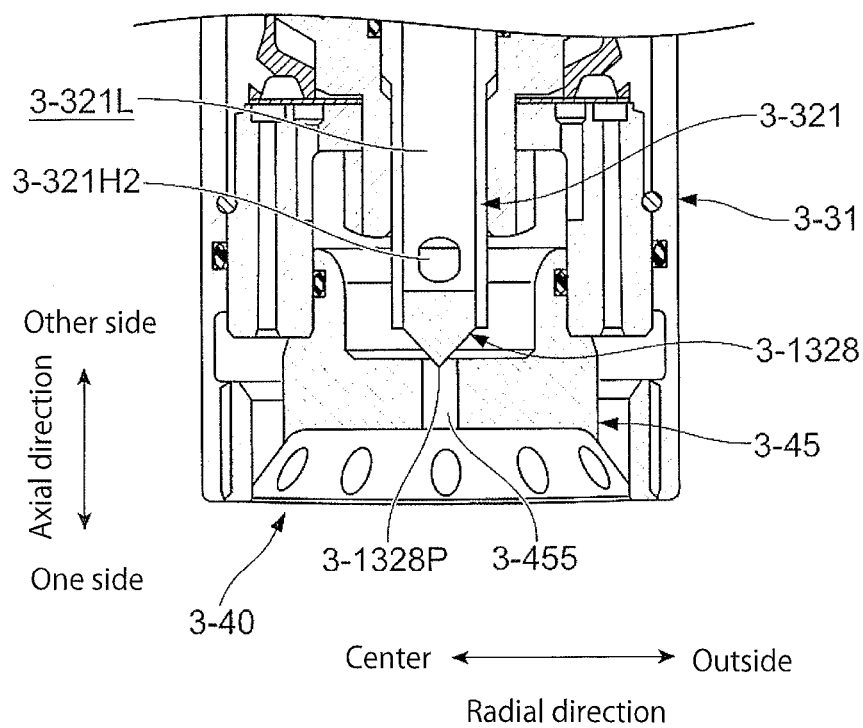
FIG. 33 illustrates a flow reducing member in a modification.

FIG. 33 illustrates a flow reducing member 3-1328 in a modification.

The above-described flow reducing member 3-1328 in embodiment 10 includes the distal end portion 3-1328P having an approximately arcuate cross-section. This shape should not be construed in a limiting sense.

For example, as illustrated in FIG. 33, the flow reducing member 3-1328 in the modification includes a distal end portion 3-1328P having a tapered cross-section. When the flow reducing member 3-1328 is displaced in such a direction as to approach the through hole 3-455 of the lock piece 3-45, part of the distal end portion 3-1328P may enter the through hole 3-455.

It is noted that the through hole 3-455 of the lock piece 3-45 may have an inner diameter increasing or decreasing from the one side to the other side in the axial direction, for example. An end portion of the through hole 3-455 may have a curved shape such as an arcuate shape. The number of through holes 3-455 may be one as in this embodiment, and a plurality of through holes 3-455 may be provided.

<Embodiment 11>

Figure 34:
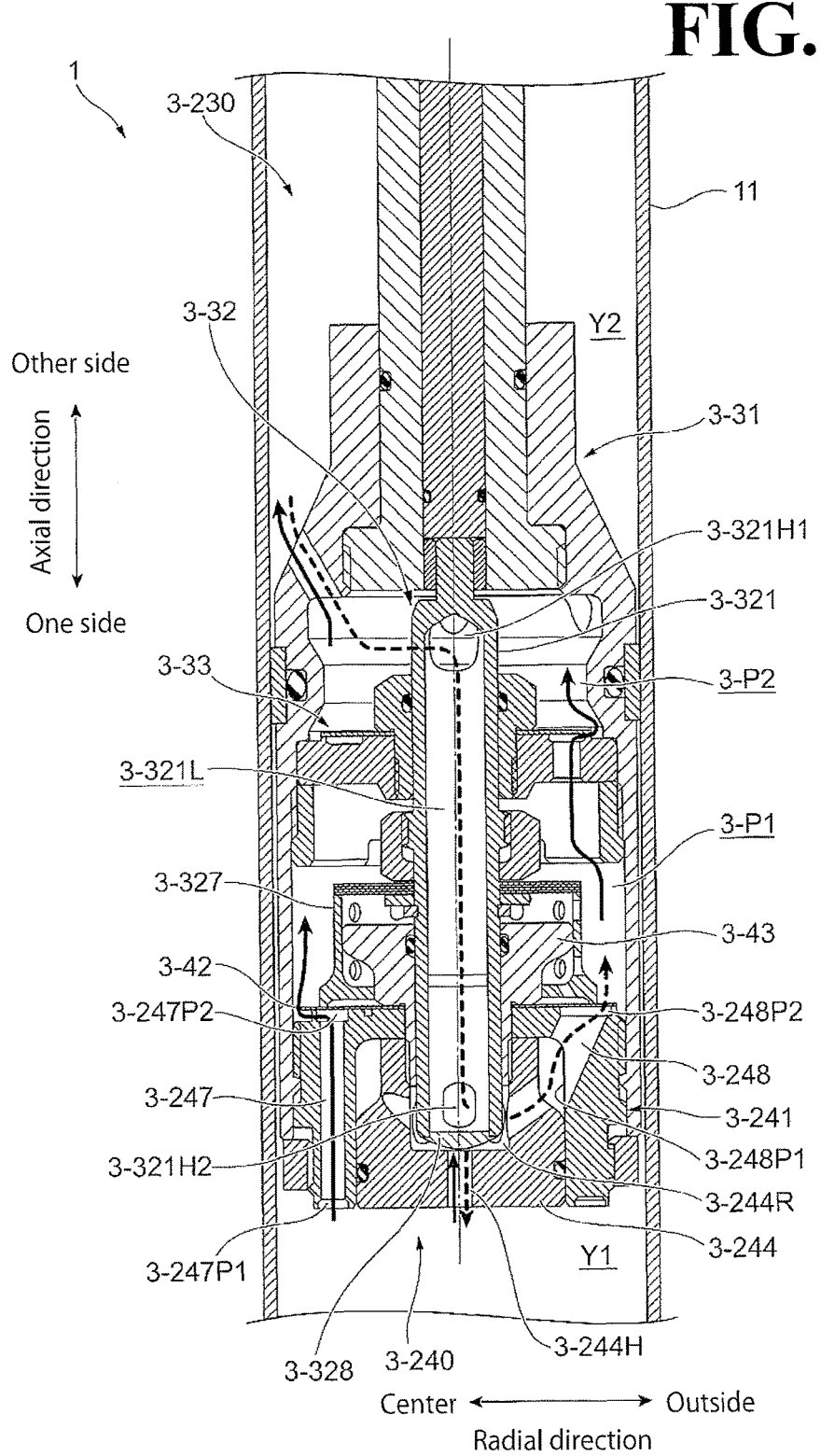
FIG. 34 illustrates a piston portion in embodiment 11.

FIG. 34 illustrates a piston portion 3-230 in embodiment 11. In FIG. 34, an oil flow at the time of a compression stroke is indicated by the solid line, and an oil flow at the time of a rebound stroke is indicated by the dashed line.

Figure 35:
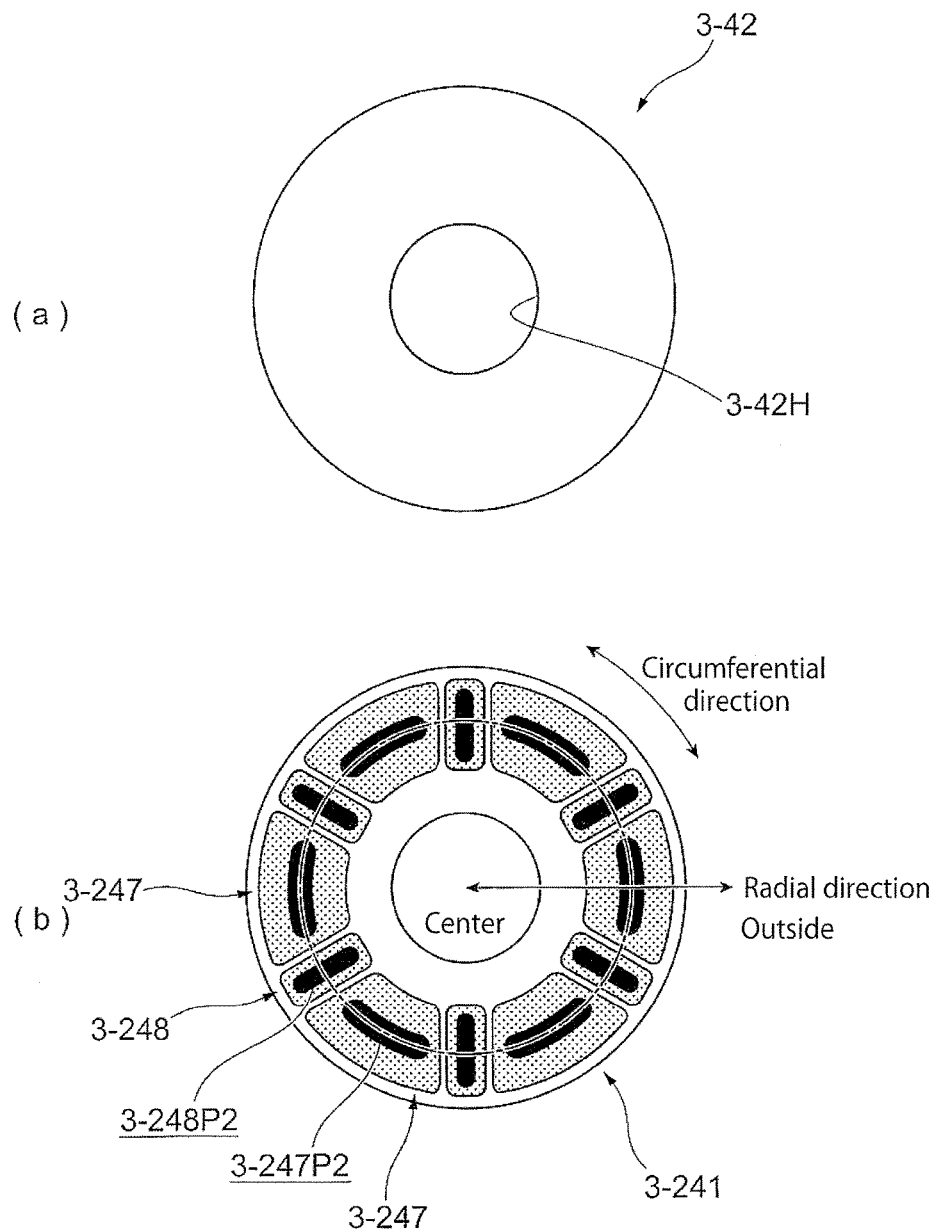
FIG. 35 illustrates a damping unit in embodiment 11 in detail.

FIG. 35 illustrates a damping unit 3-240 in embodiment 11 in detail. FIG. 35(*a*) ((a) of FIG. 35) is a top view of the damping valve 3-42 from the other side, and FIG. 35(*b*) ((b) of FIG. 35) is a top view of a valve seat 3-241 from the other side.

The hydraulic damper 1 in embodiment 11 has the same basic configuration as embodiment 10 described above. A difference, however, lies in that compression-side oil passages 3-247 and rebound-side oil passages 3-248 are arranged side by side in the circumferential direction to make uniform damping force generated at the time of a compression stroke and damping force generated at the time of a rebound stroke.

The configuration and function of the hydraulic damper 1 according to embodiment 11 will be described in detail below.

In the description of embodiment 11, similar elements to the elements in other embodiments will be denoted with the same reference numerals and will not be elaborated here.

[Configuration and Function of Piston Portion 3-230]

As illustrated in FIG. 34, the piston portion 3-230 of the hydraulic damper 1 in embodiment 11 includes the piston housing 3-31, the damping unit 3-240, the press unit 3-32, and the check valve unit 3-33. The damping unit 3-240 is disposed on the one side of the piston housing 3-31.

(Damping Unit 3-240)

The damping unit 3-240 includes a valve seat 3-241, the damping valve 3-42, the holding bolt 3-43, and a reversing passage portion 3-244. The damping valve 3-42 is disposed on the other side of the valve seat 3-241. The reversing passage portion 3-244 is disposed on the one side of the valve seat 3-241.

As illustrated in FIG. 34, the hydraulic damper 1 in embodiment 11 includes the cylinder 11, the piston portion 3-230, the valve seat 3-241, the compression-side oil passages 3-247, the rebound-side oil passages 3-248, the damping valve 3-42, and a through hole 3-244H, described later. The cylinder 11 contains oil. The piston portion 3-230 is disposed in the cylinder 11 movably in the axial direction and defines a space in the cylinder 11 into the first oil chamber Y1 and the second oil chamber Y2. The valve seat 3-241 is disposed in the piston portion 3-230 and forms passages of the oil. The compression-side oil passages 3-247 are formed in the valve seat 3-241 and cause the oil, which flows from the first oil chamber Y1 to the second oil chamber Y2 in accordance with a displacement of the piston portion 3-230 in one direction of the axial direction, to flow in a specified direction. The rebound-side oil passages 3-248 are formed in the valve seat 3-241 and cause the oil, which flows from the second oil chamber Y2 to the first oil chamber Y1 in accordance with a displacement of the piston portion 3-230 in the other axial direction, to flow along the specified direction. The damping valve 3-42 opens and closes the compression-side oil passages 3-247 and the rebound-side oil passages 3-248 so as to control oil flows in the compression-side oil passages 3-247 and the rebound-side oil passages 3-248. The through hole 3-244H is formed in the piston portion 3-230. In addition to the compression-side oil passages 3-247 and the rebound-side oil passages 3-248, the through hole 3-244H forms a passage of the oil between the first oil chamber Y1 and the second oil chamber Y2 while reducing the oil flow.

As illustrated in FIG. 34, the valve seat 3-241 includes the compression-side oil passages 3-247 and the rebound-side oil passages 3-248. As illustrated in FIG. 35, at an end portion of the valve seat 3-241 on the other side, second oil passage ports 3-47P2 of the compression-side oil passages 3-247 and fourth oil passage ports 3-248P2 of the rebound-side oil passages 3-248 are arranged side by side in the circumferential direction (on a circumference indicated by the dot-and-dash line in FIG. 35). That is, the fourth oil passage ports 3-248P2 of the rebound-side oil passages 3-248 are formed to be on the circumference on which the second oil passage ports 3-247P2 of the compression-side oil passages 3-247 are located.

As illustrated in FIG. 34, the damping valve 3-42 closes, from the other side, the second oil passage ports 3-247P2 of the compression-side oil passages 3-247 and the fourth oil passage ports 3-248P2 of the rebound-side oil passages 3-248. The damping valve 3-42 is applied a load toward the one side by the press unit 3-32.

The reversing passage portion 3-244 includes a reversing oil passage 3-244R and the through hole 3-244H. The reversing oil passage 3-244R communicates with the second openings 3-321H2 of the spool 3-321. The through hole 3-244H penetrates in the axial direction. The reversing oil passage 3-244R reverses the oil that has flowed from the other side to the one side in the spool 3-321. The reversing oil passage 3-244R communicates with third oil passage ports 3-248P1 of the rebound-side oil passages 3-248. The through hole 3-244H communicates with the first oil chamber Y1 on the one side and communicates with the second openings 3-321H2 of the spool 3-321 on the other side. The flow reducing member 3-328 of the press unit 3-32 changes the cross-sectional area of the through hole 3-244H in which the oil flows.

The hydraulic damper 1 in embodiment 11 also has the simplified configuration described above with which the damping force generated in accordance with displacements of the piston portion 3-230 in both of one direction and the other direction is changed in a wider range with respect to the displacement speed of the defining member.

The compression-side oil passages 3-247 and the rebound-side oil passages 3-248 are arranged side by side in the circumferential direction and on approximately the same circumference. Thus, conditions of pressing the compression-side oil passages 3-247 and the rebound-side oil passages 3-248 by the press member 3-327 are approximately the same. Moreover, conditions of deformation and displacement of the damping valve 3-42 are also approximately the same with respect to the compression-side oil passages 3-247 and the rebound-side oil passages 3-248. As a result, in the hydraulic damper 1 in embodiment 11, the damping force generated at the time of a compression stroke and the damping force generated at the time of a rebound stroke can be made uniform.

<Embodiment 12>

Figure 36:
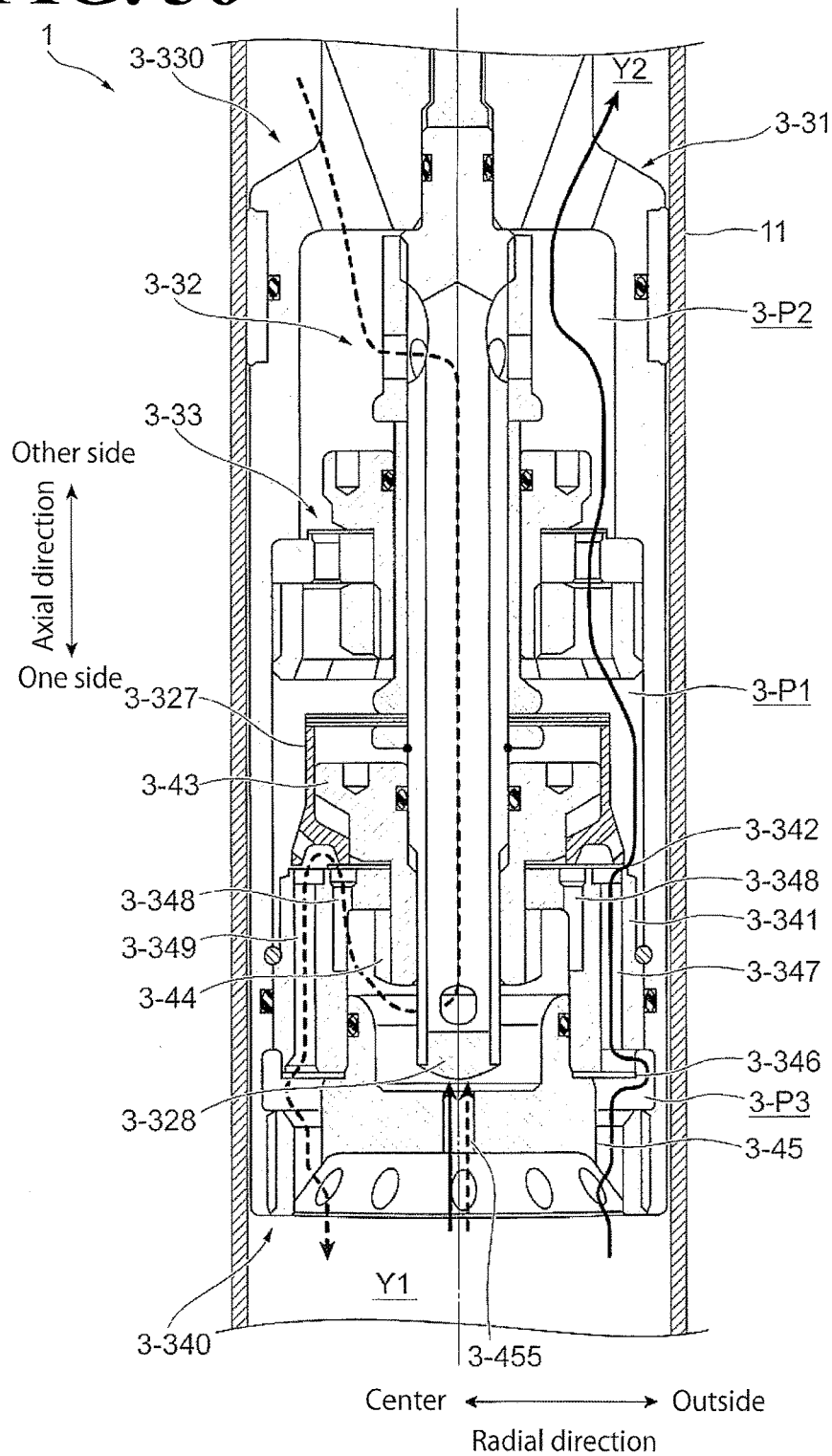
FIG. 36 illustrates a piston portion in embodiment 12.

FIG. 36 illustrates a piston portion 3-330 in embodiment 12. In FIG. 36, an oil flow at the time of a compression stroke is indicated by the solid line, and an oil flow at the time of a rebound stroke is indicated by the dashed line.

Figure 37:
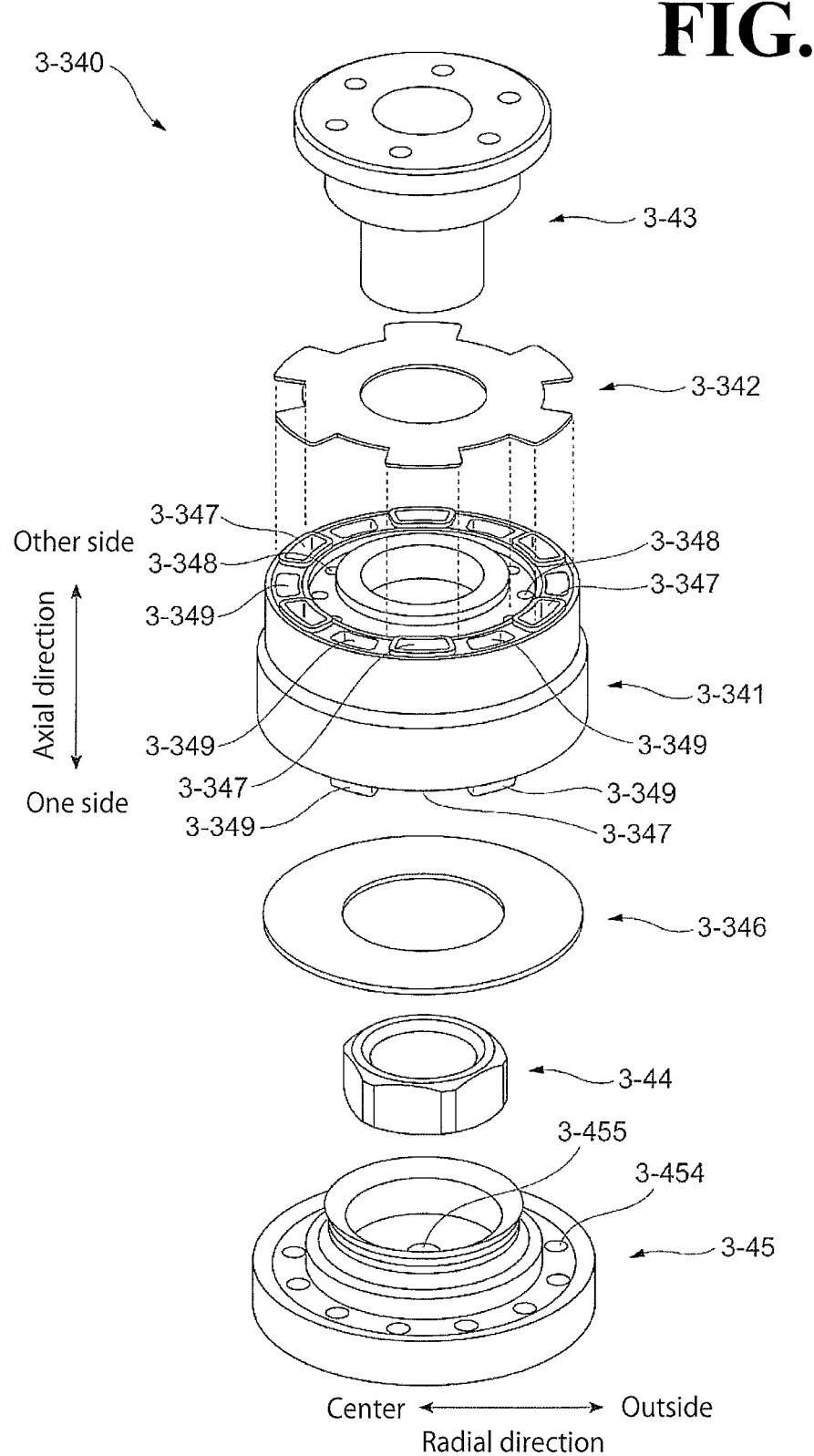
FIG. 37 is an exploded perspective view of a damping unit in embodiment 12.

FIG. 37 is an exploded perspective view of a damping unit 3-340 in embodiment 12.

In the description of embodiment 12, similar elements to the elements in other embodiments will be denoted with the same reference numerals and will not be elaborated here.

[Configuration and Function of Piston Portion 3-330]

As illustrated in FIG. 36, the piston portion 3-330 in embodiment 12 includes the piston housing 3-31, the press unit 3-32, the check valve unit 3-33, and the damping unit 3-340 disposed on the one side of the press unit 3-32.

(Damping Unit 3-340)

The damping unit 3-340 includes a valve seat 3-341, the damping valve 3-42, the holding bolt 3-43, the nut 3-44, the lock piece 3-45, and a check valve 3-346. The valve seat 3-341 includes a plurality of oil passages. The damping valve 3-42 is disposed on the other side of the valve seat 3-341. The holding bolt 3-43 and the nut 3-44 hold these elements. The check valve 3-346 is disposed on the one side of the valve seat 3-341.

As illustrated in FIG. 36, the hydraulic damper 1 in embodiment 12 includes the cylinder 11, the piston portion 3-330, the valve seat 3-341, compression-side oil passages 3-347, first rebound-side oil passages 3-348, the damping valve 3-42, and the through hole 3-455. The cylinder 11 contains oil. The piston portion 3-330 is disposed in the cylinder 11 movably in the axial direction and defines a space in the cylinder 11 into the first oil chamber Y1 and the second oil chamber Y2. The valve seat 3-341 is disposed in the piston portion 3-330 and forms passages of the oil. The compression-side oil passages 3-347 are formed in the valve seat 3-341 and cause the oil, which flows from the first oil chamber Y1 to the second oil chamber Y2 in accordance with a displacement of the piston portion 3-330 in one direction of the axial direction, to flow in a specified direction. The first rebound-side oil passages 3-348 are formed in the valve seat 3-341 and cause the oil, which flows from the second oil chamber Y2 to the first oil chamber Y1 in accordance with a displacement of the piston portion 3-330 in the other axial direction, to flow along the specified direction. The damping valve 3-42 opens and closes the compression-side oil passages 3-347 and the first rebound-side oil passages 3-348 so as to control oil flows in the compression-side oil passages 3-347 and the first rebound-side oil passages 3-348. The through hole 3-455 is formed in the piston portion 3-330. In addition to the compression-side oil passages 3-347 and the first rebound-side oil passages 3-348, the through hole 3-455 forms a passage of the oil between the first oil chamber Y1 and the second oil chamber Y2 while reducing the oil flow.

As illustrated in FIG. 37, the valve seat 3-341 includes the first rebound-side oil passages 3-348, the compression-side oil passages 3-347, and second rebound-side oil passages 3-349. The first rebound-side oil passages 3-348 are formed in the axial direction and outside of a bolt hole in the radial direction. The holding bolt 3-43 is inserted in the bolt hole. The compression-side oil passages 3-347 and the second rebound-side oil passages 3-349 are formed in the axial direction and outside of the first rebound-side oil passages 3-348 in the radial direction.

As illustrated in FIG. 37, the damping valve 3-42 is a disk-shaped metal plate having a bolt hole in the center in which the holding bolt 3-43 is inserted. The damping valve 3-42 constantly opens the other side of the second rebound-side oil passages 3-349, and opens and closes the other side of the first rebound-side oil passages 3-348 and the other side of the compression-side oil passages 3-347 in accordance with an oil flow. The damping valve 3-42 is applied a load toward the one side by the press unit 3-32.

The check valve 3-346 is a disk-shaped metal plate having a hole in the center in which the lock piece 3-45 is inserted. The check valve 3-346 opens and closes the one side of the second rebound-side oil passages 3-349 in accordance with an oil flow. The check valve 3-346 constantly opens the one side of the compression-side oil passages 3-347 depressed in the axial direction on the one side of the valve seat 3-341.

The hydraulic damper 1 in embodiment 12 also has the simplified configuration described above with which the damping force generated in accordance with displacements of the piston portion 3-330 in both of one direction and the other direction is changed in a wider range with respect to the displacement speed of the defining member.

Moreover, in the hydraulic damper 1 in embodiment 12, in the valve seat 3-341 of the damping unit 3-340, the route in which the oil flows from the first oil chamber Y1 to the first intermediate chamber 3-P1 at the time of a compression stroke (compression-side oil passages 3-347) and the route in which the oil flows from the first intermediate chamber 3-P1 to the first oil chamber Y1 at the time of a rebound stroke (first rebound-side oil passages 3-348, second rebound-side oil passages 3-349) are independent from each other. This stabilizes oil flows.

<Embodiment 13>

Figure 38:
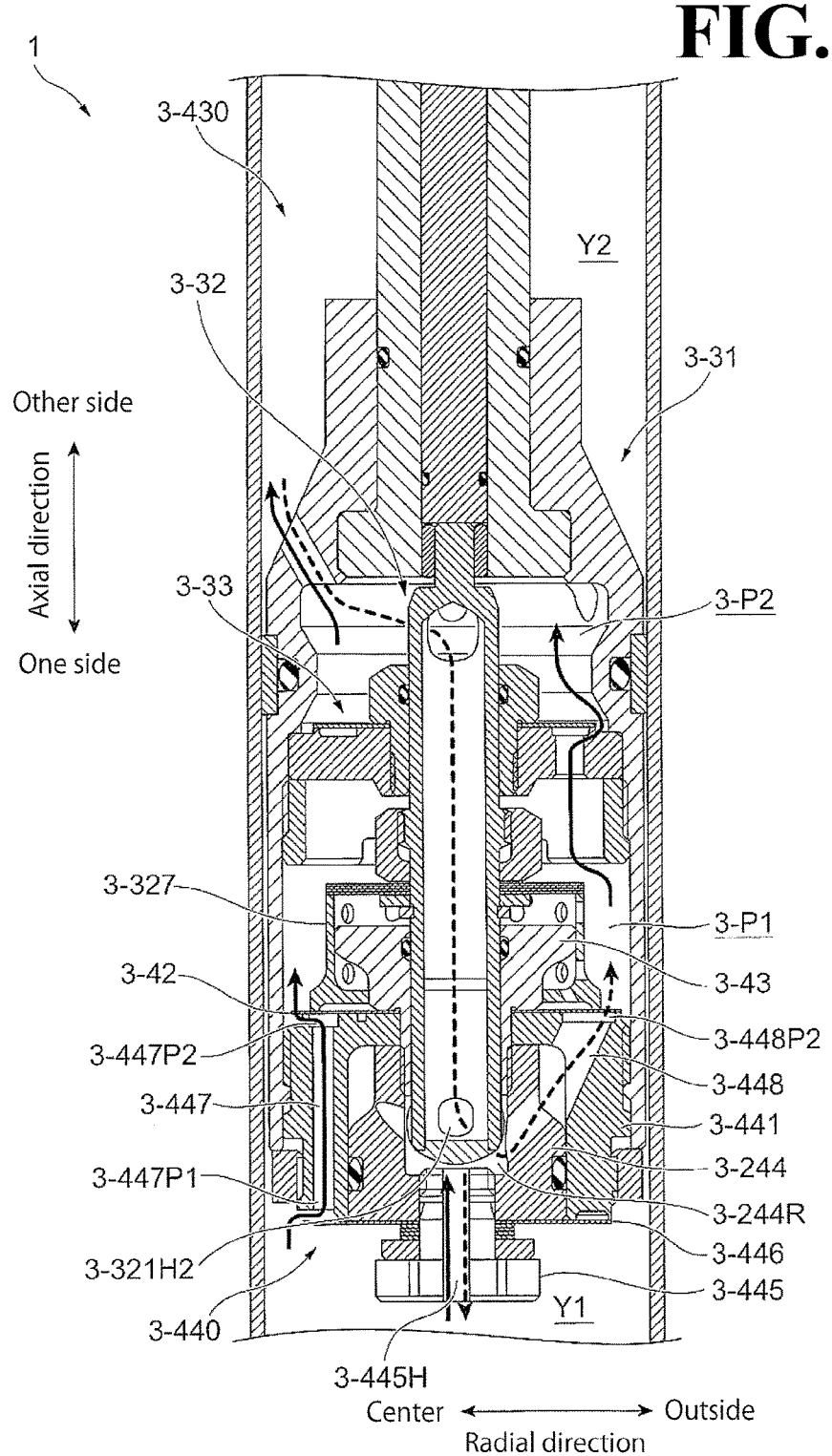
FIG. 38 illustrates a piston portion in embodiment 13.

FIG. 38 illustrates a piston portion 3-430 in embodiment 13. In FIG. 38, an oil flow at the time of a compression stroke is indicated by the solid line, and an oil flow at the time of a rebound stroke is indicated by the dashed line.

FIG. 38 illustrates a damping unit 3-440 in embodiment 13. FIG. 39(a) ((a) of FIG. 39) is a top view of the damping valve 3-42 from the other side. FIG. 39(b) ((b) of FIG. 39) is a top view of a valve seat 3-441 from the other side. FIG. 39(c) ((c) of FIG. 39) is a bottom view of a check valve 3-446 from the other side.

The hydraulic damper 1 in embodiment 13 has the same basic configuration as the hydraulic damper 1 in embodiment 11 and makes uniform damping force generated at the time of a compression stroke and damping force generated at the time of a rebound stroke. Moreover, in the hydraulic damper 1 in embodiment 13, in the valve seat 3-441 of the damping unit 3-440, the route in which the oil flows from the first oil chamber Y1 to the first intermediate chamber 3-P1 at the time of a compression stroke (compression-side oil passages 3-447) and the route in which the oil flows from the first intermediate chamber 3-P1 to the first oil chamber Y1 at the time of a rebound stroke (first rebound-side oil passages 3-448, second rebound-side oil passages 3-449) are independent from each other. This stabilizes the oil flows.

In the description of embodiment 13, similar elements to the elements in other embodiments will be denoted with the same reference numerals and will not be elaborated here.

[Configuration and Function of Piston Portion 3-430]

As illustrated in FIG. 38, the piston portion 3-430 in embodiment 13 includes the piston housing 3-31, the damping unit 3-440, the press unit 3-32, and the check valve unit 3-33.

(Damping Unit 3-440)

The damping unit 3-440 includes a valve seat 3-441, the damping valve 3-42, the holding bolt 3-43, the reversing passage portion 3-244, a check valve 3-446, and a second holding bolt 3-445. The damping valve 3-42 is disposed on the other side of the valve seat 3-441. The reversing passage portion 3-244 is disposed in the valve seat 3-441. The check valve 3-446 is disposed on the one side of the valve seat 3-441. The second holding bolt 3-445 is disposed on the one side of the check valve 3-446.

As illustrated in FIG. 38, the hydraulic damper 1 in embodiment 13 includes the cylinder 11, the piston portion 3-430, the valve seat 3-441, the compression-side oil passages 3-447, the first rebound-side oil passages 3-448, the damping valve 3-42, and a through hole 3-445H, described later. The cylinder 11 contains oil. The piston portion 3-430 is disposed in the cylinder 11 movably in the axial direction and defines a space in the cylinder 11 into the first oil chamber Y1 and the second oil chamber Y2. The valve seat 3-441 is disposed in the piston portion 3-430 and forms passages of the oil. The compression-side oil passages 3-447 are formed in the valve seat 3-441 and cause the oil, which flows from the first oil chamber Y1 to the second oil chamber Y2 in accordance with a displacement of the piston portion 3-430 in one direction of the axial direction, to flow in a specified direction. The first rebound-side oil passages 3-448 are formed in the valve seat 3-441 and cause the oil, which flows from the second oil chamber Y2 to the first oil chamber Y1 in accordance with a displacement of the piston portion 3-430 in the other axial direction, to flow along the specified direction. The damping valve 3-42 opens and closes the compression-side oil passages 3-447 and the first rebound-side oil passages 3-448 so as to control oil flows in the compression-side oil passages 3-447 and the first rebound-side oil passages 3-448. The through hole 3-445H is formed in the piston portion 3-430. In addition to the compression-side oil passages 3-447 and the first rebound-side oil passages 3-448, the through hole 3-445H forms a passage of the oil between the first oil chamber Y1 and the second oil chamber Y2 while reducing the oil flow.

As illustrated in FIG. 38, the valve seat 3-441 includes the compression-side oil passages 3-447, the first rebound-side oil passages 3-448, and the second rebound-side oil passages 3-449, which extend in the axial direction and outside of a bolt hole in the radial direction. The holding bolt 3-43 is inserted in the bolt hole. In embodiment 13, at an end portion of the valve seat 3-441 on the other side, second oil passage ports 3-447P2 of the compression-side oil passages 3-447 and fourth oil passage ports 3-448P2 of the first rebound-side oil passages 3-448 are arranged side by side in the circumferential direction (on a circumference indicated by the dot-and-dash line in FIG. 39).

As illustrated in FIG. 38, the damping valve 3-42 closes, from the other side, the second oil passage ports 3-447P2 of the compression-side oil passages 3-447 and the fourth oil passage ports 3-448P2 of the first rebound-side oil passages 3-448. The damping valve 3-42 is applied a load toward the one side by the press member 3-327 of the press unit 3-32.

As illustrated in FIG. 39, the check valve 3-446 is a disk-shaped metal plate having a hole 3-446H in the center in which the second holding bolt 3-445 is inserted. As illustrated in FIG. 38, on the one side of the valve seat 3-441, the check valve 3-446 constantly opens the one side of the compression-side oil passages 3-447 and allows the one side of the second rebound-side oil passages 3-449 (see FIG. 39) to be open and closed.

As illustrated in FIG. 38, the second holding bolt 3-445 holds the check valve 3-446 on the one side of the valve seat 3-41. The second holding bolt 3-445 includes the through hole 3-445H penetrating in the axial direction. The through hole 3-445H communicates with the first oil chamber Y1 on the one side and communicates with the second openings 3-321H2 of the spool 3-321 on the other side. The cross-sectional area of the through hole 3-445H in which the oil flows is changed by the press unit 3-32.

The hydraulic damper 1 in embodiment 13 also has the simplified configuration described above with which the damping force generated in accordance with displacements of the piston portion 3-430 in both of one direction and the other direction is changed in a wider range with respect to the displacement speed of the defining member.

<Embodiment 14>

Figure 40:
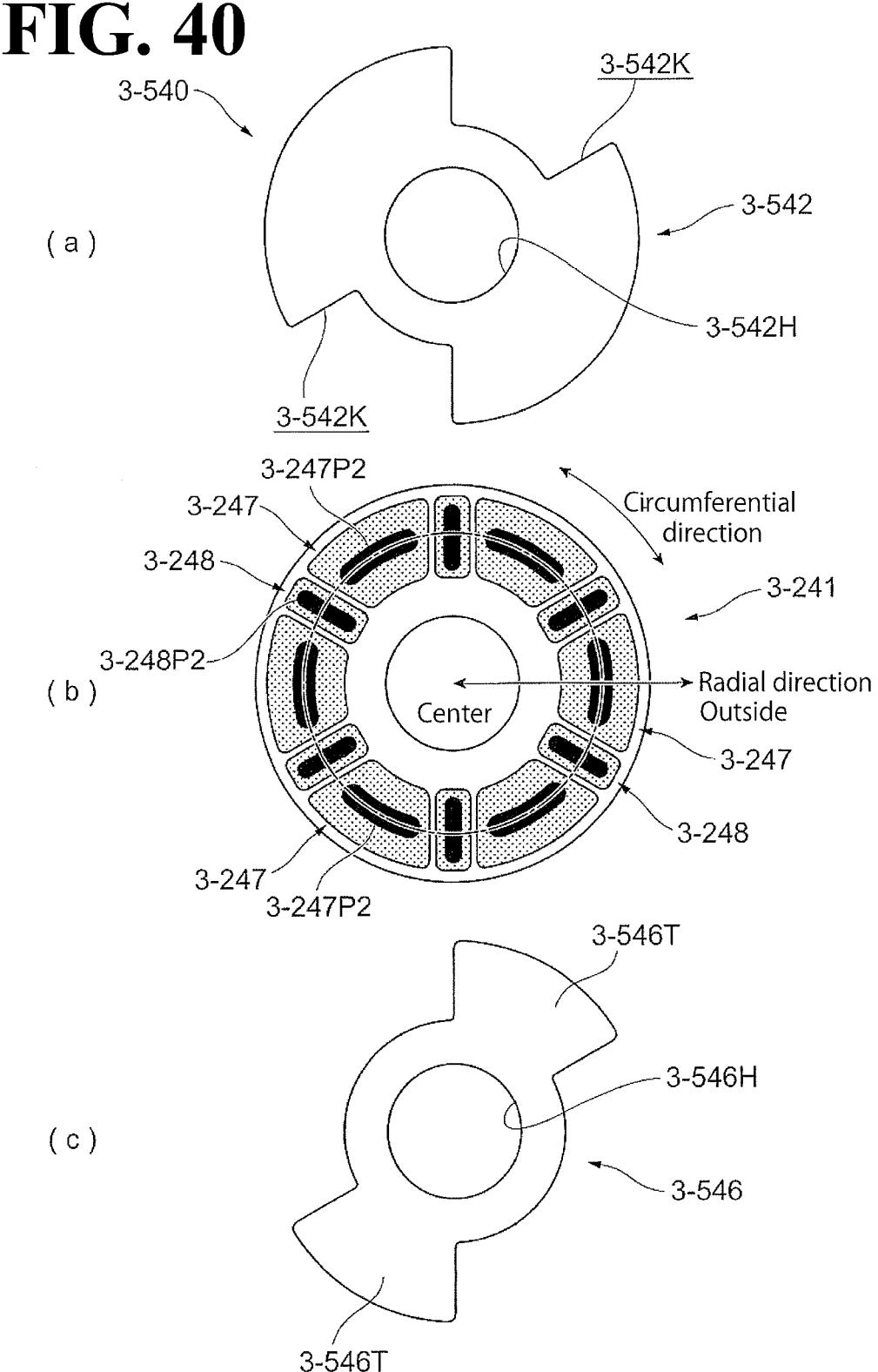
FIG. 40 illustrates a damping unit in embodiment 14.

FIG. 40 illustrates a damping unit 3-540 in embodiment 14. FIG. 40(a) ((a) of FIG. 40) is a top view of a damping valve 3-542 from the other side. FIG. 40(b) ((b) of FIG. 40) is a top view of the valve seat 3-241 from the other side. FIG. 40(c) is a top view of a check valve 3-546 from the other side.

The hydraulic damper 1 in embodiment 14 has a basic configuration similar to the basic configuration in embodiment 11. A difference from embodiment 11, however, lies in the damping unit 3-540 (the damping valve 3-542 and the check valve 3-546 include depressions and protrusions).

The hydraulic damper 1 in embodiment 14 will be described below. In the description of embodiment 14, similar elements to the elements in other embodiments will be denoted with the same reference numerals and will not be elaborated here.

(Damping Unit 3-540)

The damping unit 3-540 includes the valve seat 3-241, the damping valve 3-542, and the check valve 3-546. The damping valve 3-542 is disposed on the other side of the valve seat 3-241. The check valve 3-546 is disposed on the one side of the valve seat 3-241.

As illustrated in FIG. 40, the damping valve 3-542 is a metal plate having a through hole 3-542H in the center. The damping valve 3-542 includes a plurality of (two in this embodiment) openings 3-542K formed by cutting away part of the damping valve 3-542 from the outside toward the center. The damping valve 3-542 constantly opens the second oil passage ports 3-247P2 opposed to the openings 3-542K and allows, to be open and closed, the fourth oil passage ports 3-248P2 and the second oil passage ports 3-247P2 that are not opposed to the openings 3-542K.

The check valve 3-546 is a metal plate having a through hole 3-546H in the center. The check valve 3-546 includes a plurality of (two in this embodiment) protrusions 3-546T further protruding from the outside in the radial direction. The check valve 3-546 allows the first oil passage ports 3-247P1 opposed to the protrusions 3-546T to be open and closed, and constantly opens the first oil passage ports 3-247P1 that are not opposed to the protrusions 3-546T.

Oil flows at the time of an operation of the hydraulic damper 1 in embodiment 14 are basically the same as in the hydraulic damper 1 in embodiment 11. In the hydraulic damper 1 in embodiment 14, however, at the time of a rebound stroke, the oil, which has flowed from the fourth oil passage ports 3-248P2 of the rebound-side oil passages 3-248 to the first intermediate chamber 3-P1 (see FIG. 34), flows into the compression-side oil passages 3-247 from the second oil passage ports 3-247P2 opposed to the openings 3-542K of the damping valve 3-542. From the second oil passage ports 3-247P2, the oil forces open the protrusions 3-546T of the check valve 3-546 and flows to the first oil chamber Y1 (see FIG. 34).

In the damping unit 3-540 in embodiment 14, when the oil flows from the first intermediate chamber 3-P1 to the first oil chamber Y1 at the time of a rebound stroke, the oil flows to the compression-side oil passages 3-247 opened by the openings 3-542K of the damping valve 3-542. In this manner, in embodiment 14, at the time of a rebound stroke, the oil flows in the independent route from the first intermediate chamber 3-P1 to the first oil chamber Y1 so as to stabilize the oil flow.

The hydraulic damper 1 in embodiment 14 also has the simplified configuration described above with which the damping force generated in accordance with displacements of the piston portion 3-230 (see FIG. 34) in both of one direction and the other direction is changed in a wider range with respect to the displacement speed of the defining member.

In the hydraulic damper 1 in embodiment 14 as well, the damping force generated at the time of a compression stroke and the damping force generated at the time of a rebound stroke can be made uniform.

<Embodiment 15>

Figure 41:
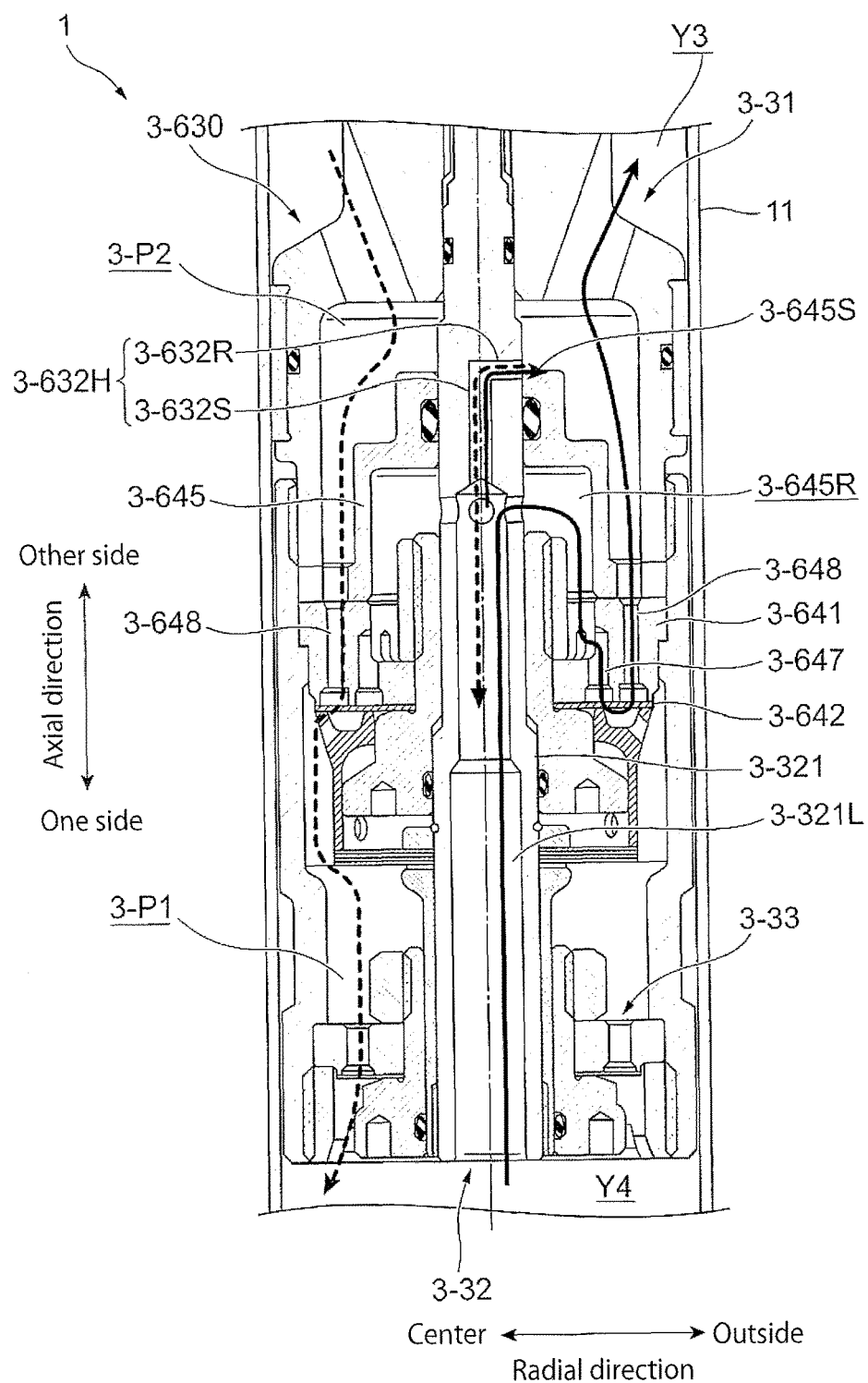
FIG. 41 illustrates a piston portion in embodiment 15.

FIG. 41 illustrates a piston portion 3-630 in embodiment 15. In FIG. 41, an oil flow at the time of a compression stroke is indicated by the solid line, and an oil flow at the time of a rebound stroke is indicated by the dashed line.

The piston portion 3-630 according to embodiment 15 is different from the piston portions according to embodiments 10 to 14 in that the direction of the piston portion is, so to speak, upside down in the axial direction.

The piston portion 3-630 according to embodiment 15 will be described in detail below. In the description of embodiment 15, similar elements to the elements in other embodiments will be denoted with the same reference numerals and will not be elaborated here.

[Configuration and Function of Piston Portion 3-630]

In the piston portion 3-330 in embodiment 10, for example, the press unit 3-32 is displaced by the displacement means 23 (see FIG. 2) in such a direction as to press the press member 3-327 and the damping valve 3-42 from "the other side" to "the one side" in the axial direction. In contrast, in the piston portion 3-630 in embodiment 6, the displacement direction of a press unit 3-632 may be reversed to the displacement direction of the press unit 3-32 in embodiment 10 in such a manner that the press unit 3-632 is displaced in a drawing direction from "the one side" (the bottom side of FIG. 41, for example) to "the other side" (the top side of FIG. 41, for example).

As illustrated in FIG. 41, the hydraulic damper 1 in embodiment 15 includes the cylinder 11, the piston portion 3-630, a valve seat 3-641, compression-side oil passages 3-647, rebound-side oil passages 3-648, a damping valve 3-642, and a through hole 3-632H, described later. The cylinder 11 contains oil. The piston portion 3-630 is disposed in the cylinder 11 movably in the axial direction and defines a space in the cylinder 11 into the third oil chamber Y3 (first fluid chamber) and the fourth oil chamber Y4 (second fluid chamber). The valve seat 3-641 is disposed in the piston portion 3-630 and forms passages of the oil. The compression-side oil passages 3-647 are formed in the valve seat 3-641 and cause the oil, which flows from the third oil chamber Y3 to the fourth oil chamber Y4 in accordance with a displacement of the piston portion 3-630 in one direction of the axial direction, to flow in a direction from the other side to the one side (specified direction). The rebound-side oil passages 3-648 are formed in the valve seat 3-641 and cause the oil, which flows from the fourth oil chamber Y4 to the third oil chamber Y3 in accordance with a displacement of the piston portion 3-630 in the other axial direction, to flow in the direction from the other side to the one side (specified direction). The damping valve 3-642 opens and closes the compressions-side oil passages 3-647 and the rebound-side oil passages 3-648 so as to control oil flows in the compressions-side oil passages 3-647 and the rebound-side oil passages 3-648. The through hole 3-632H is formed in the piston portion 3-630. In addition to the compressions-side oil passages 3-647 and the rebound-side oil passages 3-648, the through hole 3-632H forms a passage of the oil between the third oil chamber Y3 and the fourth oil chamber Y4 while reducing the oil flow.

In embodiment 15, the spool 3-321, which constitutes the press unit 3-632, includes the through hole 3-632H. The through hole 3-632H includes an axial passage 3-632S and a radial passage 3-632R. The axial passage 3-632S extends in the axial direction, and the radial passage 3-632R extends in the radial direction.

The axial passage 3-632S communicates with the hollow portion 3-321L on the one side and communicates with the radial passage 3-632R on the other side. The radial passage 3-632R communicates with the axial passage 3-632S on a side of the center in the radial direction and communicates with the second intermediate chamber 3-P2 on the outside in the radial direction.

In embodiment 15, a lock piece 3-645 forms a reversing oil passage 3-645R to reverse the oil flow in the spool 3-321 on the other side. The lock piece 3-645 includes a closer 3-645S to open and close the radial passage 3-632R in accordance with a displacement position of the spool 3-321 in the axial direction.

In embodiment 15, the spool 3-321 is displaced in the axial direction to change the position of the radial passage 3-632R relative to the closer 3-645S so as to change the opening degree of the radial passage 3-632R. With this configuration, the route of oil is formed between the third oil chamber Y3 and the fourth oil chamber Y4 through the hollow portion 3-321L of the spool 3-321 in addition to the compression-side oil passages 3-647 and the rebound-side oil passages 3-648.

The hydraulic damper 1 in embodiment 15 also has the simplified configuration described above with which the damping force generated in accordance with displacements of the piston portion 3-630 in both of one direction and the other direction is changed in a wider range with respect to the displacement speed of the defining member.

It is noted that embodiment 15 includes the configuration of the piston portion 3-330 in embodiment 10 as a base in which, so to speak, up and down in the axial direction is reversed. This, however, should not be construed in a limiting sense. For example, the configurations of the piston portions (3-230, 3-330, 3-430, 3-730) and the damping unit (3-540) in other embodiments may be likewise applied to embodiment 14.

The function of opening and closing the bypass passage by the through hole 3-632H and the closer 3-645S described in embodiment 14, for example, may be applied to other embodiments.

<Embodiment 16>

Figure 42:
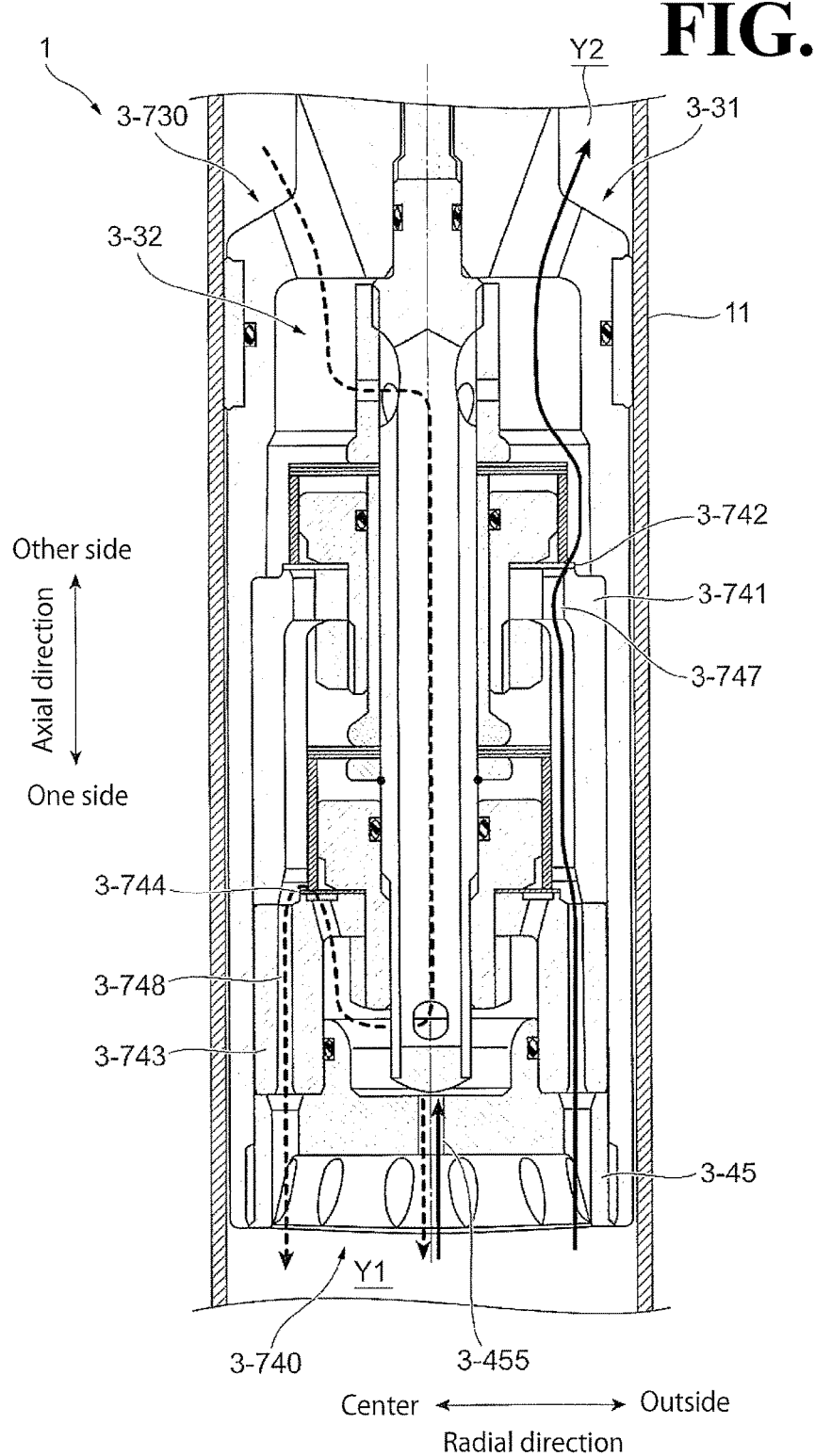
FIG. 42 illustrates a piston portion in embodiment 16.

FIG. 42 illustrates a piston portion 3-730 in embodiment 16. In FIG. 42, an oil flow at the time of a compression stroke is indicated by the solid line, and an oil flow at the time of a rebound stroke is indicated by the dashed line.

Embodiment 16 is different from other embodiments in including two valve seats each of which generates damping force at the time of a compression stroke and at the time of a rebound stroke. In the two valve seats, the damping force is changeable.

In the description of embodiment 16, similar elements to the elements in other embodiments will be denoted with the same reference numerals and will not be elaborated here.

[Configuration and Function of Piston Portion 3-730]

As illustrated in FIG. 42, the piston portion 3-730 of the hydraulic damper 1 in embodiment 16 includes the piston housing 3-31, a damping unit 3-740, and the press unit 3-32. The damping unit 3-740 is disposed on the one side of the piston housing 3-31.

(Damping Unit 3-740)

The damping unit 3-740 includes a first valve seat 3-741, a first damping valve 3-742, a second valve seat 3-743, a second damping valve 3-744, and the lock piece 3-45. The first valve seat 3-741 includes a plurality of oil passages. The first damping valve 3-742 is disposed on the other side of the first valve seat 3-741. The second valve seat 3-743 includes a plurality of oil passages and is disposed on the one side of the first valve seat 3-741 in the axial direction. The second damping valve 3-744 is disposed on the other side of the second valve seat 3-743. The lock piece 3-45 is disposed on the one side of the second valve seat 3-743.

The first valve seat 3-741 includes compression-side oil passages 3-747 in whichthe oil flows at the time of a compression stroke. The first damping valve 3-742 allows the compression-side oil passages 3-747 to be open and closed.

The second valve seat 3-743 includes rebound-side oil passages 3-748 in which the oil flows at the time of a rebound stroke. The second damping valve 3-744 allows the rebound-side oil passages 3-748 to be open and closed.

As illustrated in FIG. 42, the hydraulic damper 1 in embodiment 16 includes the cylinder 11, the piston portion 3-730, the first valve seat 3-741, the second valve seat 3-743, the compression-side oil passages 3-747, the rebound-side oil passages 3-748, the first damping valve 3-742, the second damping valve 3-744, and the through hole 3-455. The cylinder 11 contains oil. The piston portion 3-730 is disposed in the cylinder 11 movably in the axial direction and defines a space in the cylinder 11 into the first oil chamber Y1 and the second oil chamber Y2. The first valve seat 3-741 and the second valve seat 3-743 are disposed in the piston portion 3-730 and form passages of the oil. The compression-side oil passages 3-747 are formed in the first valve seat 3-741 and cause the oil, which flows from the first oil chamber Y1 to the second oil chamber Y2 in accordance with a displacement of the piston portion 3-730 in one direction of the axial direction, to flow in a specified direction. The rebound-side oil passages 3-748 are formed in the second valve seat 3-743 and cause the oil, which flows from the second oil chamber Y2 to the first oil chamber Y1 in accordance with a displacement of the piston portion 3-730 in the other axial direction, to flow along the specified direction. The first damping valve 3-742 and the second damping valve 3-744 respectively open and close the compression-side oil passages 3-747 and the rebound-side oil passages 3-748 so as to control oil flows in the compression-side oil passages 3-747 and the rebound-side oil passages 3-748. The through hole 3-455 is formed in the piston portion 3-730. In addition to the compression-side oil passages 3-747 and the rebound-side oil passages 3-748, the through hole 3-455 forms a passage of the oil between the first oil chamber Y1 and the second oil chamber Y2 while reducing the oil flow.

The hydraulic damper 1 in embodiment 16 also has the simplified configuration described above with which the damping force generated in accordance with displacements of the piston portion 3-730 in both of one direction and the other direction is changed in a wider range with respect to the displacement speed of the defining member.

It is noted that in embodiment 16, the two valve seats are provided in the axial direction to make each valve seat generate the damping force. Three or more valve seats, however, may be provided in the axial direction to make each valve seat generate damping force.

<Embodiment 17>

Figure 43:
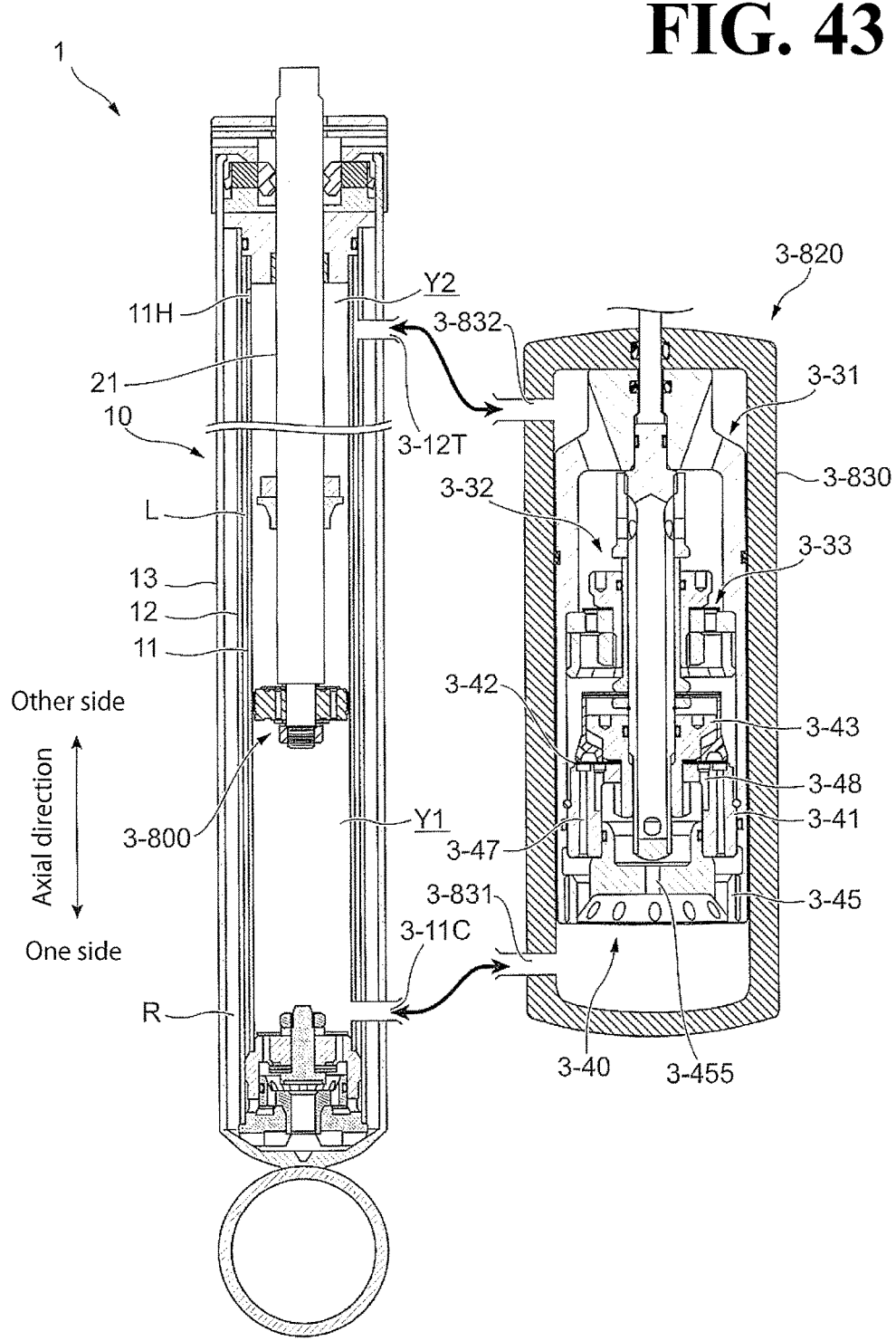
FIG. 43 illustrates a hydraulic damper in embodiment 17.
Figure 44:
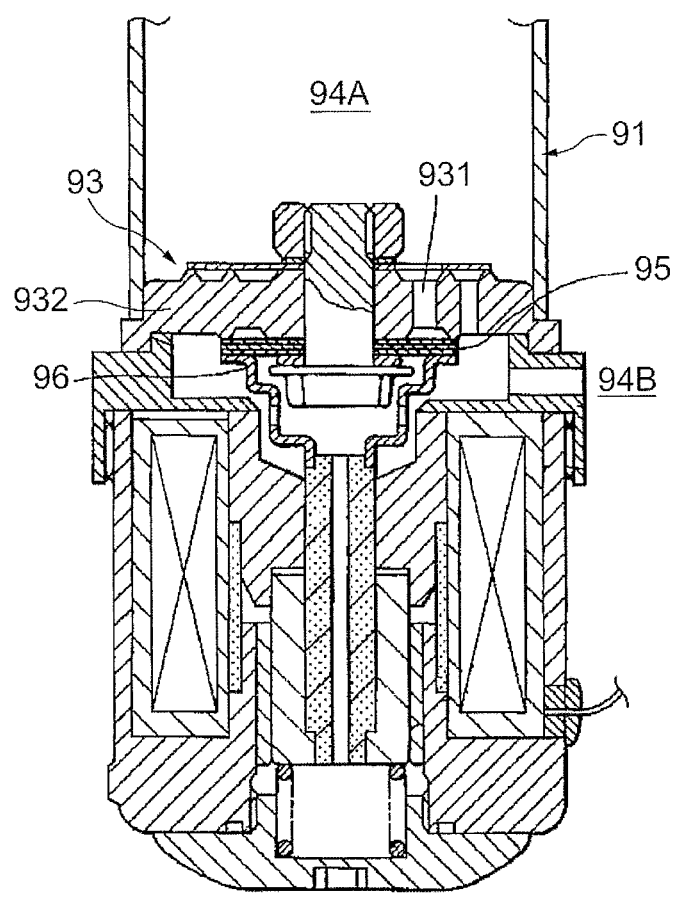
FIG. 44 illustrates a conventional changeability configuration of damping force.

FIG. 43 illustrates the hydraulic damper 1 in embodiment 17.

In embodiment 1, for example, the mechanism to generate damping force (piston portion 3-330) is disposed in the cylinder 11. This, however, should not be construed in a limiting sense. A mechanism to generate damping force may be provided separately from the cylinder 11.

In the hydraulic damper 1 in embodiment 17, as illustrated in FIG. 43, a normal piston portion 3-800 is disposed on an end portion of the rod member 21 on the one side in the cylinder 11. The hydraulic damper 1 in embodiment 17 includes a damping force generator 3-820 outside of the cylinder 11.

[Configuration and Function of Damping Force Generator 3-820]

The damping force generator 3-820 has an approximately hollow cylindrical shape and includes a second cylinder 3-830 containing oil. The second cylinder 3-830 includes a first communication passage 3-831 and a second communication passage 3-832. The second cylinder 3-830 accommodates the components of the piston portion 3-330 in embodiment 10 described above. As illustrated in FIG. 43, the first communication passage 3-831 communicates with a cylinder second opening 3-11C formed in the cylinder 11 to allow the oil to flow between the first communication passage 3-831 and the first oil chamber Y1. As illustrated in FIG. 43, the second communication passage 3-832 communicates with an outer hollow cylindrical member opening 3-12T formed in the outer hollow cylindrical member 12 to allow the oil to flow between the second communication passage 3-832 and the communication passage L. It is noted that the second communication passage 3-832 may communicate with the second oil chamber Y2.

As illustrated in FIG. 43, the hydraulic damper 1 in embodiment 17 includes the valve seat 3-41, the compression-side oil passages 3-47, the rebound-side oil passages 3-48, the damping valve 3-42, and the through hole 3-455. The valve seat 3-41 forms passages of oil that flows in accordance with displacements of the piston portion 3-800. The piston portion 3-800 defines a space in the cylinder 11, which contains oil, into the first oil chamber Y1 and the second oil chamber Y2, and is movable in the axial direction of the cylinder 11. The compression-side oil passages 3-47 are formed in the valve seat 3-41 and cause the oil, which flows from the first oil chamber Y1 to the second oil chamber Y2 in accordance with a displacement of the piston portion 3-800 in one direction of the axial direction, to flow in a specified direction. The rebound-side oil passages 3-48 are formed in the valve seat 3-41 and cause the oil, which flows from the second oil chamber Y2 to the first oil chamber Y1 in accordance with a displacement of the piston portion 3-800 in the other axial direction, to flow along the specified direction. The damping valve 3-42 opens and closes the compression-side oil passages 3-47 and the rebound-side oil passages 3-48 so as to control oil flows in the compression-side oil passages 3-47 and the rebound-side oil passages 3-48. In addition to the compression-side oil passages 3-47 and the rebound-side oil passages 3-48, the through hole 3-455 forms a passage of the oil between the first oil chamber Y1 and the second oil chamber Y2 while reducing the oil flow.

The hydraulic damper 1 in embodiment 17 also has the simplified configuration described above with which the damping force generated in accordance with displacements of the piston portion 3-800 in both of one direction and the other direction is changed in a wider range with respect to the displacement speed of the defining member.

It is noted that the configurations of the piston portions (3-230, 3-330, 3-430, 3-630, 3-730) and the damping unit (3-540) to which embodiment 11 to embodiment 16 described above are applied may be incorporated in the damping force generator 3-820 in the hydraulic damper 1 in embodiment 17.

In any of the above-described embodiments, the hydraulic damper 1 has what is called a treble tube structure. This, however, should not be construed in a limiting sense. The hydraulic damper 1 may have a double tube structure. Moreover, the bottom valve portion 50 should not be limited to the configurations indicated in the above-described embodiments but may have a different shape and configuration insofar as the shape and configuration satisfies the function as a damping mechanism.

Furthermore, a configuration in which a valve plate is opposed to the through hole 3-455 in embodiment 10, for example, may be employed. In addition to the damping force by the oil flowing through the through hole 3-455, damping force may be generated in accordance with deformation of the valve plate.

DESCRIPTION OF THE REFERENCE NUMERAL

1 . . . Hydraulic damper, 10 . . . Cylinder portion, 11 . . . Cylinder, 20 . . . Rod portion, 30 . . . Piston portion, 31 . . . Piston housing, 32 . . . Preset valve unit, 33 . . . Check valve unit, 34 . . . Lock piece, 40 . . . Damping unit, 41 . . . Valve seat, 41R . . . Reversing oil passage, 42 . . . Damping valve, 43 . . . Press member, 411 . . . First oil passage, 412 . . . Second oil passage

The invention claimed is:

1. A pressure damper comprising:
a cylinder containing fluid;
a defining member disposed in the cylinder movably in an axial direction and configured to define a space in the cylinder into a first fluid chamber and a second fluid chamber that contain the fluid;
a passage forming portion configured to form passages of the fluid that flows in accordance with a displacement of the defining member;
first passages formed in the passage forming portion and configured to cause the fluid, which flows from the first fluid chamber to the second fluid chamber in accordance with a displacement of the defining member in one direction of the axial direction, to flow in a specified direction;
second passages formed in the passage forming portion and configured to cause the fluid, which flows from the second fluid chamber to the first fluid chamber in accordance with a displacement of the defining member in another direction of the axial direction, to flow along the specified direction;
a control member that opens and closes the first passages and the second passages so as to control flows of the fluid in the first passages and the second passages; and
a load application member that applies a load to the control member in such a direction that the control member closes the first passages and the second passages, the load application member being capable of changing the load of the control member and applying a load to the control member in one direction, wherein the control member comprises a single control member configured to open and close the first passages and the second passages from another side.

2. The pressure damper according to claim 1, wherein the load application member applies a load to the control member through an elastic member.

3. The pressure damper according to claim 1,
wherein the first passages are configured to cause the fluid, which has been guided into the passage forming portion from one side of the passage forming portion, to flow toward another side of the defining member, and
wherein the second passages are configured to cause the fluid, which has been guided into the passage forming portion from the another side of the passage forming portion, to be reversed and flow toward the another side.

4. The pressure damper according to claim 1,
wherein passage ports of the first passages on another side and passage ports of the second passages on the another side are arranged side by side in the passage forming portion,
wherein the control member is disposed on the another side of the passage forming portion, and
wherein the load application member comprises
a contact member being in contact with the control member on the another side of the control member, and
a displacement member that displaces the contact member from the another side to the one side.

5. The pressure damper according to claim 4,
wherein the passage ports of the first passages on the another side and the passage ports of the second passages on the another side are arranged side by side in a radial direction of the passage forming portion, and
wherein the control member has an annular shape and is capable of opening and closing the first passages and the second passages.

6. The pressure damper according to claim 1,
wherein the first passages of the passage forming portion are configured to cause the fluid to be discharged from first passage ports disposed in an end portion of the passage forming portion, and
wherein the second passages of the passage forming portion are configured to cause the fluid to be discharged from second passage ports disposed in the end portion of the passage forming portion on a circumference on which the first passage ports are located.

7. The pressure damper according to claim 6, further comprising a press member comprising a contact portion being in contact with the control member at a single position in a radial direction in a portion of the control member that is opposed to the first passage ports and the second passage ports, the press member being configured to press the control member in such a direction as to close the first passage ports and the second passage ports.

8. The pressure damper according to claim 6, wherein the passage forming portion comprises first rounds disposed around the first passage ports and forming portions which are in contact with the control member, and
second rounds disposed on the end portion on which the first rounds are disposed, the second rounds being disposed around the second passage ports and forming portions which are in contact with the control member.

9. The pressure damper according to claim 6,
wherein the defining member forms a third fluid chamber being separated from the first fluid chamber and the second fluid chamber and containing the fluid, with the first passage ports of the first passages, the second passage ports of the second passages and the control member being disposed in the third fluid chamber, and
wherein the pressure damper comprises an allowing and restriction member configured to allow or restrict a flow of the fluid from the first fluid chamber and the second fluid chamber to the third fluid chamber in accordance with a displacement of the defining member in the one direction and the another direction of the axial direction.

10. The pressure damper according to claim 1, further comprising a bypass passage configured to form a passage of the fluid between the first fluid chamber and the second fluid chamber while reducing a flow of the fluid in addition to the first passages and the second passages.

11. The pressure damper according to claim 10, wherein the load application member regulates a flow reducing amount of the fluid in the bypass passage.

12. A damping force generation mechanism comprising:
a passage forming portion configured to form passages of fluid that flows in accordance with a displacement of a defining member configured to define a space in a cylinder containing the fluid into a first fluid chamber and a second fluid chamber, the defining member being movable in an axial direction of the cylinder;
first passages formed in the passage forming portion and configured to cause the fluid, which flows from the first fluid chamber to the second fluid chamber in accordance with a displacement of the defining member in one direction of the axial direction, to flow in a specified direction;
second passages formed in the defining member and configured to cause the fluid, which flows from the second fluid chamber to the first fluid chamber in accordance with a displacement of the defining member in another direction of the axial direction, to flow along the specified direction;
a control member that opens and closes the first passages and the second passages so as to control flows of the fluid in the first passages and the second passages; and
a load application member that applies a load to the control member in one direction, wherein
the control member comprises a single control member configured to open and close the first passages and the second passages from another side.

* * * * *